US012601235B2

(12) United States Patent
Schneider

(10) Patent No.: US 12,601,235 B2
(45) Date of Patent: Apr. 14, 2026

(54) RETRIEVABLE WASTE CAPSULES, RETRIEVAL-TOOL, SYSTEMS AND METHODS THEREOF

(71) Applicant: NuclearSAFE Technology LLC, Norman, OK (US)

(72) Inventor: Gary Schneider, Colorado Springs, CO (US)

(73) Assignee: NuclearSAFE Technology LLC, Norman, OK (US)

( * ) Notice: Subject to any disclaimer, the term of this patent is extended or adjusted under 35 U.S.C. 154(b) by 1077 days.

(21) Appl. No.: 17/687,557

(22) Filed: Mar. 4, 2022

(65) Prior Publication Data

US 2023/0279741 A1 Sep. 7, 2023

(51) Int. Cl.

| | |
|---|---|
| ***E21B 31/12*** | (2006.01) |
| ***E21B 41/00*** | (2006.01) |
| ***G21F 5/005*** | (2006.01) |
| ***G21F 5/12*** | (2006.01) |
| ***G21F 5/14*** | (2006.01) |

(52) U.S. Cl.

CPC ............ *E21B 31/12* (2013.01); *E21B 41/005* (2013.01); *G21F 5/005* (2013.01); *G21F 5/12* (2013.01); *G21F 5/14* (2013.01)

(58) Field of Classification Search

CPC ... G21F 5/12; G21F 5/14; G21F 5/005; G21F 9/34; E21B 41/005; E21B 31/12

See application file for complete search history.

(56) References Cited

U.S. PATENT DOCUMENTS

| | | | | |
|---|---|---|---|---|
| 1,002,264 | A | 9/1911 | Gribben | |
| 1,214,622 | A | 2/1917 | Walker | |
| 3,841,407 | A | 10/1974 | Bozeman | |
| 5,263,748 | A | 11/1993 | Carstensen | |
| 5,810,410 | A * | 9/1998 | Arterbury | E21B 31/12 294/86.17 |
| 5,850,614 | A | 12/1998 | Crichlow | |
| 6,030,004 | A | 2/2000 | Schock | |

(Continued)

OTHER PUBLICATIONS

NEA, Nuclear Energy Agency, "Reversibility of Decisions and Retrievability of Radioactive Waste: an Overview of Regulatory Positions and Issues," NEA/RWM/R)2015)1, www.oecd-nea.org , Feb. 2015.

*Primary Examiner* — Daniel Jeremy Leeds

(74) *Attorney, Agent, or Firm* — Eric Kelly

(57) ABSTRACT

Elongate capsules for housing waste are configured for disposal (placement) into wellbore(s) that are located in particular deep underground geologic formation(s). These capsules have opposing structures for physically linking multiple capsules together in an end-to-end fashion. These opposing end structures may include a stinger with pins at a top end of the capsule; and a J-slots structure at the bottom end of the capsule. The stinger with pins of a first capsule may be (removably) attached to the J-slots of a second capsule. Further, a retrieval-tool also has the J-slots structure at one end. The J-slots structure of the retrieval-tool may be configured to (removably) attach to a stinger with pins of a given capsule (which may be linked to other capsule(s)); and then the retrieval-tool may be used to retrieve the given capsule(s) from a given wellbore. Capsule retrieval systems and/or method may utilize such capsule(s) and the retrieval-tool.

20 Claims, 22 Drawing Sheets

(56) References Cited

U.S. PATENT DOCUMENTS

| | | | | |
|---|---|---|---|---|
| 6,238,138 | B1 | 5/2001 | Crichlow | |
| 8,933,289 | B2 | 1/2015 | Crichlow | |
| 10,427,191 | B2 | 10/2019 | Crichlow | |
| 10,518,302 | B2 | 12/2019 | Crichlow | |
| 11,087,896 | B2 | 8/2021 | Crichlow | |
| 11,167,330 | B2 | 11/2021 | Crichlow et al. | |
| 2020/0357533 | A1* | 11/2020 | Porter | G21F 9/34 |

* cited by examiner

RETRIEVABLE WASTE CAPSULES, RETRIEVAL-TOOL, SYSTEMS AND METHODS THEREOF

CROSS REFERENCE TO RELATED PATENTS

This present application may be related to previous patents related to the disposal of various types of waste in deep underground formations. These United States patents are: U.S. Pat. Nos. 5,850,614; 6,238,138; 8,933,289; 10,427,191; 10,518,302; 11,087,896; and 11,167,330, the disclosures of which are all incorporated herein by reference in their entirety.

TECHNICAL FIELD OF THE INVENTION

The present invention relates generally to disposing of nuclear waste and more particularly to: (a) the disposal of nuclear waste disposal in (lateral) wellbores drilled in deep geologic formations, such that, the nuclear waste is disposed of safely, efficiently, and/or economically; and (b) retrieval of thus deposited waste-capsules, containing nuclear waste, from the wellbores at a later (predetermined) date.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today (circa 2022), there are around 450 nuclear power plants operating in more than 30 countries throughout the world, with a total capacity of about 400 GWe or about 400 billion watts of electric capacity. This electricity is produced in nuclear power plants by harnessing high levels of energy emitted during the critical fission reaction caused by neutron bombardment of the fissile uranium isotope $^{235}U$. The daughter products of $^{235}U$ fission reactions are various short-lived but highly-radioactive radioisotopes. Several of these daughter radioisotopes continue to emit high-energy gamma radiation for thousands of years.

The amount of the fissile isotope $^{235}U$ in the uranium dioxide ($UO_2$) fuel pellets in conventional fuel rod assemblies varies from about 1% to 5%, with the non-fissile but fertile isotope $^{238}U$ being the principal uranium isotope in the $UO_2$ fuel pellets. When a certain percentage of the $^{235}U$ atoms in the $UO_2$ fuel pellets has been depleted during fission, then in order to maintain an efficient fission reaction, the spent $UO_2$ or spent nuclear fuel (SNF) must be removed to be replaced by new $UO_2$ fuel rod assemblies. Due to the short-lived daughter isotopes remaining in the SNF, the SNF is highly radioactive, and it is classified as one form of high-level radioactive waste (HLW).

In addition, since more than 90% of the uranium in the $UO_2$ fuel pellets consists of $^{238}U$, some fraction of the neutrons that are produced during fission of $^{235}U$ collide with and then are absorbed by $^{238}U$ atoms, resulting in nuclear transmutation of $^{238}U$ to the fissile radioisotope $^{239}Pu$, which is the main plutonium isotope in weapons-grade plutonium.

Therefore, nuclear waste in the form of $UO_2$ fuel pellets in SNF assemblies that is routinely removed from conventional uranium fission reactors has the potential to endanger the general public: (a) by direct exposure of humans to the highly-radioactive SNF; (b) by contaminating freshwater aquifers or other sectors of the ecosphere; and/or (c) by making it easier for weapons-grade plutonium to be acquired by unscrupulous individuals, groups, or countries, resulting in the proliferation of nuclear weapons.

Since the 1950s, there has been a widespread consensus within the nuclear energy industry and within the worldwide community of nuclear scientists that the only safe way to dispose of HLW is to emplace it permanently in deep geological repositories. When the Nuclear Waste Policy Act (NWPA) was passed by the U.S. Congress in 1982, it was assumed that the U.S. would have a geologic repository capable of HLW disposal by the end of 1998. Decades later, for various reasons, the U.S. still does not have an operating geologic repository. Moreover, no other country has a functioning geologic repository. Today (circa 2022) there is a significant quantity of high-level radioactive waste (HLW) accumulating in many countries throughout the world. In the U.S. alone there are more than 80,000 metric tons (MT) of HLW, which is stored in cooling ponds at nuclear reactor sites or in dry storage inside above-ground casks constructed of concrete and steel. The U.S. federal government is responsible for storage and eventual disposal of HLW, and due to the lack of an operating geologic repository for permanent disposal, the costs for temporary terrestrial surface storage have been increasing yearly, with costs now approaching $1 billion per year. There is a significant need for new mechanisms and processes to safely long-term store (dispose of) this current surface stored radioactive waste and to sequester this SNF waste in a safe and economical manner.

In this patent application, "HLW," "SNF," and/or the like may be used interchangeably to describe the nuclear waste products (that are often substantially solid). Also, the terms, "nuclear fuel assemblies," "fuel rod assemblies," "control rod assemblies" and/or the like, may be used interchangeably.

Several other methods have been proposed for disposal of HLW. U.S. Pat. Nos. 5,850,614, 6,238,138, and 8,933,289 teach applications that consist of the construction and use of horizontal wellbores as repositories for HLW in deep underground geologic formations. U.S. Pat. No. 10,518,302 teaches an application with a logical process for selecting suitable sites for deep geologic repositories. U.S. Pat. Nos. 10,427,191 and 11,087,896 teach applications for specially-designed waste-capsules that can be loaded with various forms of HLW. After being loaded with HLW, these waste-capsules can then be transported to a geologic repository site where they can then be emplaced or deposited for long-term storage in deep, horizontal wellbores that have been designed and drilled specifically for the disposal of nuclear waste. U.S. Pat. No. 11,167,330 teaches an application that enables economical and efficient emplacement of the waste-capsules. The disclosures of these seven (7) noted U.S. patents in this paragraph are all incorporated herein by reference in their entireties.

One of the requirements by the U.S. and other governments for the geologic disposal of HLW is that any approved disposal system/method must include a viable option for retrieving the HLW from some predetermined amount years after initial emplacement of the HLW, so that the HLW can be moved to another site or so that the HLW can be recycled to be used in another, as yet unknown or unforeseen application. Some governments may require fifty (50) years, 100 years, 500 years, 900 years, and/or some other (predetermined) quantity of years into the future after HLW emplacement for possible HLW retrieval. In the prior art, systems and methods for emplacing the waste-capsules are taught. However, there is no prior art that teaches systems and methods that will also enable the waste-capsules, with HLW, to be handled safely at the terrestrial surface and to be securely and efficiently retrieved from the deeply located horizontal wellbores.

Various embodiments, of the present invention may disclose and teach novel devices, apparatus, systems, and/or methods in which waste-capsules may be safely unloaded and handled at the terrestrial surface at the geologic disposal site; and securely and efficiently emplaced into the deeply located horizontal wellbores. Then, if necessary or desired, even after many years have passed, the loaded waste-capsules may be securely and efficiently retrieved from the deep horizontal wellbores, so that the loaded waste-capsules may then be safely handled at the terrestrial surface; and (optionally) loaded into suitable canisters to be transported from the geologic disposal site.

Various embodiments, of the present invention may disclose and teach waste-capsules that may be physically, but removably, linked together using pin to J-slot interactions of adjacent end-to-end waste-capsules; and/or various embodiments, of the present invention may disclose and teach a retrieval-tool with J-slot(s) for removably engaging with pin(s) of waste-capsules, wherein the retrieval-tool may be used to removably attach to a wellbore located top-most waste-capsule and then pull out (retrieve) that top-most waste-capsule along with any below linked waste-capsules.

Devices with various types of "J-slot" features have been used in the prior art. U.S. Pat. No. 1,002,264 was granted for a bayonet-joint hose-coupling that allowed two hoses to be coupled and securely locked together with a J-slot feature that prevented the coupling from accidentally unfastening. U.S. Pat. No. 1,214,622 was granted for a device with a J-slot feature for removing and disengaging well packers in wellbores. J-slot features, such as shown in U.S. Pat. No. 1,214,622, which is incorporated herein by reference, have provided simple and reliable solutions for securely engaging with and/or releasing from downhole tools routinely deployed in oil and gas wellbores by employing "on-off" tools having similar types of J-slot features. In the prior art, "on-off" tools with J-slot features are limited to engaging with and/or releasing from a single tool in a wellbore during one round trip of a wellbore work-string. Multiple tools can eventually be inserted into a wellbore as needed by running each tool into the wellbore by making separate trips of the work-string and then releasing the tool from an "on-off" tool that has been made up on the bottom of the work-string. Likewise, multiple tools can also be retrieved from the wellbore as needed by making separate trips of the work-string, engaging each tool with an "on-off" tool that has been made up on the bottom of the work-string, and pulling the tool completely out of the wellbore before running the "on-off" tool into the wellbore with the work string, in order to engage and retrieve the next tool.

A work-string is a conveyance system and method that allows various tools to be tripped in and tripped out, or run in and pulled out of a wellbore. A work-string may consist of various types of tubular components, including, but not limited to, drill pipe, tubing, and coil tubing, which have all been used in the prior art. U.S. Pat. No. 6,030,004 was granted for high-torque threaded tool joints that may be used to connect lengths of drill pipe together to form a drill pipe work-string. U.S. Pat. No. 5,263,748 was granted for improved couplings for standard API tubing, and these couplings may be used to connect lengths of tubing together to form a tubing work-string. U.S. Pat. No. 3,841,407 was granted for a coil tubing unit, which is an apparatus for running a continuous length of coiled substantially-inflexible tubing into a wellbore and pulling the coiled tubing back out of the wellbore. These three (3) noted U.S. patents from this paragraph are all incorporated herein by reference in their entireties.

However, it is very time consuming and inefficient to trip a work-string thousands of feet into and out of a wellbore to either emplace or retrieve a single waste-capsule containing (nuclear) waste. The present invention provides novel arrangements and methods to reliably and efficiently emplace and/or retrieve multiple (linked) waste-capsules by making a single trip with the work-string. The present invention also provides novel arrangements and methods for handling the waste-capsules at the terrestrial surface so that the waste-capsules can be safely and efficiently transported between various locations at the terrestrial surface site, so that a selected number of waste-capsules can be safely connected to each other at the terrestrial surface of a wellbore prior to emplacement, and/or so that waste-capsules can be safely disconnected from one another at the terrestrial surface of a wellbore after retrieval. The present invention also provides novel arrangements and methods to safely and efficiently install and makeup, or to safely and efficiently breakout and remove, the top plug or cap on the waste-capsule-body, in order to allow waste material to be either inserted or removed. The present invention also provides a novel arrangement so that the couplings or connections between adjacent linked waste-capsules have enough flexibility for a group or collection of waste-capsules to be reliably and safely transported through curved sections of a wellbore, much like the couplings between railroad cars allow a railroad train to safely travel on the curved sections of railroad track. In order to have the capability of performing all of the aforementioned novel arrangements and methods, all of the embodiments of the present invention may be required to have axial load capacities that are (significantly) greater than those prior art "on-off" tools used in the oil and gas industry, and which may therefore require greater cross-sectional areas for the load bearing items. On the other hand, in contrast to prior art "on-off" tools which are designed to withstand prescribed pressure ratings, and since pressure containment is not required by the couplings between the connected waste-capsules, the components of the present invention can be mass produced at relatively low manufacturing costs from one or more types of economical high-strength alloys. Therefore, because of the low manufacturing costs for mass-produced components of the present invention, as well as the considerable time savings that will be involved in emplacing and/or retrieving waste-capsules, this novel invention also provides an economical solution for handling HLW (high-level nuclear waste) that is not currently available.

Based on the inherent shortcomings of the prior art, there exists a critical need for an effective, economical, and safe method for emplacing and retrieving waste-capsules from deeply located horizontal wellbores. An approach is needed that is practical and that can be safely and effectively employed on a widespread scale throughout the U.S. and/or the world. To solve the above-described problems and to also meet the requirements stipulated by the U.S. and other governments, the present invention provides structures, components, devices, apparatus, systems, and/or methods to dispose of nuclear waste, within retrievable-waste-capsules, that allows emplacement and/or retrieval of specially and specifically designed retrievable-waste-capsules to and/or from deep, horizontal wellbores in efficient, repetitive steps; which, also translates into lower overall economic costs for nuclear waste disposal. The novel approaches as disclosed and taught in this patent application provides nuclear waste disposal and/or retrieval operations that minimize operational processes while encouraging human and environmental safety.

It is to these ends that the present invention has been developed.

BRIEF SUMMARY OF THE INVENTION

To minimize the limitations in the prior art, and to minimize other limitations that will be apparent upon reading and understanding the present specification, various embodiments of the present invention may describe: retrievable-waste-capsules that may be retrieved from within deeply located wellbores; retrievable-waste-capsules that may be removably linked together in an end-to-end fashion; retrieval-tools that may be removably attached to top-most retrievable-waste-capsules (located within or outside of wellbores); systems of retrieving retrievable-waste-capsules; systems of decoupling retrieved retrievable-waste-capsules; methods of retrieving retrievable-waste-capsules; and/or methods of decoupling retrieved retrievable-waste-capsules.

Some embodiments may describe devices, apparatus, systems, and/or methods for retrieving waste materials from lateral wellbores located within closed and deep geological formations, by using retrievable-waste-capsules. In some embodiments, devices, apparatus, systems, and/or methods of emplacing and/or retrieving retrievable-waste-capsules in underground rock formations are disclosed by the present invention.

Various embodiments of the present invention may be concerned with disposal and retrieval of waste (such as, but not limited to, nuclear/radioactive waste); and more specifically, to devices, apparatus, systems, and/or methods for disposal and/or retrieval of encapsulated waste in deep underground closed rock formations using single or multilateral horizontal boreholes (wellbores) connected to the terrestrial surface/ground by at least one vertical wellbore. More specifically, various embodiments of the present invention may describe devices, apparatus, systems, and/or methods in which a novel retrievable-waste-capsule system and a novel retrieval process are illustrated to provide for a safe long-term waste repository with the option to safely and efficiently retrieve the retrievable-waste-capsules sometime in the near to distant future.

In some embodiments, elongate retrievable-waste-capsules may be configured for housing waste and may be configured for disposal (placement) into wellbore(s), wherein at least some portions of such wellbore(s) may be located in particular deep underground geologic formation (s). In some embodiments, these retrievable-waste-capsules may have opposing structures for physically linking multiple capsules together in an end-to-end fashion. In some embodiments, these opposing end structures may include a stinger with pin(s) at a top end of the retrievable-waste-capsule; and a J-slot(s) structure at the bottom end of the retrievable-waste-capsule. In some embodiments, the stinger with pin(s) of a first retrievable-waste-capsule may be (removably) attached to the j-slots of a second retrievable-waste-capsule. In some embodiments, a retrieval-tool may also have the same J-slot(s) structure of the retrievable-waste-capsule at one (bottom) end of the retrieval-tool. In some embodiments, the J-slot(s) structure of the retrieval-tool may be configured to (removably) attach to a stinger with pins of a given retrievable-waste-capsule (which may be linked to other retrievable-waste-capsule(s)). In some embodiments, the retrieval-tool, while engaged with a top-most retrievable-waste-capsule, may be used to retrieve the given retrievable-waste-capsule(s) from a given wellbore. Capsule retrieval systems and/or methods may utilize such capsule(s) and the retrieval-tool. In some embodiments, the retrieval-tool may also be used to decouple linked retrievable-waste-capsules from each other. In some embodiments, the retrieval-tool may also be used to open a sealed retrievable-waste-capsule (by facilitating top plug decoupling from a waste-capsule-body).

Alternatively, in some embodiments, the pins/lugs may be present in/on inside diameters of skirts of bottom caps of waste-capsules and/or on bottom skirts of retrieval-tools and the complementary J-slots structures may be instead located on the top cap stingers of the waste-capsules. Also, in some embodiments, the inside diameters of at least some skirts of bottom caps of waste-capsules may be smooth and without pins/lugs and without J-slots or the like structures.

In some embodiments, operational methods may teach emplacing, landing, and/or loading at least one retrievable-waste-capsule into a given wellbore (or system of wellbores). In this operational method, the recommended tasks involved provide a more efficient methodology to allow safer, more economical disposal of the waste in deep underground repositories.

In some embodiments, operational methods may teach retrieval or removal of at least one retrievable-waste-capsule into a given wellbore (or system of wellbores). In this operational method, the recommended tasks involved provide a more efficient methodology to allow safe, more economic retrieval or removal of the waste from deep underground repositories.

In some embodiments, operational methods may teach installing and making up plugs or caps on each retrievable-waste-capsule-body after waste material has been loaded into the retrievable-waste-capsules. In this operational method, the recommended tasks involved provide a more efficient methodology to allow safe, more economic loading of waste into retrievable-waste-capsules at nuclear plants or other sites where waste is generated.

In some embodiments, operational methods may teach breaking out and removing plugs or caps on retrievable-waste-capsules to allow removal of the waste. In this operational method, the recommended tasks involved provide a more efficient methodology to allow safe, more economic removal of waste in retrievable-waste-capsules, if required sometime in the future.

A very significant existing consideration to be addressed by various embodiments of the present invention may be a need for rapid, efficient, and/or safe retrieval or removal of the waste material from the wellbore to the terrestrial surface. These retrievable-waste-capsules may be radioactive in some embodiments, and as such, they need protected handling and relatively quick retrieval or removal times (e.g., to minimize exposure). The shorter the time that these radioactive devices are allowed to be within the working area or storage environment on the terrestrial surface/ground area of human operations, the less chance there is of an accident of dangerous exposure to humans and/or the environment (ecosphere).

In some embodiments, a novel device or apparatus is used to plug or cap the upper part of a retrievable-waste-capsule using a threaded connection.

In some embodiments, a novel device or apparatus is used to plug or cap the lower part of a retrievable-waste-capsule using a threaded connection.

In some embodiments, the upper plug or cap may include a novel device or apparatus (e.g., stinger with stinger-pin(s)) that may be engaged with a compatible retrieval device or apparatus to be used to install and makeup the upper plug or cap, to handle the retrievable-waste-capsule at the terrestrial surface, to emplace the retrievable-waste-capsule in a wellbore, to retrieve the retrievable-waste-capsule from the wellbore, and/or to allow manipulation or handling of the plug or cap, or of the retrievable-waste-capsule in some other manner.

In some embodiments, the lower plug or cap may include a novel device or apparatus (e.g., J-slot(s)) that may engage with a compatible device or apparatus on the upper plug or cap (e.g., stinger with stinger-pin(s)) of a retrievable-waste-capsule directly below. In these embodiments, a selected quantity of retrievable-waste-capsules may be connected (linked) together in the wellbore, and this feature may be used to retrieve this selected quantity of retrievable-waste-capsules, as a single unit, from the wellbore up to the terrestrial surface at the same time.

In some embodiments, the lower plug or cap may include a novel device or apparatus (e.g., a lower-skirt without J-slot(s) and with an obstruction-free internal/interior profile) that may extend over and protect all of the components of the upper plug or cap on the retrievable-waste-capsule directly below.

In some embodiments a novel retrieval device or apparatus may be (removably) connected to terminal-end (distal end) portion of a drill string, a work-string, or some other type of conveyance that is used by drilling rigs, workover rigs, or other systems or methods designed to allow access to the full length of a given wellbore.

In some embodiments, the retrievable-waste-capsules with the novel upper and lower plugs or caps, either singly or in groups connected (linked) together, may be safely, efficiently, and/or economically handled by special remote-controlled and/or robotic devices on a drilling or workover rig floor at a given well site (wellhead).

In some embodiments, the retrievable-waste-capsules with the novel upper and lower plugs or caps, either singly or in groups connected together, may be safely, efficiently, and/or economically handled by a mobile-gantry-crane or other similar hoisting and/or handling device or apparatus with the retrievable-waste-capsules landed at the top of the terrestrial surface wellhead equipment or other structure directly above the terrestrial surface entry of a given wellbore whenever the drilling or workover rig has been moved away from the terrestrial surface wellhead equipment.

It is an objective of the present invention to provide a method of efficiently disposing of waste (such as, but not limited to, nuclear and/or radioactive waste) with deep underground geologic formations.

It is another objective of the present invention to provide retrievable-waste-capsules that may be retrieved from within a deeply located wellbore.

It is another objective of the present invention to provide retrievable-waste-capsules that may be removably linked together in an end-to-end fashion, such that when a top-most retrievable-waste-capsule is retrieved, from within a deeply located wellbore, other linked retrievable-waste-capsules are also retrieved as well.

It is another objective of the present invention to provide retrievable-waste-capsules that may be removably linked together in an end-to-end fashion, such that these linkages have some degree of flexibility to allow the linked retrievable-waste-capsules to move in and/or out of wellbores, including wellbores with non-linear (curved) portions.

It is another objective of the present invention to provide retrievable-waste-capsules wherein the retrievable-waste-capsule to retrievable-waste-capsule linkage may be provided by engagement of pin(s) at one terminal end of a retrievable-waste-capsule and via J-slot(s) located another terminal end of a different retrievable-waste-capsule.

It is another objective of the present invention to provide pin(s) and/or J-slot(s) with sufficient strength that are capable of holding a full load of a plurality of linked and loaded (filled) retrievable-waste-capsules.

It is another objective of the present invention to provide a retrieval-tool that may be configured for removable attachment to a top-most retrievable-waste-capsule that may be located within a deeply located wellbore.

It is another objective of the present invention to provide a retrieval-tool that may be configured to facilitate decoupling of two linked retrievable-waste-capsules from each other.

It is another objective of the present invention to provide a retrieval-tool that may be configured to facilitate and/or assist in decoupling of a top plug from a waste-capsule-body to permit access to contents of that waste-capsule-body.

It is another objective of the present invention to provide a retrieval-tool with J-slot(s) structure at a bottom of that retrieval-tool for removable attachment to pin(s) of a top of a given retrievable-waste-capsule (that may or may not be deeply located within a given wellbore).

It is another objective of the present invention to provide a (terrestrial) robotic system and/or a remote-controlled system for terrestrial surface working with retrieval-tools and/or with retrievable-waste-capsules.

It is another objective of the present invention to provide a (terrestrial) mobile-gantry-crane for working with retrieval-tools and/or with retrievable-waste-capsules.

It is another objective of the present invention to provide a system of retrieving retrievable-waste-capsules (from within deeply located wellbores).

It is another objective of the present invention to provide a system of decoupling retrieved retrievable-waste-capsules from each other.

It is another objective of the present invention to provide a method of retrieving retrievable-waste-capsules (from within deeply located wellbores).

It is another objective of the present invention to provide a method of decoupling retrieved retrievable-waste-capsules from each other.

It is another objective of the present invention to provide a method of efficiently retrieving or removing retrievable-waste-capsules from deep underground formations.

It is another objective of the present invention to provide a method of disposing of waste in underground formations which will provide for a rapid, repetitive means of safely controlling the disposal of the encapsulated or containerized material waste.

It is another objective of the present invention to provide a method of retrieving or removing waste in underground formations which will provide for a rapid, repetitive means of safely controlling the retrieval or removal of encapsulated or containerized material waste.

It is another objective of the present invention to provide a method for safely and efficiently handling encapsulated or containerized material waste at a terrestrial surface site of a geologic repository designed for disposal of waste in deep, horizontal wellbores. The surface site of this type of geologic repository is the working area or storage environment on the terrestrial surface where human, robotic, and/or remote-controlled operations may occur.

It is another objective of the present invention to provide a safe and effective method to install and makeup (i.e., screw a threaded connection together) the top plug or cap of a retrievable-waste-capsule after HLW has been loaded into that retrievable-waste-capsule. The present invention allows this task to be safely and effectively conducted so that it minimizes the risk to human health.

It is another objective of the present invention to provide a safe and effective method to breakout (i.e., unscrew a threaded connection) and remove the top plug or cap from the retrievable waste-capsule-body so that the HLW (or other waste) inside the retrievable-waste-capsule may be removed without endangering human health.

It is another objective of the present invention to provide a method of disposing of waste in underground rock formations which may bury the waste in horizontally-extended lateral boreholes positioned well below the Earth's surface deep in geologic formations and thus very remote from the ecosphere.

It is yet another objective of the present invention to provide a method of disposing of waste in deep closed underground rock formations wherein the design of the retrievable-waste-capsule provides several novel features and also allows a rapid, repetitive retrieval or removal of the subject retrievable-waste-capsules from the wellbores. In addition, the structures, components, devices, apparatus, systems, and/or methods disclosed and taught herein may allow for: personnel safety on the terrestrial surface during surface, disposal, and retrieval working operations and/or economic and operational efficiencies in sequestering the waste underground and/or retrieving or removing the waste if needed.

These and other advantages and features of the present invention are described herein with specificity so as to make the present invention understandable to one of ordinary skill in the art, both with respect to how to practice the present invention and how to make the present invention. The foregoing and other objects, advantages, and characterizing features will become apparent from the following description of certain illustrative embodiments of the invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1:
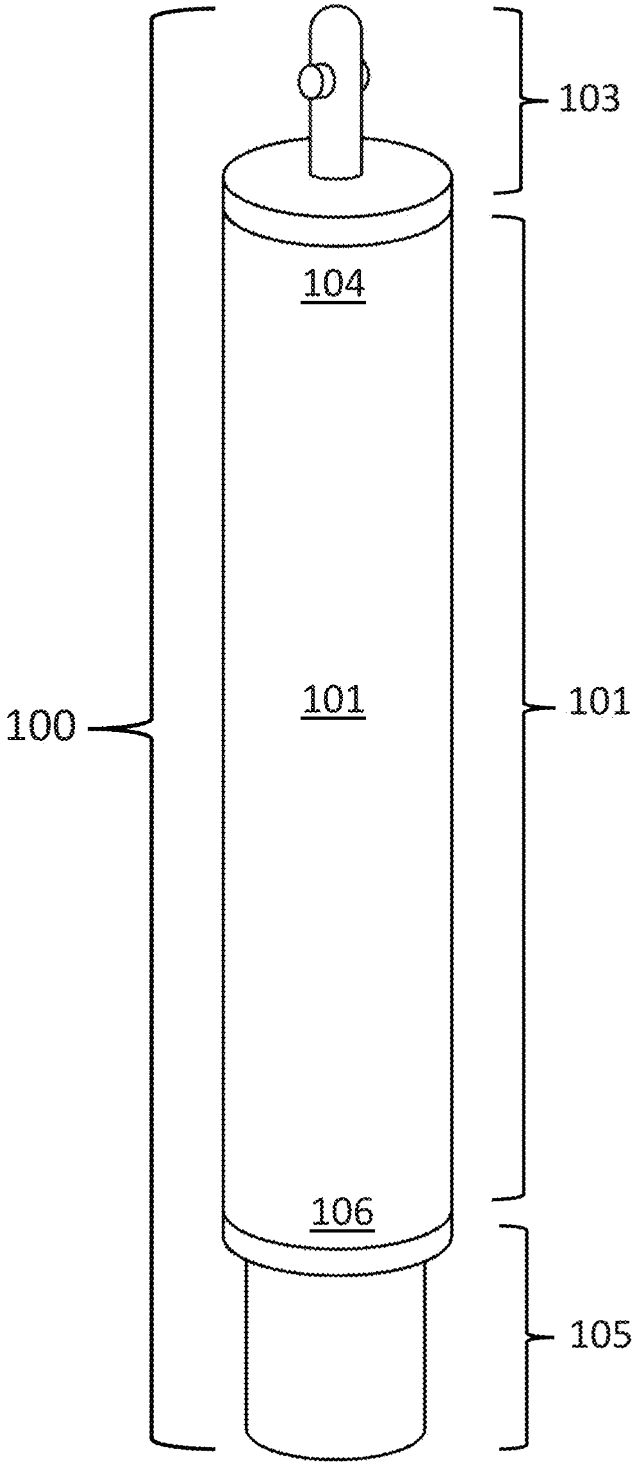
FIG. 1 depicts a top-down perspective of a retrievable-waste-capsule in an assembled configuration.

100 retrievable-waste-capsule (assembled) 100
101 waste-capsule-body 101
103 plug/cap (top) 103
104 top/upper end/portion 104
105 plug/cap (bottom) 105 (retrieval-end 105)
106 bottom/lower end/portion 106
201 shoulder of top plug or cap 201
203 stinger 203
205 stinger-pin 205
207 threads 207
209 pin 209
211 pin 211
213 threads 213
215 internal flush profile 215
301 shoulder 301
303 lower-skirt 303
305 J-slot 305 (slot-structure 305 or predetermined-pathway 305)
307 guiding-opening 307
309 smaller-opening 309
311 diagonal-passage-section 311
313 parallel-section 313
314 central-cavity 314
315 sleeve-body 315
317 threads 317
319 threads 319
321 internal-smooth-profile 321
400 retrieval-tool 400
401 sidewall 401
403 J-slot-connection-end 403 (lower-portion 403)
405 driver-connection-end 405 (upper-portion 405)
407 internal-profile 407
409 threads 409
501 pickup-distance 501
600 wellbore 600
601 straight-section 601
603 curved-section 603
605 linked-waste-capsules 605
607 disposal-casing 607
701 conductor-casing 701
703 surface-casing 703
705 intermediate-casing 705
707 wellhead 707
709 cellar 709
711 cellar-wall 711
713 cellar-floor 713
723 casing-head 723
725 casing-spool 725
727 casing-spool 727
731 baseplate 731
733 landing-plate(s) 733
800 drilling-rig-floor 800
801 robotic-system 801
803 grabber 803
805 communication-means 805
807 landing-device 807
809 rotary-table 809
900 mobile-gantry-crane 900
901 overhead-support-member 901
903 support leg 903
905 ground-translation-means 905
907 height-adjustment-means 907
909 crown-block 909
911 cable(s) 911
913 traveling-block 913
915 driver 915
917 threads 917
1000 method of retrieving waste-capsules from wellbore 1000
1001 step of connecting retrieval-tool to work-string 1001
1003 step of inserting retrieval-tool into wellbore 1003
1005 step of connecting retrieval-tool to top-most waste-capsule 1005
1007 step of pulling top-most waste-capsule using retrieval-tool 1007
1009 step of determining if top-most waste-capsule is connected to other waste-capsules
1009
1011 step of pulling top-most waste-capsule using retrieval-tool 1011
1013 step of decoupling top-most waste-capsule from other waste-capsule 1013
1015 step of moving former top-most waste-capsule away from wellhead 1015
1017 step of determining quantity of connected waste-capsules remaining 1017
1019 step of determining if top-most waste-capsule is connected to another waste-capsule
1019
1021 step of pulling final two waste-capsules out of wellbore 1021
1023 step of decoupling final two waste-capsules from each other 1023
1025 step of moving final single waste-capsule away from wellhead 1025
1101 stinger 1101
1103 skirt 1103
1105 pin 1105

DETAILED DESCRIPTION OF THE INVENTION

The novel features which are considered characteristic for the invention are set forth in the appended claims. The invention itself, however, both as to its construction and/or its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction, illustrated and described within the scope of the appended claims.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

In this patent application, "HLW" (high-level nuclear/radioactive waste), "SNF" (spent nuclear fuel), and/or the like may be used interchangeably to describe the nuclear/radioactive waste products (that are often substantially solid). Also, the terms, "nuclear fuel assemblies," "fuel rod assemblies," "control rod assemblies" and/or the like, may be used interchangeably.

In this patent application, the words, "well," "wellbore," and/or the like may be used interchangeably and refer to cylindrical elements implemented in the design and installation processes that are generally substantially (mostly) located underground. References to well and/or wellbore may refer to any of the wellbore sections discussed herein, such as, but not limited to, a straight section of a wellbore, a vertical section of a wellbore, a curved section of a wellbore, and/or a horizontal or lateral section of a wellbore, portions thereof, combinations thereof, and/or the like. In some embodiments, the well or wellbore may be specifically designed for disposal of waste. In other embodiments, the well or wellbore may have been designed for other purposes but may still be suitable for disposal of various forms of waste material.

In this patent application, the orientation or the relative position of various components of the invention with respect to each other may be described according to their orientation or relative position in the wellbore. Therefore, the words, "down," "below," "lowermost," "under," "underneath," and/or the like may be used interchangeably to describe the orientation or the relative position of the various components/structures of embodiments of the present invention towards a bottom of the given wellbore. Furthermore, in this patent application, the words, "up," "uppermost," "topmost," "above," and/or the like may be used interchangeably to describe the orientation or the relative position of the various components/structures of embodiments of the present invention towards the terrestrial surface of the wellbore.

In this patent application, the words, "wellhead," "wellhead equipment," "casing head," and/or the like may be used interchangeably and refer to components at the surface of a well or wellbore that may provide structural support, containment of pressure, and/or access to the well or wellbore.

In this patent application, the words, "capsule," "container," "carrier tube," "canister," and/or the like may be used interchangeably with the same meaning, e.g., specifically referring to at least one waste-capsule or portion thereof.

In this patent application, the words, "waste," "waste form," "waste material," "waste product," and/or the like may be used synonymously and refer to various types of material to be disposed of in a deep geological formation/system.

In this patent application, the word "J-slot" refers to a specific mechanical indexing and locking feature with various embodiments of the present invention. There may be one or more J-slot features arranged or positioned concentrically around one or more devices, components, apparatus, and/or the like as disclosed and taught by this patent application.

In this patent application, the words, "skirt," "guide," "overshot", and/or the like may be used interchangeably and refer to a tubular component with a large enough inner diameter to pass over, encompass, and engage a stinger or fishing neck device. In some embodiments, the skirt or guide may have one or more J-slot(s) machined concentrically around its inner diameter. In other embodiments, the skirt or guide may have one or more pin(s) or lug(s) protruding inward and arranged concentrically on its inner diameter. In still other embodiments, the skirt or guide may have a smooth inner diameter.

In this patent application, the words, "stinger," "fishing neck," "slick joint," and/or the like may be used interchangeably and refer to the cylindrical-shaped, solid component, elongate-member, that is smaller in diameter than the skirt or guide of the retrieval device or apparatus, which is designed to pass over, encompass, and engage the stinger or fishing neck. In some embodiments, the stinger or fishing neck may be smooth, except for one or more pin(s) or lug(s) protruding outward and arranged concentrically on its outer diameter. In other embodiments, the stinger or fishing neck may have one or more J-slot(s) concentrically machined into its body.

In this patent application, the words, "stinger-pin," "pin," "lug," "dog," and/or the like may be used interchangeably and refer to a solid protrusion that fits into and travels along a length of a J-slot. In some embodiments, a smooth stinger or fishing neck may have one or more pin(s) or lug(s) protruding outward from the body of the stinger or fishing neck. In other embodiments, a skirt or guide may have one or more pin(s) or lug(s) protruding inward from the inner diameter of the skirt or guide.

In this patent application, the words, "slot," "groove," "channel," "passage", "pathway," and/or the like may be used interchangeably and may refer to at least some portion (s) of a given J-slot where the pin, lug, or dog travels to engage or disengage a retrieval device or a stinger.

FIG. 1 depicts a top-down perspective of a retrievable-waste-capsule 100 in an assembled configuration. "Retrievable-waste-capsule 100" may also be referred to herein as, "waste-capsule 100"; i.e., unless otherwise stated a "waste-capsule 100" is a "retrievable-waste-capsule 100." Note, unless otherwise stated all references to waste-capsule 100 are in the assembled configuration (e.g., as shown in FIG. 1). In some embodiments, waste-capsule 100 may house (hold) waste, such as, but not limited to, SNF, HLW, and/or other waste material. In some embodiments, waste-capsule 100, with its waste, may be emplaced in or retrieved from a given wellbore, such as wellbore 600 (see e.g., FIG. 6 for wellbore 600). In some embodiments, such waste-capsule 100, with its waste, emplacement or retrieval into/from wellbore 600 may be facilitated by using a drill string or some other type of (wellbore) work string that is tripped in or tripped out of wellbore 600 via a drilling rig or other type of hoisting equipment and/or handling device or apparatus (wherein the drilling rig or other type of hoisting equipment and/or handling device or apparatus is generally located on the terrestrial surface at or proximate to that wellbore's wellhead). In some embodiments, waste-capsule 100 may also be emplaced into wellbore 600 by employing the patented self-loading waste disposal systems and/or methods of U.S. Pat. No. 11,167,330 (which is incorporated herein by reference as if fully set-forth). At least some embodiments of the present invention that allow safely and efficiently handling the assembled waste-capsules 100 at terrestrial surfaces during loading and unloading operations may be described below.

Continuing discussing FIG. 1, in some embodiments, a given waste-capsule 100 may comprise a waste-capsule-body 101, a (top) plug 103, and a (bottom) plug 105. In some embodiments, waste-capsule-body 101 may be formed from a sidewall. In some embodiments, the sidewall of waste-capsule-body 101 may be at least substantially (mostly) (right) cylindrical. In some embodiments, waste-capsule-body 101 may be a structural hollow tube. In some embodiments, the sidewall of waste-capsule-body 101 may at least substantially (mostly) surround an internal-volume, wherein this internal-volume may be configured to receive, house, and/or store waste-material(s). In some embodiments, the sidewall of waste-capsule-body 101 may structural, rigid, and fixed. In some embodiments, in an unassembled configuration, waste-capsule-body 101 may be open at its top and at its bottom. In some embodiments, in an assembled configuration, waste-capsule-body 101 may be capped at its top with plug 103 and capped at its bottom with plug 105. In some embodiments, waste-capsule-body 101 may be a specially-designed cylindrical-shaped device or tube that encloses an interior space, volume, or cavity in which various types of waste material may be loaded (received, held, or the like). In some embodiments, waste-capsule-body 101 may have outside diameters ranging from six (6) inches to fifteen (15) inches±1 inches, depending on the type of waste material and/or the outside dimensions of any SNF assemblies (or portions thereof) that the waste-capsules 100 may contain. Also, in these particular embodiments, the inner diameter of the cavity of a given waste-capsule-body 101 is dependent on both its outer diameter and its tubular wall thickness which may range from 0.25 inches to two (2) inches±0.125 inches. In some embodiments, the tubular wall thickness of a waste-capsule-body 101 may be based on mechanical performance properties which may be normally designed to safely withstand anticipated loads during the operational life of an assembled waste-capsule 100. In some embodiments, waste-capsules 100 may vary in length depending on type of waste material and/or the lengths of any SNF assemblies (or portions thereof) that the waste-capsules 100 may contain. In some embodiments, waste-capsules 100 may have lengths ranging from sixty (60) inches to 300 inches±1 inches. In some embodiments, waste-capsule-body 101 may be comprised of one or more metals and/or alloys, such as, but not limited to, steel.

Continuing discussing FIG. 1, in some embodiments, plug 103 may be a plug and/or a cap that may be configured to close-off (seal up) a top/upper portion 104 of waste-capsule-body 101. In some embodiments, plug 103 may be a top plug 103 and/or a top cap 103. In some embodiments, plug 103 may be attached to top/upper portion 104 of waste-capsule-body 101. In some embodiments, plug 103 may be attached to top/upper portion 104 terminal end of waste-capsule-body 101. In some embodiments, attachment between plug 103 and top/upper portion 104 terminal end of waste-capsule-body 101 may be intended as permanent attachment. In some embodiments, attachment between plug 103 and top/upper portion 104 terminal end of waste-capsule-body 101 may be intended as removable attachment. See FIG. 2A to FIG. 2E for additional details of plug 103.

Continuing discussing FIG. 1, in some embodiments, plug 105 may be a plug and/or a cap that may be configured to close-off (seal-up) a bottom/lower portion 106 of waste-capsule-body 101. In some embodiments, plug 105 may also be known as retrieval-end 105. In some embodiments, plug 105 may be a bottom plug 105 and/or a bottom cap 105. In some embodiments, plug 105 may be attached to bottom/lower portion 106 of waste-capsule-body 101. In some embodiments, plug 105 may be attached to bottom/lower portion 106 terminal end of waste-capsule-body 101. In some embodiments, attachment between plug 105 and bottom/lower portion 106 terminal end of waste-capsule-body 101 may be intended as permanent attachment. In some embodiments, attachment between plug 105 and bottom/lower portion 106 terminal end of waste-capsule-body 101 may be intended as removable attachment. In some embodiments, plug 103 and plug 105 may be disposed opposite from each other on opposite terminal ends of waste-capsule-body 101. See FIG. 3A to FIG. 3D for additional details of plug 105.

Figure 2A:
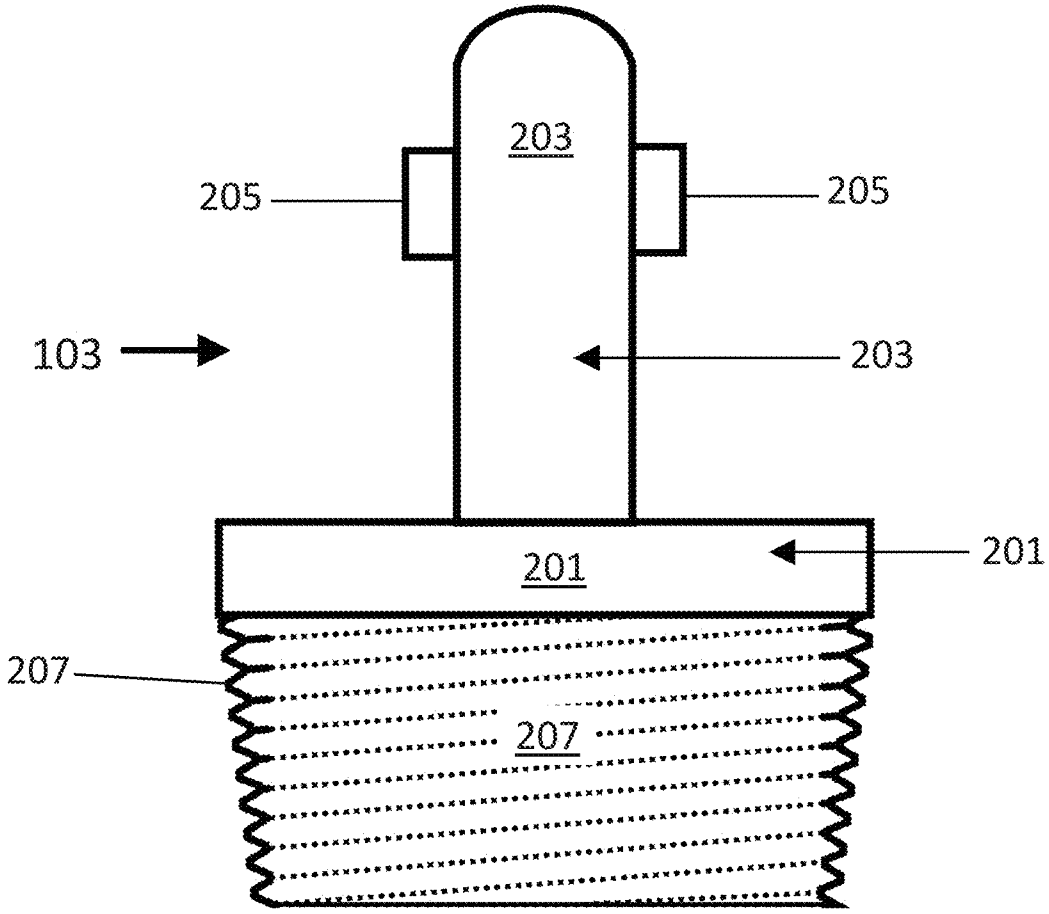
FIG. 2A may show a front/rear view of a top plug with an engagement device or apparatus that allows a retrievable-waste-capsule to be engaged from above by a J-slot(s).
Figure 2B:
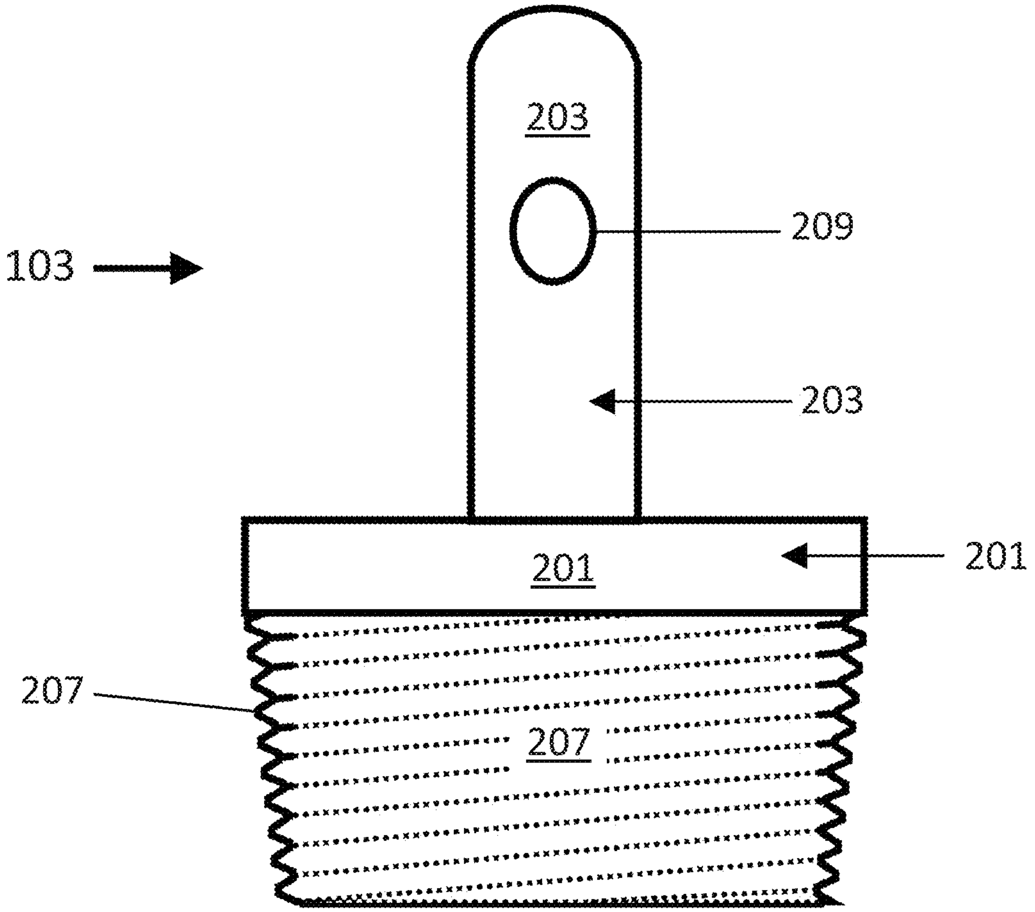
FIG. 2B depicts a sideview of a given top plug with at least one pin that may be oval and/or rounded in transverse-width cross-section.
Figure 2C:
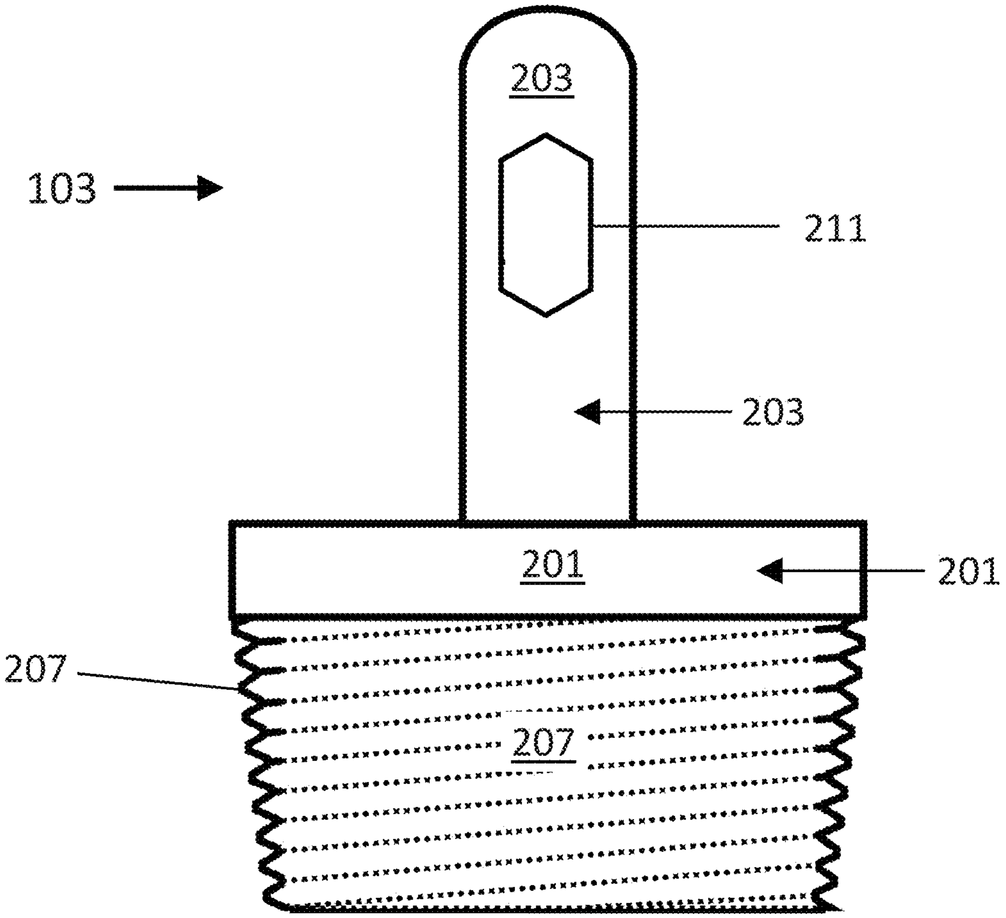
FIG. 2C depicts a sideview of a given top plug with at least one pin that may be angular (polygonal) in transverse-width cross-section.
Figure 2D:
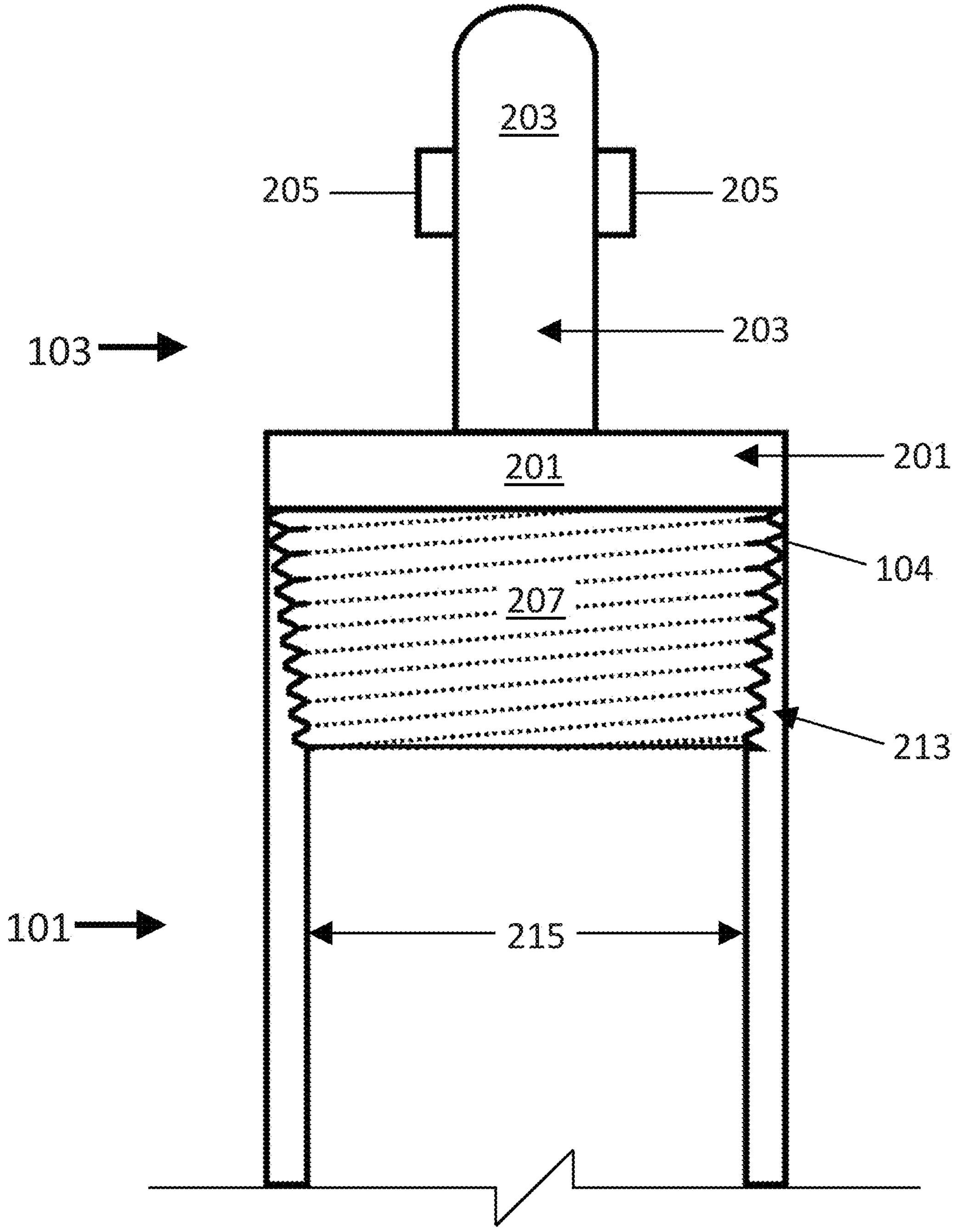
FIG. 2D depicts a partial lengthwise cross-sectional view through a portion of a given retrievable-waste-capsule, showing the cross-section through a top plug and through a (top/upper) portion of a waste-capsule-body.
Figure 2E:
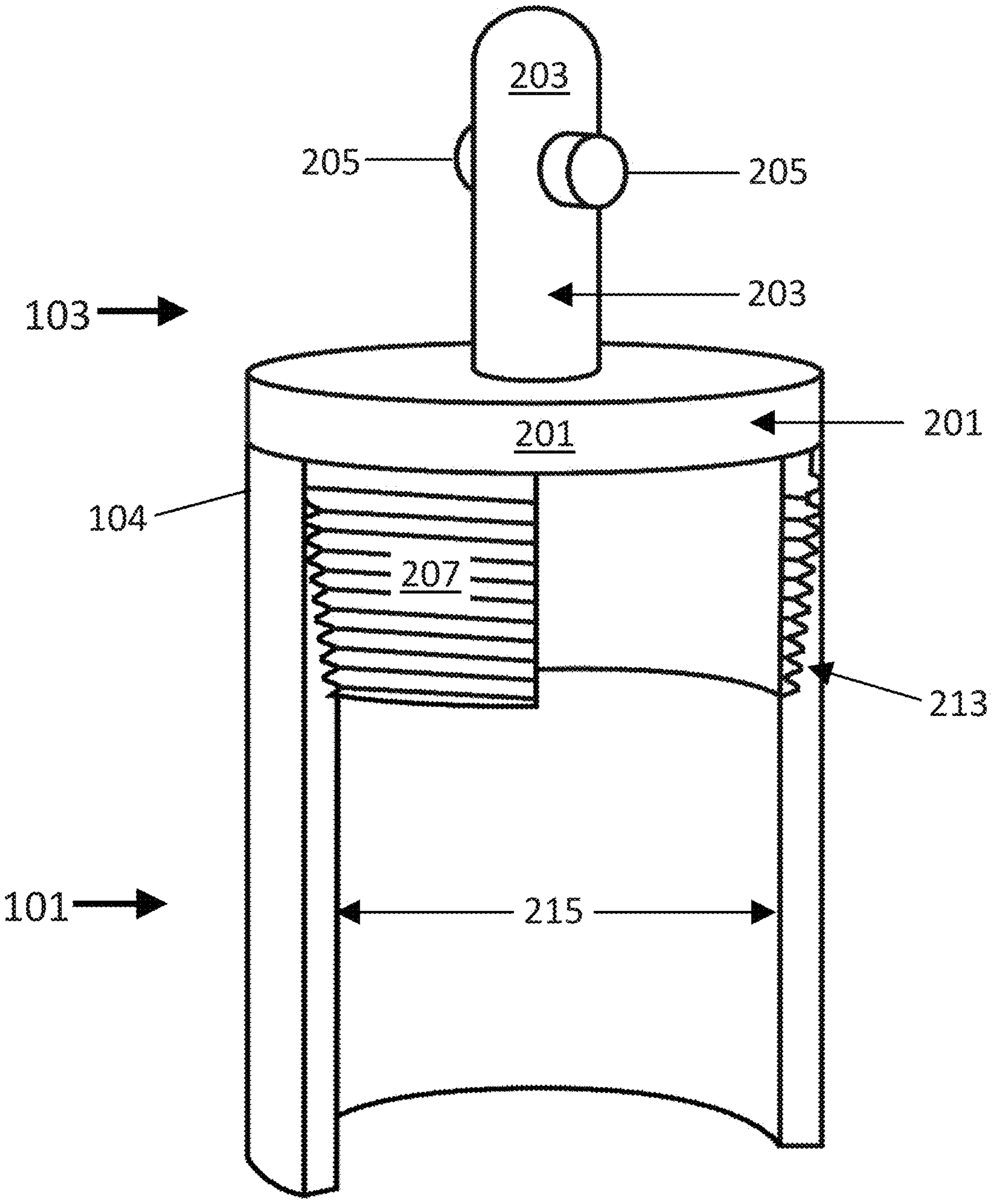
FIG. 2E depicts a partial perspective view, with a partial cut-away through a portion of a given retrievable-waste-capsule, showing portions of the top plug and of the waste-capsule-body cutaway (so that threads mating may be shown).
Figure 3A:
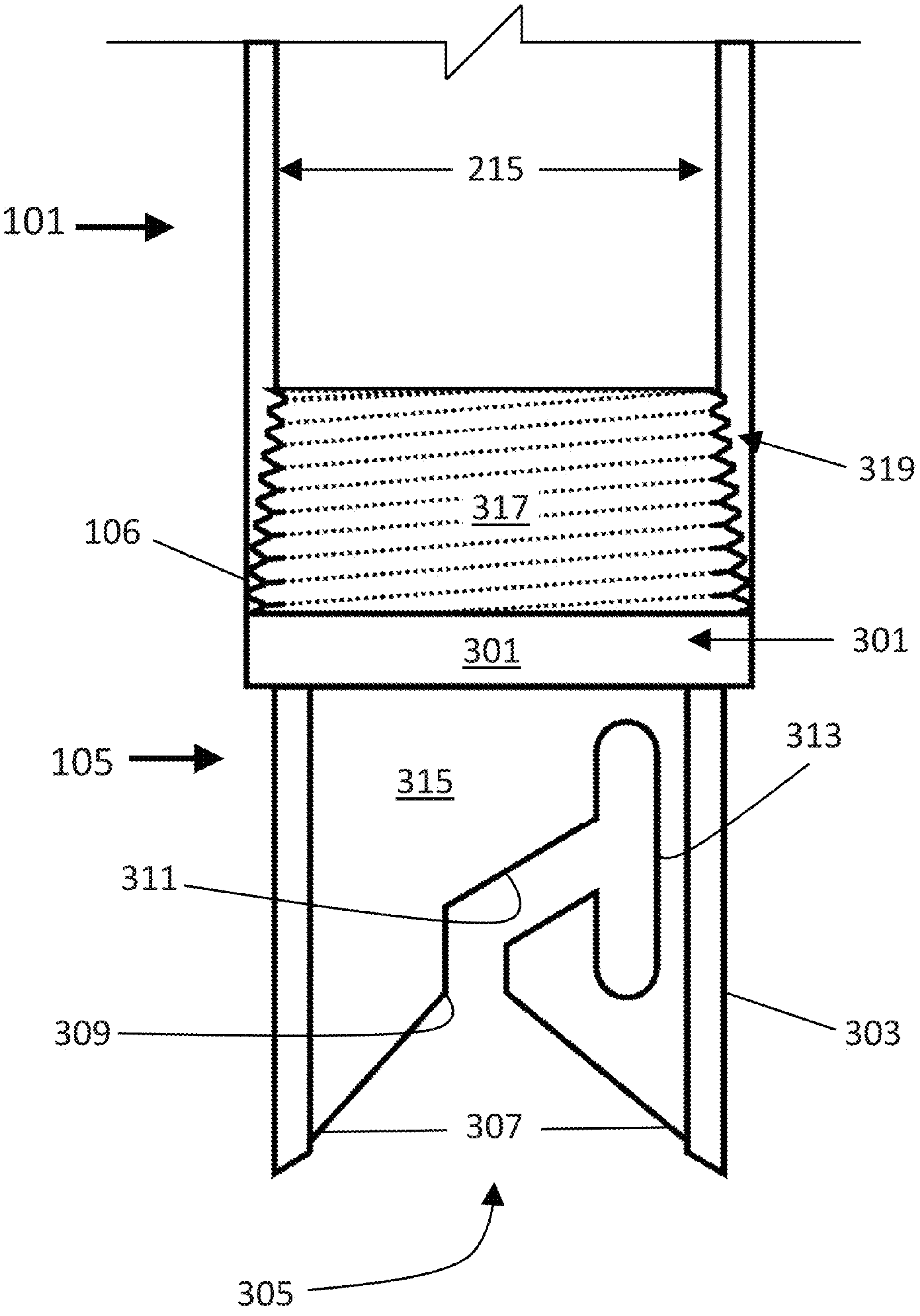
FIG. 3A depicts a partial lengthwise cross-sectional view through a portion of a given retrievable-waste-capsule, showing the cross-section through a bottom plug and through a (bottom/lower) portion of the waste-capsule-body.

FIG. 2A may show a front/rear view of top plug 103 with an engagement device or apparatus that allows a waste-capsule 100 to be engaged from above by a J-slots 305 retrieval structure on bottom plug 105 (see e.g., FIG. 3A for J-slots 305 retrieval structure). Note, this front or rear view of FIG. 2A may also be referred to as a sideview of FIG. 2A, since plug 103 is at least mostly radially symmetrical. In some embodiments, the upper portion of the top plug 103 may comprise a solid stinger 203, with two stinger-pins 205 protruding directly outward on opposite sides of stinger 203, with the stinger-pins 205 positioned (oriented and/or pointing) approximately 180 degrees from one another on the circumference of the stinger 203. In some embodiments, below stinger 203 may be a shoulder 201 of the top plug 103. In the embodiments shown in FIG. 2A, FIG. 2B, FIG. 2C, FIG. 2D, and in FIG. 2E, the top plug 103 may further comprise male threads 207 extending below shoulder 201, that may be configured to screw into and makeup onto female threads 213 at the upper section 104 of the waste-capsule-body 101 (e.g., as shown in FIG. 2D). In still other possible embodiments, the threads on the bottom of the top plug 103 may be female threads instead of male threads, and the threads at the upper section 104 of the waste-capsule-body 101 may be male threads instead of female threads.

Continuing discussing FIG. 2A, in some embodiments, stinger 203 may have only one stinger-pin 205. In still other embodiments, stinger 203 may have two or more stinger-pins 205, with the positions normally designed to achieve balanced loads. In some embodiments, stinger 203 may have an outer diameter ranging from two (2) inches to ten (10) inches±1 inches, depending on the outer diameter of waste-capsule 100, and also on the minimum yield strengths of stinger 203 and stinger-pins 205. In some embodiments, stinger-pins 205 may have various predetermined shapes with various predetermined dimensions, with some embodiments illustrated below in FIG. 2B and in FIG. 2C. In some embodiments, a distance that each stinger-pin 205 may protrude outwards from the body of stinger 203 may depend on depths of the slots or grooves of the J-slots 305 of plug 105 that stinger-pin 205 may engage with; plus a tolerance between stinger 203 and the J-slot sleeve 315. Some tolerance between the outer diameter of the body of stinger 203 and the inner diameter of the J-slot sleeve 315 may be required so that the J-slot sleeve 315 may easily pass over and engage the stinger 203 without interference between these two components. Moreover, some additional tolerance may be deliberately designed for these components in the present invention, in order to provide flexibility when these two devices or apparatus are engaged.

Continuing discussing FIG. 2A, in some embodiments plug 103, including its male (or female) threads 207, its shoulder 201, its stinger 203, and its stinger-pins 205, may be manufactured as an integral unit from a solid bar stock of high-strength steel or other type of high-strength metal(s) (or alloy) with a minimum yield strength ranging from 50,000 psi (pounds per square inch) to 150,000 psi. In other embodiments, some of the components of plug 103 may be welded onto some of its other components to form a given plug 103, as long as the resulting formed plug 103 meets the minimum yield strengths. As one example given here for illustrative purposes only, stinger 203 may also be welded onto shoulder 201 using some known, effective welding process and technique that will not compromise the strength and mechanical performance properties of the resulting plug 103, such as, but not limited to, one of the known flash welding processes and techniques, which are commonly used to weld tool joints with rotary-shouldered threaded connections onto drill pipe and other oilfield tubulars. As illustrated in the depictions of FIG. 2A, FIG. 2B, FIG. 2C, FIG. 2D, and FIG. 2E, shoulder 201 of plug 103 may have the same outer diameter as that of waste-capsule-body 101; although in some other embodiments, that outside diameter dimension may not be the same, and the outside diameter may be greater or the outside diameter may be smaller than the outer diameter of waste-capsule-body 101.

Continuing discussing FIG. 2A, in some embodiments, plug 103 may comprise male (or female) threads 207 that allow plug 103 to be securely connected to a compatible threaded connection (threads 213) in the upper part 104 of a waste-capsule-body 101 (see e.g., FIG. 2D). In these particular embodiments, the male (or female) threads 207 of plug 103 may include, but are not limited to, tapered or non-tapered threads, with V-shaped, square-shaped, wedge-shaped, or other types of thread profiles specifically designed for tubular products. In addition, the male (or female) threads 207 may have a thin coating of another type of material, including but not limited to, some sort of thin electroplated metal coating that is applied to the surface of the threads and is designed to minimize friction during makeup and to prevent metal bonding or seizing between male and female threads after makeup, which may hinder breaking out plug 103 from waste-capsule-body 101, whereby it might become difficult to remove the waste material loaded within waste-capsule-body 101 should that need arise in the future. In other embodiments, these threads 207 may instead be lubricated with some type of thread lubricant or similar compound to minimize friction during makeup and to prevent metal bonding or seizing between male and female threads after makeup. Nonetheless, in still other embodiments, the main pressure integrity at the threaded connection that is comprised of male and female threads 207 and 213, respectively, may be provided by one or more metal-to-metal seals between male and female threads 207 and 213, respectively.

Continuing discussing FIG. 2A, in some embodiments, plug 103 may comprise shoulder 201, stinger 203, stinger-pin 205, and threads 207. In some embodiments, a majority of plug 103 may be radially symmetrical. In some embodiments, shoulder 201 may be an annular disc, with stinger 203 protruding/extending from a top center of shoulder 201 and with threads 207 protruding/extending from a bottom of shoulder 201. In some embodiments, an outside diameter of shoulder 201 may be larger than outside diameters of stinger 203 and/or of threads 207. In some embodiments, stinger 203 and threads 207 may be disposed on opposite sides of shoulder 201. In some embodiments, with respect to a given waste-capsule 100 (in its assembled configuration) stinger 203 may extend away from waste-capsule-body 101 and away from plug 105; whereas, threads 207 may extend towards waste-capsule-body 101 and towards plug 105. In some embodiments, stinger 203 may be an elongate-member (of fixed and/or finite length) that protrudes and/or extends (linearly) from a top center of shoulder 201. In some embodiments, stinger-pin 205 may also be referred to as pin 205, lug 205, or dog 205. In some embodiments, stinger-pin 205 may be an elongate member that passes through (and at least partially protrudes from) a transverse-width (and/or diameter) of stinger 203. In some embodiments, a length of stinger 203 may be at least substantially (mostly) orthogonal (perpendicular) to a length of stinger-pin 205. In some embodiments, threads 207 may be male threads. In some embodiments, threads 207 may be configured to complementary attach to (female) threads 213 of top/upper portion 104 terminal end of waste-capsule-body 101. Note, threads 213 are shown in FIG. 2D.

FIG. 2B depicts a sideview of a given plug 103 with a pin 209 that may be oval and/or rounded in transverse-width cross-section. In some embodiments, pin 209 may be a type of stinger-pin 205. In some embodiments, a transverse-width cross-section through the length of pin 209 may be at least substantially (mostly) round, circular, or oval in shape. In this side view, plug 103 has been rotated ninety (90) degrees from the front/rear view that is depicted in FIG. 2A, and in this side view of FIG. 2B, stinger-pin 205 is shown to be an element with a cross section having an oval shape 209. In this particular embodiment, the dimensions of the cross section of the oval-shaped pin 209 may have a minor axis distance (or a horizontal width) that ranges from one (1) inch to four (4) inches±0.10 inches, depending upon the outer diameter of stinger 203 and the width of the slot or channel of the J-slot 305 in which the oval-shaped pin 209 is intended to travel in. The tolerance between the minor axis distance (or the horizontal width) of the oval-shaped pin 209 and the slot or channel of the J-slot 305 may range from 0.001 inches to 0.050 inches. The major axis distance (or the vertical length) of the oval-shaped pin 209 may be greater than its minor axis distance (or its horizontal width), in order to provide a larger cross-sectional area which may result in the oval-shaped pin 209 being able to withstand higher axial loads.

FIG. 2C depicts a sideview of a given plug 103 with a pin 211 that may be angular (polygonal) in transverse-width cross-section. In some embodiments, pin 211 may be a type of stinger-pin 205. In some embodiments, a transverse-width cross-section through the length of pin 211 may be at least substantially (mostly) polygonal and/or angular in shape. In this side view, plug 103 has been rotated ninety (90) degrees from the front/rear view that is depicted in FIG. 2A, and in this side view of FIG. 2C, stinger-pin 205 is shown to be an element with a cross section having an angular shape 211. In this particular embodiment, the dimensions of the cross section of the angular-shaped pin 211 may have a horizontal width that ranges from one (1) inch to four (4) inches±0.10 inches, depending upon the outer diameter of stinger 203 and the width of the slot or channel of the J-slot 305 in which the angular-shaped pin 211 may be intended to travel in. The tolerance between the horizontal width of the angular-shaped pin 211 and the slot or channel of the J-slot 305 may range from 0.001 inches to 0.05 inches. The vertical length of the angular-shaped pin 211 may be greater than its horizontal width, in order to provide a larger cross-sectional area which may result in the angular-shaped pin 211 being able to withstand higher axial loads.

FIG. 2D depicts a partial lengthwise cross-sectional view through a portion of a given waste-capsule 100, showing the cross-section through plug 103 and through a (top/upper) portion of waste-capsule-body 101. The top/upper end/portion 104 terminal end of waste-capsule-body 101 is shown in FIG. 2D. Not all of waste-capsule-body 101 is shown in FIG. 2D. For example, the bottom/lower end/portion 106 terminal end of waste-capsule-body 101 is not shown in FIG. 2D.

FIG. 2D shows how one embodiment of plug 103 may be attached to top/upper portion 104 terminal end of waste-capsule-body 101. In some embodiments, (male) threads 207 (of plug 103) may complementary attach to (female) threads 213 of top/upper portion 104 terminal end of waste-capsule-body 101. In some embodiments, waste-capsule-body 101 may comprise threads 213. In some embodiments, threads 213 may be located on and/or at top/upper portion 104 terminal end of waste-capsule-body 101. In some embodiments, threads 213 may be female threads located on an inside diameter portion of top/upper portion 104 terminal end of waste-capsule-body 101. In some embodiments, threads 207 and thread 213 may be configured to complementary attach to each other. In the depiction illustrated in FIG. 2D, the top plug 103 and the upper part 104 of the waste-capsule-body 101 are shown with male threads 207 of the top plug 103 made-up into female threads 213 of the upper part 104 of the waste-capsule-body 101.

Continuing discussing FIG. 2D, in some embodiments the top plug 103 may have male (or female) threads 207 that allow the top plug 103 to be screwed into and then made-up into compatible female (or male) threads 213 on the upper part 104 of waste-capsule-body 101. In these particular embodiments, the male (or female) threads 207 of plug and/or the female (or male) threads 213 of the upper section 104 of waste-capsule-body 101, may include, but are not limited to, tapered or non-tapered threads, with V-shaped, square-shaped, wedge-shaped, or other types of thread profiles specifically designed for tubular products. In addition, the male and female threads 207 and 213, respectively, may have a thin coating of another type of material, including but not limited to, some sort of thin electroplated metal coating that is applied to the surface of the threads and is designed to minimize friction during makeup and to prevent metal bonding or seizing between male and female threads after makeup, which may hinder breaking out the top plug 103 from waste-capsule-body 101, whereby it might become difficult to remove the waste material. In other possible embodiments, these threads (e.g., threads 207 and/or 213) may be lubricated with some type of thread lubricant or similar compound to minimize friction during makeup and/or to prevent metal bonding or seizing between male and female threads after makeup. Nonetheless, in some embodiments of this invention, a sufficient amount of pressure integrity may be provided by one or more metal-to-metal seals that may form whenever male and female threads 207 and 213, respectively, are fully made up.

As mentioned above, in still other possible embodiments, the threads on the bottom of the top plug 103 may be female threads instead of male threads, and the threads at the upper section 104 of the waste-capsule-body 101 may be male threads instead of female threads. In some embodiments, threads 207 may be female threads and threads 213 may be male threads, wherein this embodiment is not explicitly shown in FIG. 2D but is an otherwise obvious embodiment of what is shown in FIG. 2D and is expressly contemplated as an embodiment of the present invention.

Continuing discussing FIG. 2D, in some embodiments, waste-capsule-body 101 may comprise internal flush profile 215. In some embodiments, waste-capsule-body 101 may have an internal flush profile 215 which defines the space inside waste-capsule-body 101 that forms a cavity (within waste-capsule-body 101) that may be used to contain waste material.

FIG. 2E depicts a partial perspective view, with a partial cut-away through a portion of a given waste-capsule 100, showing portions of plug 103 and of waste-capsule-body 101 cutaway (so that threads 207 to threads 213 mating may be shown). The top/upper end/portion 104 terminal end of waste-capsule-body 101 is shown in FIG. 2E. Not all of waste-capsule-body 101 is shown in FIG. 2D. For example, the bottom/lower end/portion 106 terminal end of waste-capsule-body 101 is not shown in FIG. 2E.

FIG. 2E shows how one embodiment of plug 103 may be attached to top/upper portion 104 terminal end of waste-capsule-body 101. In some embodiments, (male) threads 207 may complementary attach to (female) threads 213 of top/upper portion 104 terminal end of waste-capsule-body 101.

FIG. 2E may show one particular embodiment that is similar to the embodiment depicted in FIG. 2D; although, herein in FIG. 2E additional space within waste-capsule-body 101 may be illustrated by depicting an external/internal flush threaded connection consisting of male threads 207 of top plug 103 made-up into the female threads 213 of the upper part 104 of waste-capsule-body 101. The additional space inside the top plug 103 due to the external/internal flush threaded connection (between threads 207 and 213) may result in a longer cavity in waste-capsule 100, and this extra length in the cavity of waste-capsule 100 may allow longer SNF assemblies (or portions thereof) to be loaded within that longer cavity, than would be possible without the external/internal flush profile of the threaded connection formed when the male and female threads 207 and 213 are made up. This additional waste-capsule 100 volumetric and length capacity may be beneficial in a disposal process wherein thousands of SNF assemblies need to be disposed of in a lateral wellbore system.

In still other possible embodiments, the threads on the bottom of the top plug 103 may be female threads instead of male threads; and the threads at the upper section 104 of waste-capsule-body 101 may be male threads instead of female threads, with the made-up threaded connection formed by these threads still having an external/internal flush profile. This variety of thread combinations allows for overall versatility in the operations of SNF disposal.

FIG. 3A depicts a partial lengthwise cross-sectional view through a portion of a given waste-capsule 100, showing the cross-section through plug 105 and through a (bottom/lower) portion of waste-capsule-body 101. The bottom/lower end/portion 106 terminal end of waste-capsule-body 101 is shown in FIG. 3A. Not all of waste-capsule-body 101 is shown in FIG. 3A. For example, the top/upper end/portion 104 terminal end of waste-capsule-body 101 is not shown in FIG. 3A. Recall, (bottom) plug 105 may also be referred to as (bottom) retrieval-end 105.

FIG. 3A may show a cross-sectional cutaway view of a J-slots 305 retrieval structures at the lower part of bottom plug 105, and these J-slots 305 may be used to engage the upper part of top plug 103, such a stinger 203 and/or stinger-pin(s) 205. Note, stinger 203 and/or its associated pin(s) 205 of a first waste-capsule 100 never engages the J-slot(s) 305 of that same first waste-capsule 100; rather, stinger 203 and/or its associated pin(s) 205 of the first waste-capsule 100, when engaged, are engaging the J-slot(s) 305 of a completely different waste-capsule 100. In some embodiments, plug 105 (retrieval-end 105) may comprise shoulder 301, lower-skirt 303, J-slot(s) 305, and threads 317. In some embodiments, bottom plug 105 may comprise, from top to bottom: (a) (male) threads 317, which are compatible with and may be made-up to the (female) threads 319 on the lower part 106 of waste-capsule-body 101; (b) a shoulder 301 of bottom plug 105 which, in this particular embodiment, may have the same outer diameter as the waste-capsule-body 101; (c) a lower-skirt 303 on bottom plug 105 which has a smaller outer diameter than the outside diameter of waste-capsule-body 101 and which encompasses and protects the J-slots 305 retrieval structures; (d) a J-slot sleeve 315 (sleeve-body 315) located within lower-skirt 303; J-slot(s) 305 retrieval structures formed within sleeve-body 315; portions thereof; combinations thereof; and/or the like. In some embodiments, plug 105 may comprise the J-slot(s) 305 retrieval structures and/or J-slot sleeve 315 (sleeve-body 315). In some embodiments, J-slots 305 may be formed in and/or from sleeve-body 315. In some embodiments, sleeve-body 315 (with J-slots 305) may be fitted within lower-skirt 303. In some embodiments, plug 105 may be without sleeve-body 315 and/or without J-slot(s) 305 retrieval structures (see e.g., FIG. 3C).

Continuing discussing FIG. 3A, in some embodiments, a majority of plug 105 may be radially symmetrical. In some embodiments, at least some of plug 105 may be radially symmetrical. In some embodiments, shoulder 301 may be a structural member. In some embodiments, shoulder 301 may be an annular disc, with lower-skirt 303 protruding/extending from a bottom of shoulder 301 and with threads 317 protruding/extending from a top of shoulder 301. In some embodiments, an outside diameter of shoulder 301 may be larger than outside diameters of lower-skirt 303 and/or of threads 317. In some embodiments, lower-skirt 303 and threads 317 may be disposed on opposite sides of shoulder 301. In some embodiments, with respect to a given waste-capsule 100 (in its assembled configuration) lower-skirt 303 may extend away from waste-capsule-body 101 and away from plug 103; whereas, threads 317 may extend towards waste-capsule-body 101 and towards plug 103. In some embodiments, lower-skirt 303 may be an elongate-member (of fixed and/or finite length) that protrudes and/or extends (linearly) from the bottom of shoulder 301. In some embodiments, lower-skirt 303 may be a (right) cylindrical member. In some embodiments, lower-skirt 303 may comprise a cylindrical sidewall.

Figure 3B:
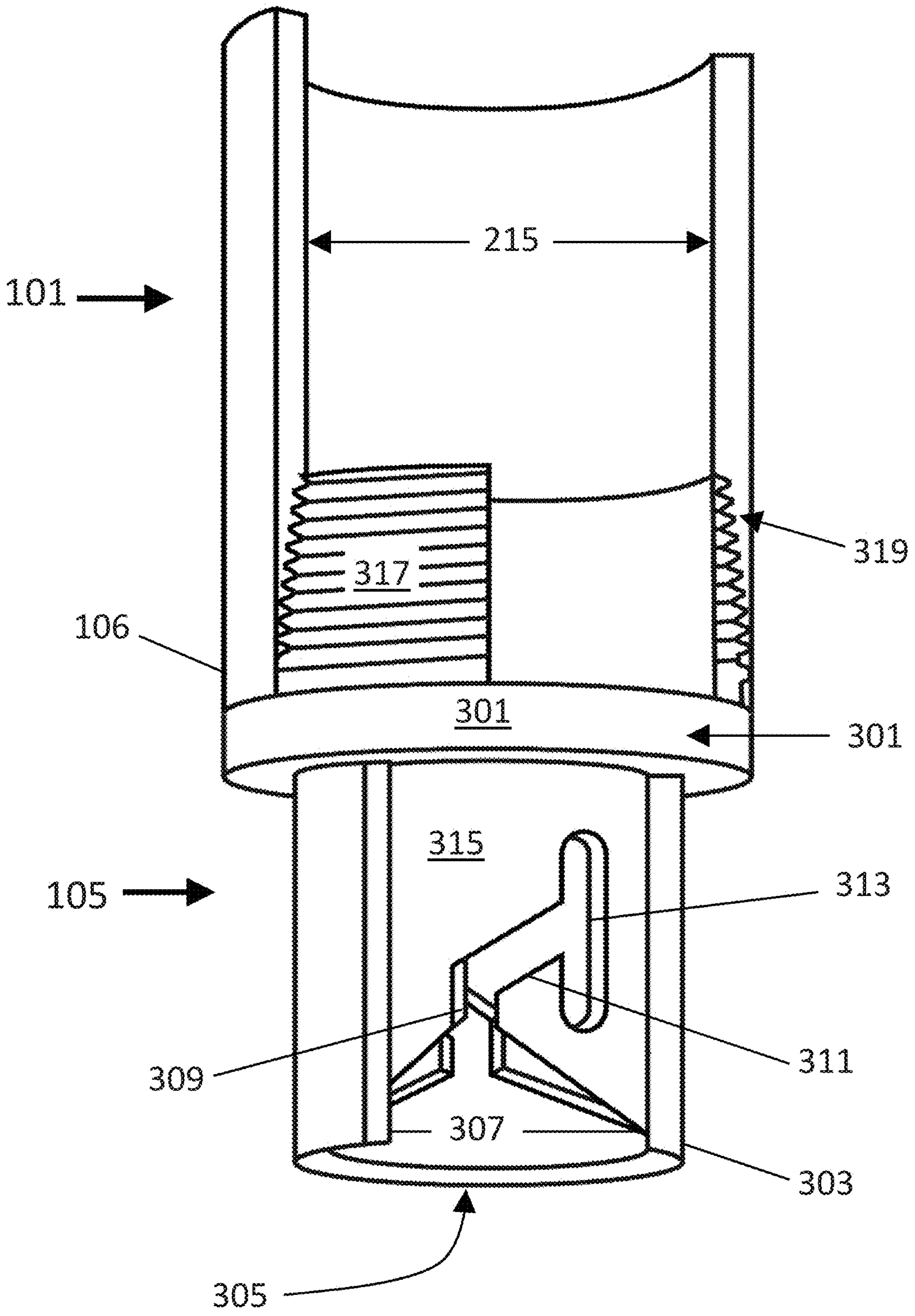
FIG. 3B depicts a partial perspective view, with a partial cut-away through a portion of a given retrievable-waste-capsule, showing portions of the bottom plug and of the waste-capsule-body cutaway.
Figure 3C:
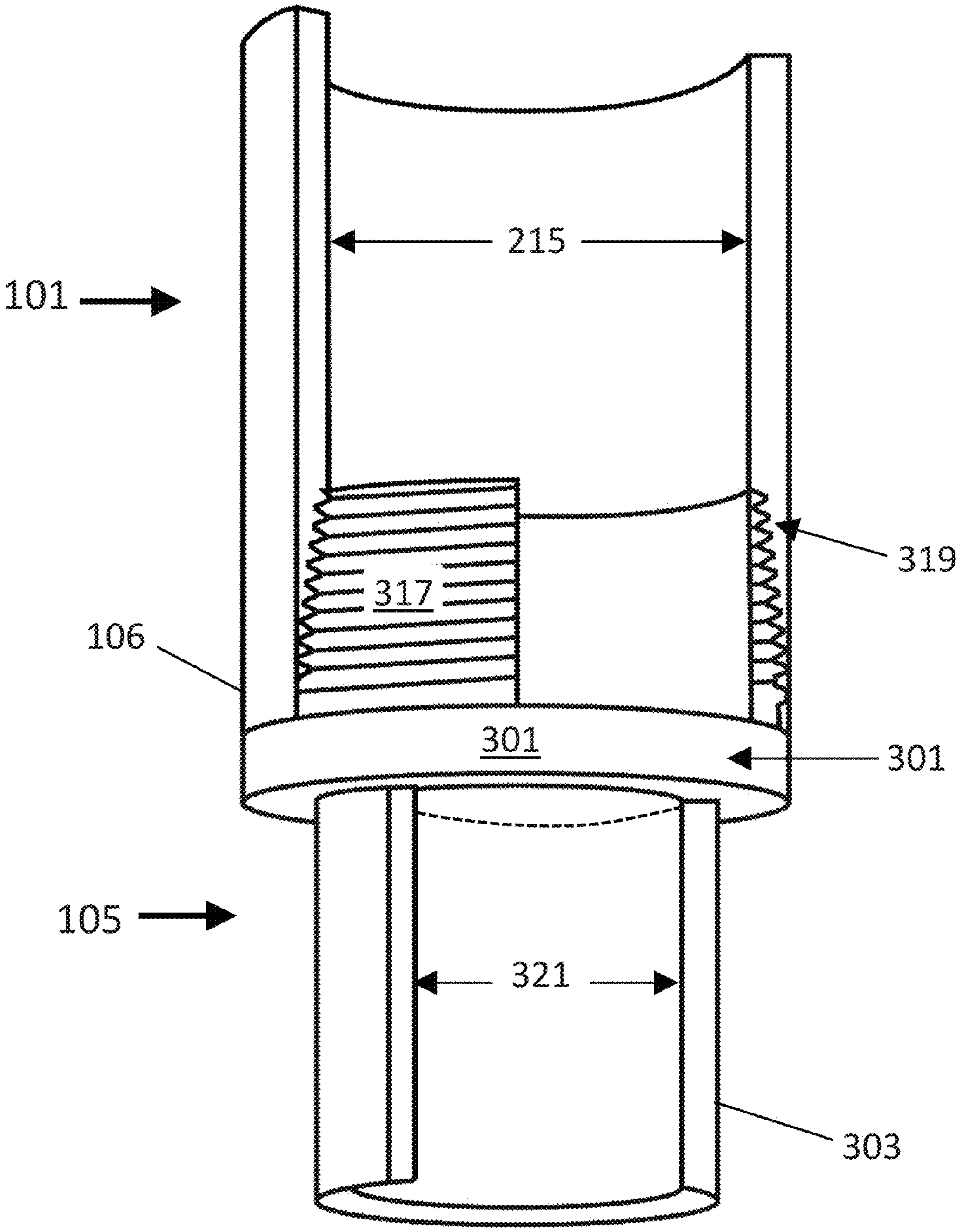
FIG. 3C depicts a partial perspective view, with a partial cut-away through a portion of a given retrievable-waste-capsule, showing portions of the bottom plug and of the waste-capsule-body cutaway.

As illustrated in FIG. 3A, FIG. 3B, and FIG. 3C, shoulder 301 of bottom plug 105 may have the same outer diameter as that of the waste-capsule body 101. Although in some other embodiments, the outside diameter of shoulder 301 may not be the same as the outside diameter of waste-capsule body 101. In some embodiments, the outside diameter of shoulder 301 may be larger or smaller than the outer diameter of the waste-capsule-body 101. In some embodiments, depending on the outer diameter of the waste-capsule-body 101, the lower skirt 303 may have an outer diameter ranging from five (5) inches to fourteen (14) inches±1 inches; and the lower skirt 303 may have a wall thickness ranging from 0.250 inches to 1.000 inches±0.125 inches. Normally the outer diameter of the lower skirt 303 will extend from 0.250 inches to one (1) inches±0.125 inches below the bottom of the J-slot sleeve 315. In some embodiments, the bottom of the lower-skirt 303 may be manufactured with a chamfer sloping inward that may act as a guide to allow stinger 203 (on top plug 103) of waste-capsule 100 to be more easily engaged by J-slots 305.

Continuing discussing FIG. 3A, in some embodiments, located within lower-skirt 303 may be at least one J-slot 305. In some embodiments, lower-skirt 303 may house and/or retain at least one J-slot 305. In some embodiments, lower-skirt 303 may house and/or retain one sleeve-body 315; and that sleeve-body 315 may have at least one J-slot 305. In some embodiments, a given J-slot 305 may be configured to (removably) engage with at least a portion of a given stinger 203. In some embodiments, a given J-slot 305 may be configured to (removably) attach to a given stinger-pin 205/209/211 portion that extends/protrudes out of stinger 203. In some embodiments, J-slot 305 may comprise guiding-opening 307, smaller-opening 309, diagonal-passage-section 311, parallel-section 313, and sleeve-body 315. In some embodiments, guiding-opening 307 may be connected to smaller-opening 309; smaller-opening 309 may be connected to diagonal-passage-section 311; and diagonal-passage-section 311 may be connected to parallel-section 313.

In some embodiments, guiding-opening 307 may be funnel shaped (frustrum shaped), V-shaped, portions thereof, combinations thereof, and/or the like, with a widest/largest inside diameter portion located furthest away from shoulder 301 and with a narrowest/smallest inside diameter portion located closer to shoulder 301. In some embodiments, the narrowest/smallest inside diameter portion of guiding-opening 307 may be smaller-opening 309 or the narrowest/smallest inside diameter portion of guiding-opening 307 may lead directly to (transition directly to) smaller-opening 309. In some embodiments, the decreasing inside diameter of guiding-opening 307 from furthest away from shoulder 301 towards smaller-opening 309, may be configured to help guide a portion of stinger-pin 205 into smaller-opening 309. In some embodiments, a length/height of guiding-opening 307 may be fixed, finite, and/or predetermined. In some embodiments, guiding-opening 307 may be visible from bottom views of plug 105, lower-skirt 303, and/or of J-slot 305 (see e.g., FIG. 3D). In some embodiments, guiding-opening 307 may be located closer to an outside of sleeve-body 315 and further away from the longitudinal/axial center of sleeve-body 315/lower-skirt 303. In some embodiments, guiding-opening 307 may be referred to as mouth 307 of J-slot 305.

Continuing discussing FIG. 3A, in some embodiments, smaller-opening 309 may be a round, oval, a circular cylindrical opening, and/or angular opening that leads to (is connected to) diagonal-passage-section 311. In some embodiments, to either side of a given smaller-opening 309 may be a guiding-opening 307. In some embodiments, guiding-opening 307 may be guide to and lead to smaller-opening 309. In some embodiments, a length/height of smaller-opening 309 may be parallel with a length/height of lower-skirt 303, plug 105, threads 317, and/or waste-capsule-body 101, with respect to a given waste-capsule 100 (in its assembled configuration). In some embodiments, the length of smaller-opening 309 may be fixed, finite, and/or predetermined. In some embodiments, with respect to a bottom view of plug 105, smaller-opening 309 may be located off-center of plug 105 (see e.g., FIG. 3D). In some embodiments, smaller-opening 309 may be visible from bottom views of plug 105, lower-skirt 303, and/or of J-slot 305. In some embodiments, an inside diameter (and/or transverse-width) of smaller-opening 309 may be sized and shaped to accommodate (receive) outside portions of stinger 203 and/or of pin 205/209/211.

In some embodiments, various slot/passage sections of a given J-slot 305 may allow access, passage, and/or movement within the given J-slot 305 to round, oval, and/or angular shaped pins or lugs.

Continuing discussing FIG. 3A, in some embodiments, diagonal-passage-section 311 may be a round, oval, a circular cylindrical passage, and/or an angular walled passage that leads to (is connected to) parallel-section 313 from smaller-opening 309. In some embodiments, a length of diagonal-passage-section 311 may be non-parallel (and not orthogonal) with a length/height of lower-skirt 303, plug 105, threads 317, and/or waste-capsule-body 101, with respect to a given waste-capsule 100 (in its assembled configuration). In some embodiments, the length of diagonal-passage-section 311 may be fixed, finite, and/or predetermined. In some embodiments, with respect to a bottom view of plug 105, diagonal-passage-section 311 may begin at smaller-opening 309 and then extend to parallel-section 313. In some embodiments, with respect to a bottom view of plug 105, diagonal-passage-section 311 may be located off-center of plug 105 (and/or off-center of lower-skirt 303, J-slot 305, sleeve-body 315) within sleeve-body 315. In some embodiments, a portion of diagonal-passage-section 311, that is connected to smaller-opening 309, may be visible from bottom views of plug 105, lower-skirt 303, and/or of J-slot 305; whereas, other (distal) portions of diagonal-passage-section 311 may not be visible from exterior portions of J-slot 305 and/or of sleeve-body 315. In some embodiments, an inside diameter (and/or transverse-width) of diagonal-passage-section 311 may be sized and shaped to accommodate (receive) outside portions of stinger 203 and/or of pin 205/209/211.

Continuing discussing FIG. 3A, in some embodiments, the only way to reach/access parallel-section 313 may be via connecting diagonal-passage-section 311. In some embodiments, parallel-section 313 may be a round, oval, a circular cylindrical, and/or an angular walled passage that is at least substantially (mostly) confined hollow volume configured for receiving at least a portion of a given stinger-pin 205. In some embodiments, a length of parallel-section 313 may be parallel with the length/height of lower-skirt 303, plug 105, threads 317, and/or waste-capsule-body 101, with respect to a given waste-capsule 100 (in its assembled configuration). In some embodiments, the length of parallel-section 313 may be fixed, finite, and/or predetermined. In some embodiments, with respect to a bottom view of plug 105, parallel-section 313 may be located off-center of plug 105 (and/or off-center of lower-skirt 303, J-slot 305, sleeve-body 315) within sleeve-body 315. In some embodiments, parallel-section 313 may be located entirely within sleeve-body 315. In some embodiments, parallel-section 313 may not be visible from exterior portions of J-slot 305 and/or of sleeve-body 315. In some embodiments, parallel-section 313 may not be visible from the bottom views of J-slot 305 and/or of sleeve-body 315. In some embodiments, an inside diameter (and/or transverse-width) of parallel-section 313 may be sized and shaped to accommodate (receive) outside portions of a given stinger-pin 205/209/211. In some embodiments, the length of smaller-opening 309 may be shorter than the lengths of guiding-opening 307, diagonal-passage-section 311, and/or parallel-section 313.

Continuing discussing FIG. 3A, in some embodiments, guiding-opening 307, smaller-opening 309, diagonal-passage-section 311, and parallel-section 313 may all be formed and/or located within sleeve-body 315. In some embodiments, sleeve-body 315 may be an otherwise solid cylindrical block of material that guiding-opening 307, smaller-opening 309, diagonal-passage-section 311, and parallel-section 313 are formed within/on. In some embodiments, an outside diameter of sleeve-body 315 may be configured to fit within an inside diameter of lower-skirt 303.

Continuing discussing FIG. 3A, in some embodiments, at least one J-slot 305 may be machined (formed and/or created) into (within) J-slot sleeve 315 (sleeve-body 315). In some embodiments, sleeve-body 315 may be manufactured from a solid bar stock of high-strength steel or other type of high-strength metal with a minimum yield strength ranging from 50,000 psi to 150,000 psi. In some embodiments, sleeve-body 315 may have a wall thickness that ranges from 0.500 inches to four (4) inches±0.125 inches, depending on the axial load requirements, the cross-sectional area of each of stinger-pin(s) 205, and/or the minimum yield strengths of sleeve-body 315 and/or of the stinger-pin(s) 205. In some embodiments, an inner diameter of sleeve-body 315 will in all cases be greater than the outer diameter of stinger 203 on the top plug 103 that is being engaged, and some tolerance between the outer diameter of the body of stinger 203 and the inner diameter of sleeve-body 315 may be required so that the sleeve-body 315 may easily pass over and engage the stinger 203 without interference between these two components. Moreover, some amount of additional tolerance may be deliberately designed and/or predetermined for some components of J-slot(s) 305 and/or of stinger 203 and/or its associated stinger-pin(s) 205, in order to provide flexibility when these different structures are engaged with each other.

Continuing discussing FIG. 3A, in some embodiments, sleeve-body 315 may comprise at least one J-slot 305. In some embodiments, sleeve-body 315 may comprise one or more J-slot(s) 305. In some embodiments, sleeve-body 315 may comprise two J-slots 305. In some embodiments, the two J-slots 305 of a given sleeve-body 315 may be oppositely disposed from each other within sleeve-body 315. In some embodiments, each J-slot 305 may comprise: one guiding-opening 307, one smaller-opening 309, one diagonal-passage-section 311, and one parallel-section 313; all of which may be formed within sleeve-body 315. In some embodiments, each guiding-opening 307 may have a V-shape configured to guide one of stinger-pin(s) 205 into the working portion of the J-slot 305, as the J-slot 305 is slacked off over stinger 203. As was mentioned above, if a given stinger 203 has more than one stinger-pin 205, then its stinger-pins 205 may be positioned around the circumference of the stinger 203 so that any significant axial loads that occur when emplacing or retrieving one or more waste-capsules 100 are closely balanced, whereby these axial loads are at least substantially (mostly) evenly distributed around the circumferences of the waste-capsule(s) 100. For instance, if a stinger 203 has two stinger pins 205, then these two stinger pins 205 may be positioned at least substantially (mostly) 180 degrees apart from each other, around the circumference of the stinger 203, with the two pins 205 also positioned at a same axial distance along the length of the stinger 203 (e.g., as shown in FIG. 2A). As another example, if a stinger 203 has three stinger pins 205, then these three stinger pins 205 may be positioned at least substantially (mostly) 120 degrees apart from each other, around the circumference of the stinger 203, with the three pins 205 also positioned at the same axial distance along the length of the stinger 203.

Figure 4A:
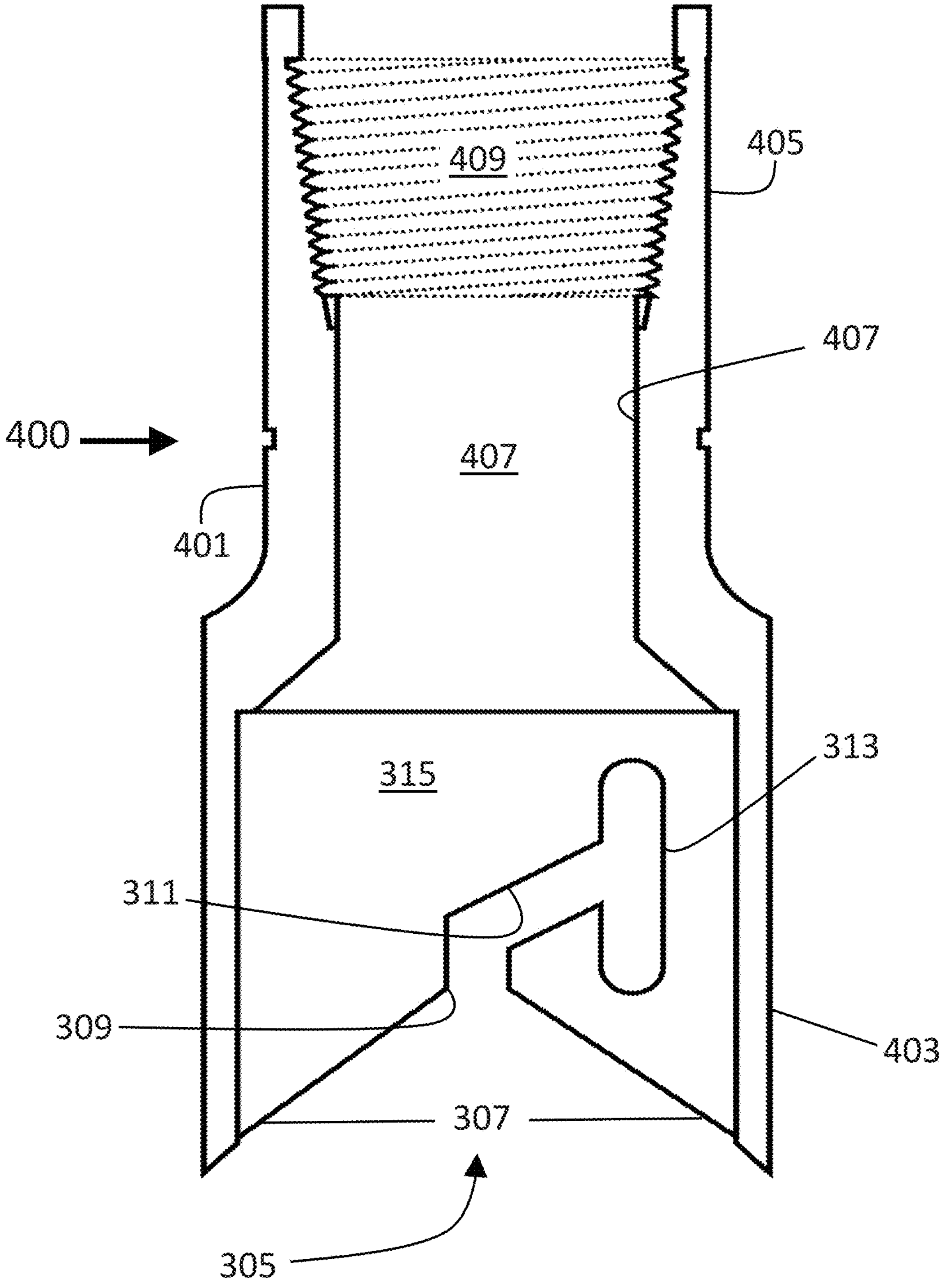
FIG. 4A depicts a lengthwise cross-sectional view through a retrieval-tool.

Continuing discussing FIG. 3A, in some embodiments, stinger-pin(s) 205 of a first waste-capsule 100 and J-slot(s) 305 of a second (different) waste-capsule 100 work together as an indexing device, apparatus, or system. In some embodiments, once stinger-pin 205 has entered the diagonal-passage-section 311 of a J-slot 305, then as the stinger-pin 205 travels up the diagonal-passage-section 311, a retrieval tool (such as, but not limited to, retrieval-tool 400) may rotate accordingly until that engaged stinger-pin 205 has entered the parallel-section 313. In some embodiments, whenever the retrieval tool is picked up, the lower part of the parallel-section 313 is pulled into the stinger pin 205 allowing the entire assembled waste-capsule 100 to be picked up as its weight is transferred to the load bearing surfaces of the lower part of the parallel-section 313 and the engaged stinger-pin 205. In some embodiments, the J-slot 305 configurations that are illustrated in FIG. 3A, FIG. 3B, FIG. 4A, and/or FIG. 4B may be termed as "right-hand" J-slots 305; that is, the retrieval tool or device may be rotated to the right (from an observer's perspective looking down a wellbore 600 from the surface) as the stinger-pins 205 move upward in the diagonal-passage-section 311, which occurs concurrently as the retrieval tool is slacked off over a stinger 203. Conversely, the J-slot 305 configurations that are depicted in FIG. 5A, FIG. 5B, FIG. 7B, FIG. 7C, and FIG. 9 may be termed as "left-hand" J-slots 305.

Note, J-slot(s) 305 may be complementary attachment structure to pin(s) 205, 209, 211, and/or 1105; i.e., J-slot(s) 305 may removably attach to/engage with pin(s) 205, 209, 211, and/or 1105.

Continuing discussing FIG. 3A, in some embodiments, bottom plug 105 may be connected to the lower part 106 of waste-capsule-body 101 with some type of threaded connection, such as, but not limited to, (male) threads 317 of plug 105 and (female) threads 319 of the lower part 106 of waste-capsule-body 101. In some embodiments, threads 317 may be male threads. In some embodiments, threads 317 may be configured to complementary attach to (female) threads 319 of bottom/lower end/portion 106 terminal end of waste-capsule-body 101. In some embodiments, the bottom plug 105 has male (or female) threads 317 that allow the bottom plug 105 to be securely connected to a compatible threaded connection in the lower part 106 of waste-capsule-body 101 (such as, but not limited to threads 319). In some embodiments, the male (or female) threads 317 of bottom plug 105 may include (comprise), but are not limited to, tapered or non-tapered threads, with V-shaped, square-shaped, wedge-shaped, or other types of thread profiles specifically designed for tubular products. In addition, the male (or female) threads 317 may have a thin coating of another type of material, including but not limited to, some sort of thin electroplated metal coating that is applied to the surface of the threads and is designed to minimize friction during makeup and to prevent metal bonding or seizing between male and female threads after makeup, which could hinder breaking out bottom plug 105 from waste-capsule-body 101. In other possible embodiments, these threads (such as, but not limited to, threads 317 and/or threads 319) may instead be lubricated with some type of thread lubricant or similar compound to minimize friction during makeup and to prevent metal bonding or seizing between male and female threads after makeup. Nonetheless, in some embodiments, a sufficient amount of pressure integrity may be provided by one or more metal-to-metal seals that may form whenever male and female threads 317 and 319, respectively, are fully made up.

In still other possible embodiments, the threads on the top of the bottom plug 105 may be female threads instead of male threads; and the threads at the lower section 106 of waste-capsule-body 101 may be male threads instead of female threads.

FIG. 3B depicts a partial perspective view, with a partial cut-away through a portion of a given waste-capsule 100, showing portions of plug 105 and of waste-capsule-body 101 cutaway. The bottom/lower end/portion 106 terminal end of waste-capsule-body 101 is shown in FIG. 3B. Not all of waste-capsule-body 101 is shown in FIG. 3B. For example, the top/upper end/portion 104 terminal end of waste-capsule-body 101 is not shown in FIG. 3B.

FIG. 3B is similar to the embodiment depicted in FIG. 3A, although some additional space within waste-capsule-body 101 may be illustrated in FIG. 3B with its depiction of an external/internal flush threaded connection consisting of male threads 317 of a bottom plug 105 made-up into the female threads 319 of the lower part 106 of the waste-capsule-body 101. The additional space inside the bottom plug 105, due to the external/internal flush threaded connection, may result in a longer cavity within waste-capsule 100; and this extra length in the cavity of waste-capsule 100 may allow longer SNF assemblies (or portions thereof) to be loaded within waste-capsule 100 than would otherwise be possible without the external/internal flush profile of the threaded connection formed when the male and female threads 317 and 319, respectively, are made up. This additional waste-capsule 100 volumetric and/or lengthwise capacity may be beneficial in a disposal process wherein thousands of SNF assemblies need to be disposed of in a lateral wellbore system.

In still other possible embodiments, the threads on the top of the bottom plug 105 may be female threads instead of male threads; and the threads at the lower section 106 of the waste-capsule-body 101 may be male threads instead of female threads, with the made-up threaded connection formed by these threads still having an external/internal flush profile. This variety of thread combinations allows for overall versatility in the operations of SNF disposal.

FIG. 3C depicts a partial perspective view, with a partial cut-away through a portion of a given waste-capsule 100, showing portions of plug 105 and of waste-capsule-body 101 cutaway. The bottom/lower end/portion 106 terminal end of waste-capsule-body 101 is shown in FIG. 3C. Not all of waste-capsule-body 101 is shown in FIG. 3C. For example, the top/upper end/portion 104 terminal end of waste-capsule-body 101 is not shown in FIG. 3C.

In FIG. 3C, J-slot 305 may not be shown. In FIG. 3C, J-slot 305 may be removed from inside of lower-skirt 303 of plug 105. FIG. 3C may show internal-smooth-profile 321 of lower-skirt 303. In some embodiments, internal-smooth-profile 321 may be configured to receive and/or attach to an outside diameter of sleeve-body 315 of J-slot 305. In some embodiments, sleeve-body 315 may be inserted and/or retained within internal-smooth-profile 321 of lower-skirt 303.

In some embodiments, threads 317 to threads 319 mating may be shown in FIG. 3A, in FIG. 3B, and/or in FIG. 3C.

Figure 3D:
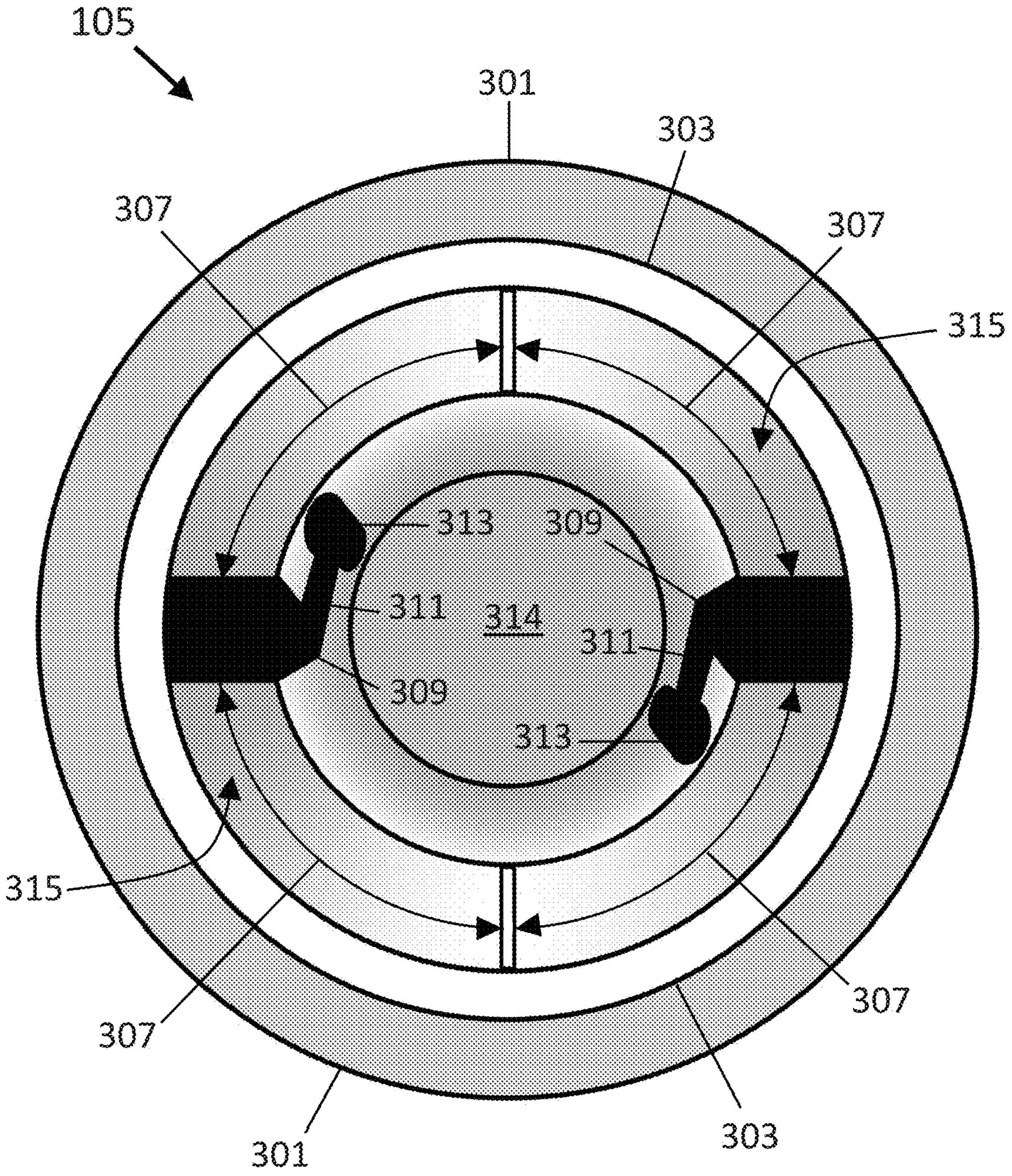
FIG. 3D depicts a bottom-up view (bottom view) of the bottom plug.

Alternatively, FIG. 3C may show a different embodiment of plug 105 as compared to plug 105 shown in FIG. 3A, FIG. 3B, and/or FIG. 3D. In some embodiments, instead of plug 105 including J-slot(s) 305 inside of lower-skirt 303 of the bottom plug 105, the embodiment of FIG. 3C may show that the lower-skirt 303 of bottom plug 105 has a smooth profile 321 along the internal/inside length of lower-skirt 303 and without any J-slot(s) 305 and/or sleeve-body 315. In some embodiments, this smooth profile 321 may be configured to allow the lower-skirt 303 to protect a given stinger 203 (and/or its associated stinger-pin(s) 205) at the top of a given waste-capsule 100 that has been emplaced immediately below the lower-skirt 303 with the smooth profile 321 of a different waste-capsule 100. Although waste-capsules 100 with bottom plugs 105 and with J-slot(s) 305 may engage and couple with waste-capsules 100 directly beneath them, a waste-capsule 100 with a bottom plug 105 with a lower-skirt 303 having a smooth profile 321 will not engage and couple with a waste-capsule 100 directly underneath. However, the smooth profile 321 on the lower-skirt 303 will protect the stinger 203 (and/or its associated stinger-pin(s) 205) on top of a waste-capsule 100 directly below. In some embodiments, the lower-skirt 303 with a smooth profile 321 may be preloaded with some type of anticorrosion agent, possibly incorporated into some type of gel or other cross-linked material, and then sealed inside the interior diameter of the lower-skirt 303 with a diaphragm or other type of flexible seal or rupturable containment device that will rupture when the lower-skirt 303 passes over stinger 203 on the top of a waste-capsule 100 directly below it, in order to cover or encapsulate that stinger 203 with some type of anticorrosive agent as an additional guard against possible corrosion for up to a predetermined quantity of years that the waste-capsule 100 (with waste therein) may be emplaced in the wellbore 600 before being retrieved from the wellbore 600. In some embodiments, this predetermined quantity of years may be fifty (50) years, 100 years, 500 years, 900 years, or some other quantity of years.

FIG. 3D depicts a bottom-up view (bottom view) of plug 105. An entirety of guiding-opening(s) 307 and/or of smaller-opening(s) 309 may be visible in FIG. 3D. However, only a portion of diagonal-passage-section 311 (the portion closest to smaller-opening 309) may be visible in FIG. 3D; and none of parallel-section 313 may be visible from FIG. 3D. In FIG. 3D, an exaggerated distance perspective may be depicted to show the various slot sections of the given J-slot 305; however, these features may not be easy to see from directly below without a person moving his/her head from side to side so that the view is slightly off axis. In some embodiments, guiding-opening 307 may be located closer to an outside of sleeve-body 315 and further away from the longitudinal/axial center of sleeve-body 315/lower-skirt 303. In some embodiments, to either side of a given smaller-opening 309 may be a guiding-opening 307. In some embodiments, with respect to a bottom view of plug 105, smaller-opening 309 may be located off-center of plug 105. In some embodiments, smaller-opening 309 may be visible from bottom views of plug 105, lower-skirt 303, and/or of J-slot 305. In some embodiments, an inside diameter (and/or transverse-width) of smaller-opening 309 may be sized and shaped to accommodate (receive) outside portions of stinger 203 and/or of pin 205/209/211. In some embodiments, with respect to a bottom view of plug 105, diagonal-passage-section 311 may be located off-center of plug 105 (and/or off-center of lower-skirt 303, J-slot 305, sleeve-body 315) within sleeve-body 315. In some embodiments, with respect to a bottom view of plug 105, parallel-section 313 may be located off-center of plug 105 (and/or off-center of lower-skirt 303, J-slot 305, sleeve-body 315) within sleeve-body 315.

Continuing discussing FIG. 3D, in some embodiments, sleeve-body 315 may comprise central-cavity 314. In some embodiments, central-cavity 314 may be central most indentation extending into sleeve-body 315 that is configured to receive the distal (terminal-end) of stinger 203. In some embodiments, central-cavity 314 may be deeper than stinger 203 is long.

FIG. 4A depicts a lengthwise cross-sectional view through a retrieval-tool 400. In some embodiments, retrieval-tool 400 may be a tool that is configured to retrieving waste-capsule(s) 100 from within wellbore(s) (e.g., wellbore 600). In some embodiments, J-slot retrieval-tool 400 may be a tool, device, or apparatus that may be made-up (attached) on the bottom of a drill string or work string or on some other type of hoisting equipment and/or handling device or apparatus, and which may be tripped into wellbore 600 (or other wellbore) to emplace or retrieve one or more waste-capsule(s) 100. In some embodiments, the drill string (or the work string or the like) is tripped in and tripped out of the wellbore 600 (or other wellbore) with a drilling rig (similar to an oil drilling rig), although this may also be accomplished by using other types of hoisting equipment and/or handling devices or apparatus. In some embodiments, the J-slot retrieval-tool 400 may be used at the terrestrial surface to install and makeup the top plug 103 onto a waste-capsule-body 101 after the waste material has been loaded or inserted inside of the waste-capsule-body 101. In some embodiments, the J-slot retrieval-tool 400 may be used to breakout and remove the top plug 103 so that the waste material may be removed from waste-capsule-body 101. In some embodiments, the J-slot retrieval-tool 400 may be used to handle waste-capsules 100 at the terrestrial surface, including but not limited to, removing waste capsules from cooling ponds, loading waste capsules into transport canisters, unloading waste capsules from transport canisters, placing waste capsules at or near a wellhead (such as, but not limited to, wellhead 707) where waste-capsules 100 may then be emplaced into wellbore 600 (or other wellbore) for (temporary) storage or permanent disposal of the waste materials (within the waste-capsules 100). In some embodiments, retrieval-tool 400 may be inserted into a given wellbore (e.g., wellbore 600) to (removably) attach to a given waste-capsule 100 located within that wellbore. In some embodiments, once a given retrieval-tool 400 may be (removably) attached to at least one waste-capsule 100, that retrieval-tool 400 may be used to retrieve that at least one waste-capsule 100 from within the given wellbore. In some embodiments, retrieval-tool 400 may be configured to (removably) attach to a stinger 203 and/or to a stinger-pin(s) 205/209/211 of that stinger 203. In some embodiments, retrieval-tool 400 may be a structural member, that is sized, shaped, and built from material(s) of construction capable of supporting loads associated with a string of loaded/full linked-waste-capsules 605 (see FIG. 6 for linked-waste-capsules 605).

Continuing discussing FIG. 4A, in some embodiments, retrieval-tool 400 may comprise sidewall 401, J-slot-connection-end 403 (lower-skirt 403), driver-connection-end 405 (upper body 405), internal-profile 407, and threads 409. In some embodiments, retrieval-tool 400 may be an elongate cylindrical member with exterior sidewall 401. In some embodiments, exterior diameters of retrieval-tool 400 may vary along a length of retrieval-tool 400, but the diameters of retrieval-tool 400 may always be fixed, finite, and/or predetermined. In some embodiments, J-slot-connection-end 403 and driver-connection-end 405 may be associated with respective opposite terminal ends of retrieval-tool 400 (and/or of sidewall 401). In some embodiments, J-slot-connection-end 403 and driver-connection-end 405 may be disposed opposite from each other on retrieval-tool 400 (and/or on sidewall 401). In some embodiments, J-slot-connection-end 403 may be associated with a bottom/lower portion of retrieval-tool 400 (and/or of sidewall 401). In some embodiments, driver-connection-end 405 may be associated with a top/upper portion of retrieval-tool 400 (and/or of sidewall 401).

Continuing discussing FIG. 4A, in some embodiments, retrieval-tool 400 may comprise J-slot-connection-end 403, which may be configured to (removably) attach to a stinger 203 and/or to a stinger-pin(s) 205/209/211. In some embodiments, J-slot-connection-end 403 may function as J-slot(s) 305. In some embodiments, J-slot-connection-end 403 may comprise structures and/or geometry at least substantially (mostly) similar as J-slot(s) 305 and/or as sleeve-body 315. In some embodiments, J-slot-connection-end 403 may comprise at least one J-slot 305 and/or a sleeve-body 315. In some embodiments, a sleeve-body 315 may be inserted and/or retained within J-slot-connection-end 403. In some embodiments, the lower-skirt 403 (J-slot-connection-end 403) may be an integral part of the J-slot retrieval-tool 400; although, lower-skirt 403 may otherwise be identical to the lower-skirt 303 with the J-slot(s) 305 on the bottom plug 105 as depicted in FIG. 3A. Moreover, in some embodiments, the J-slot(s) 305 of J-slot retrieval-tool 400, including all its features, such as, but not limited to, sleeve-body 315, parallel-section 313, diagonal-passage-section 311, smaller-opening 309, and guiding-opening 307, may be identical to those same structures/features that are depicted in FIG. 3A. Moreover, the operations, functions, and/or workings of the various components of the J-slot(s) 305 on the bottom of the J-slot retrieval-tool 400 may have the same or may have similar corresponding operations, functions, and/or workings as the operations, functions, and/or workings for the J-slot(s) 305 on the lower part of the bottom plug, which are described and discussed above in the discussion of FIG. 3A.

Figure 9:
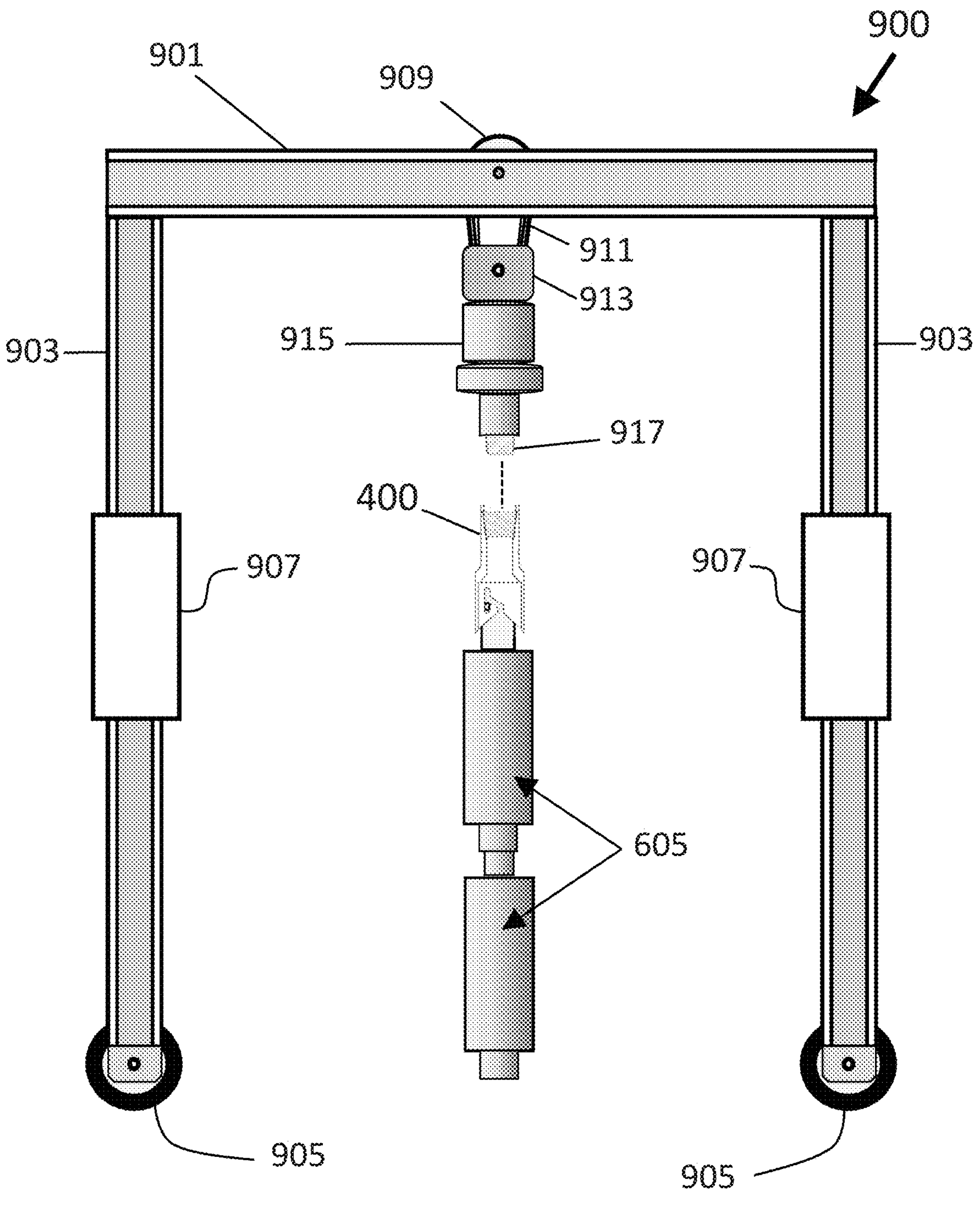
FIG. 9 depicts a schematic sideview of a mobile-gantry-crane, that may be configured to transport, manipulate, handle, hoist, and/or retrieve retrievable-waste-capsule(s) over the terrestrial ground/surface.

Continuing discussing FIG. 4A, in some embodiments, driver-connection-end 405 may be configured for (removable) attachment to another device, apparatus, and/or tool, such as, but not limited to, a driver 915 tool (shown in FIG. 9). In some embodiments, driver-connection-end 405 may comprise threads 409. In some embodiments, threads 409 may be located on an inside portion of driver-connection-end 405. In some embodiments, threads 409 may be female threads. In some embodiments, threads 409 may be configured for (removable) attachment to complementary threads of another device, apparatus, and/or tool, such as, but not limited to, threads 917 (shown in FIG. 9). In some embodiments, the upper body 405 (driver-connection-end 405) of the J-slot retrieval-tool 400, may have female threads 409. In other embodiments the threads of the upper body 405 may be male threads. In some embodiments, the threads 409 are a type of commonly-used oilfield rotary-shouldered connection that is compatible with the oilfield rotary-shouldered connections in the drill string or work string or in some type of suitable change-over sub that may be used to connect two different threaded connections together.

Continuing discussing FIG. 4A, in some embodiments, retrieval-tool 400 may comprise internal-profile 407. In some embodiments, disposed on an inside of sidewall 401 may be internal-profile 407. In some embodiments, internal-profile 407 may be an internal surface profile of retrieval-tool 400 and/or of sidewall 401. In some embodiments, interior diameters of internal-profile 407 may vary along the length of retrieval-tool 400, but the interior diameters of internal-profile 407 may always be fixed, finite, and/or predetermined. In some embodiments, at J-slot-connection-end 403, internal-profile 407 may be sized and shaped to receive and/or to retain sleeve-body 315. In some embodiments, at J-slot-connection-end 403, internal-profile 407 may be sized and shaped to receive and/or to retain J-slot(s) 305. In some embodiments, at driver-connection-end 405, internal-profile 407 may be sized and/or shaped into threads 409.

Figure 4B:
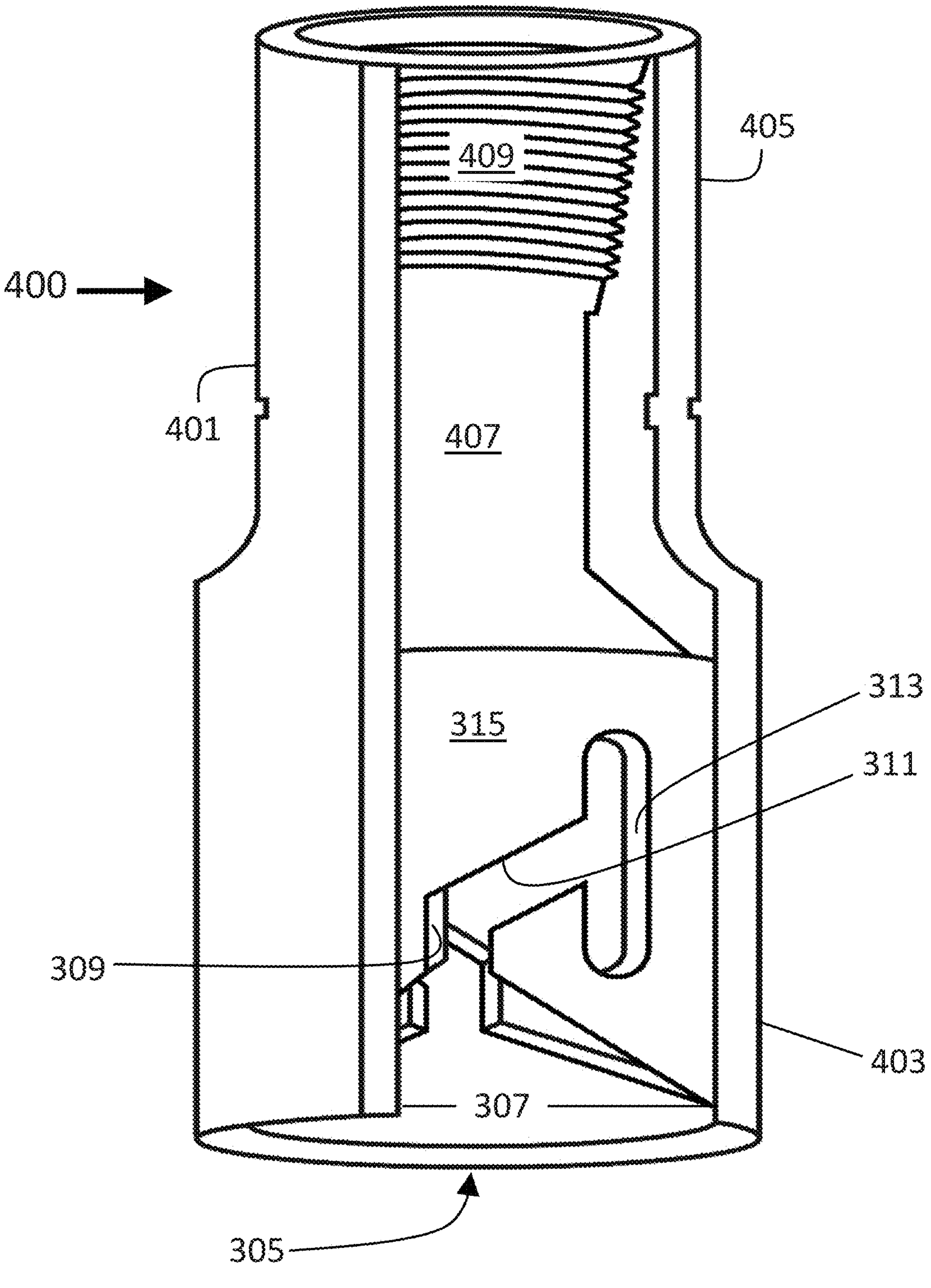
FIG. 4B depicts a lengthwise perspective view of the retrievable-tool, with a portion of a sidewall cutaway to reveal internal structures of the retrievable-tool.

FIG. 4B depicts a lengthwise perspective view of retrievable-tool 400, with a portion of sidewall 401 cutaway to reveal internal structures of retrievable-tool 400. The embodiment of FIG. 4B may be similar to the embodiment depicted in FIG. 4A in all respects, except that in FIG. 4B the relative wall thickness of the lower-skirt 403 and the relative wall thickness of the sleeve-body 315 may be shown.

Figure 5A:
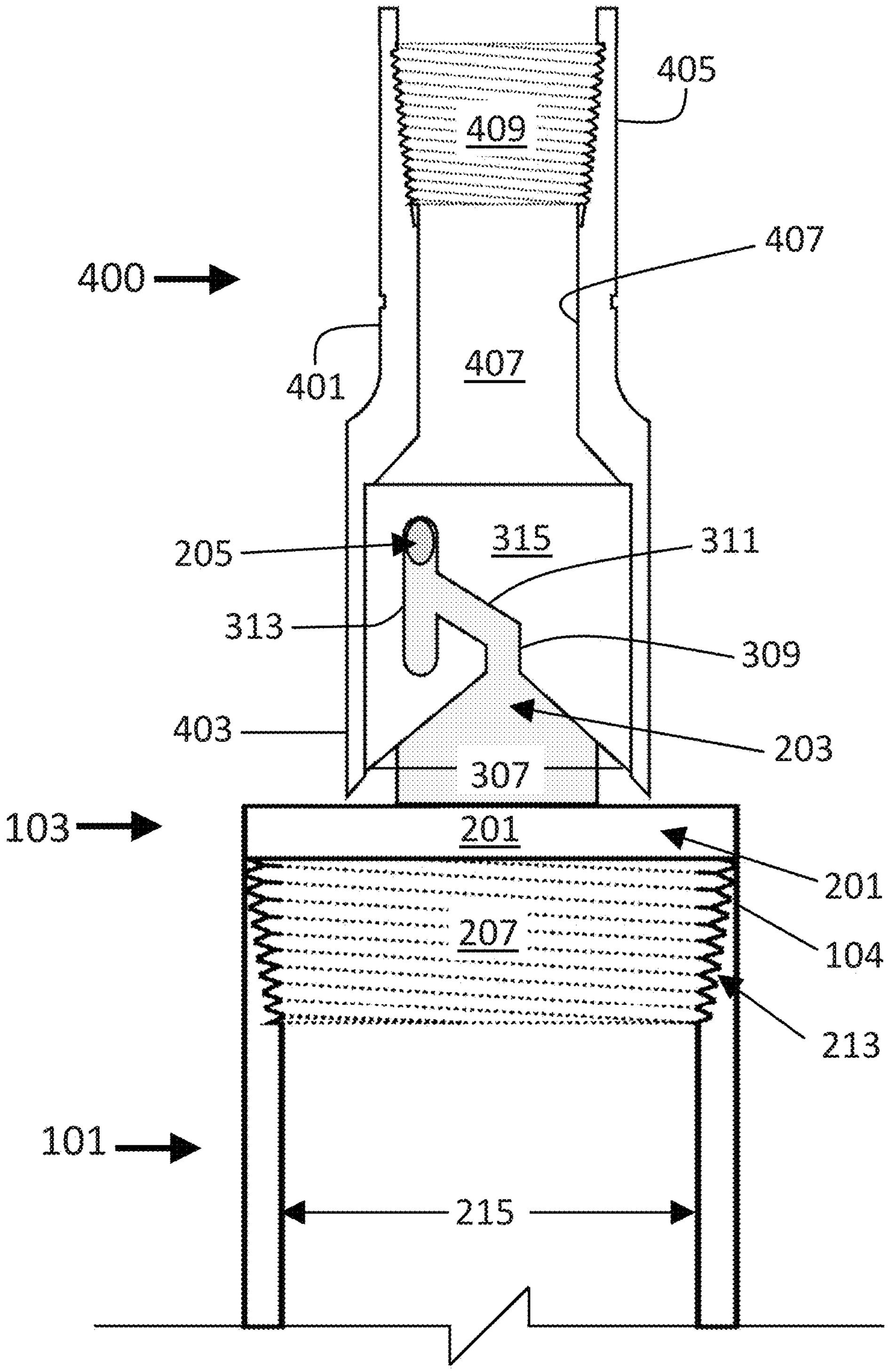
FIG. 5A depicts a partial lengthwise cross-sectional view through a portion of a given retrievable-waste-capsule and an attached retrieval-tool, showing the cross-section through the top plug, through a (top/upper) portion of the waste-capsule-body, and through the retrievable-tool.

FIG. 5A depicts a partial lengthwise cross-sectional view through a portion of a given waste-capsule 100 and an attached retrieval-tool 400, showing the cross-section through plug 103, through a (top/upper) portion of waste-capsule-body 101, and through retrievable-tool 400. FIG. 5A shows at least a portion of stinger 203 and/or of pin 205/209/211 being (removably) retained within J-slot 305 of retrieval-tool 400, such that retrieval-tool 400 is (removably) attached to that given waste-capsule 100. In FIG. 5A, pin 205/209/211 is shown retained within (a top portion of) parallel-section 313 of J-slot 305 of retrieval-tool 400. FIG. 5A may show a cross-sectional cutaway partial lengthwise view of a "left-hand" J-slot retrieval-tool 400 that has passed over and has engaged a stinger 203 of a top plug, which itself has been made-up into the upper section 104 of a waste-capsule-body 101, of a waste-capsule 100. FIG. 5A is a partial view because not all of waste-capsule 100 is shown in FIG. 5A; e.g., the lower-portion 106 of waste-capsule-body 101 is not shown in FIG. 5A. However, the entire length of that J-slot retrieval-tool 400 is shown in FIG. 5A. Although, in some embodiments, a given stinger 203 may have more than one stinger-pin 205 and a J-slot retrieval-tool 400 may have more than one J-slot 305, in order to better illustrate the operations, functions, and/or workings of some of the embodiments of the present invention, the cross-sectional cutaway view of FIG. 5A may show the configuration of a single stinger-pin 205 within a single J-slot 305 of that given retrieval-tool 400.

Continuing discussing FIG. 5A, in some embodiments, engagement of a given waste-capsule 100 from above by a J-slot retrieval-tool 400 may proceed in the following manner. In some embodiments, when using the J-slot retrieval-tool 400 to retrieve one or more waste-capsules 100, the J-slot retrieval-tool 400 may be made up on (attached to) a drill string or work string (not shown in FIG. 5A). In some embodiments, then the J-slot retrieval-tool 400 may be tripped in (inserted into) a given wellbore 600 with a drilling rig, or with some other type of hoisting equipment and/or handling device or apparatus. In some embodiments, once the J-slot retrieval-tool 400 has tagged, touched, and/or physically encountered a top most stinger 203 of a top most waste-capsule 100 that has been previously emplaced in that wellbore 600, the lower-skirt 403 (J-slot-connection-end 403), as well as the J-slot-sleeve 315 (sleeve-body 315) of the J-slot retrieval-tool 400 may then pass over that stinger 203. In some embodiments, each of the stinger-pin(s) 205 may then enter an opening or mouth 307 (guiding-opening 307) of a corresponding J-slot 305 of that sleeve-body 315. In some embodiments, as the J-slot retrieval-tool 400 is slacked off further over that stinger 203, each of the stinger-pins 205 may enter and proceed laterally along a diagonal-passage-section 311 of a corresponding J-slot 305. In some embodiments, this lateral movement involved in this action may cause the J-slot retrieval-tool 400 to rotate to the left for a "left-hand" J-slot retrieval-tool 400, as is illustrated in FIG. 5A. Conversely, a "right-hand" J-slot retrieval-tool 400 may be caused to rotate to the right as the stinger-pin(s) 205 proceed laterally along a diagonal-passage-section 311. Right-hand rotation is clockwise rotation when looking from above. Left-hand rotation is counter-clockwise rotation when looking from above. Note, in general oilfield use, right-hand rotation and left-hand rotation, as terms of art, are used rather than clockwise or counterclockwise. In some embodiments, this lateral movement involved in this action may cause the J-slot retrieval-tool 400 to rotate counter-clockwise for a "left-hand" J-slot retrieval-tool 400, as illustrated in FIG. 5A. Conversely, a "right-hand" J-slot retrieval tool 400 may be caused to rotate clockwise as the stinger-pin(s) 205 proceed laterally along a diagonal-passage-section 311. In some embodiments, as the J-slot retrieval-tool 400 is slacked off further over that stinger 203, each of the stinger-pins 205 may then enter the parallel-section 313 of the given corresponding J-slot 305. In some embodiments, the cross-sectional cutaway partial lengthwise view of FIG. 5A shows the configuration of one J-slot 305 with respect to one stinger-pin 205 at the moment when the J-slot retrieval-tool 400 has been completely slacked off over that stinger 203 with that stinger-pin 205 shown positioned at the top of that parallel-section 313 of that given corresponding J-slot 305.

Continuing discussing FIG. 5A, in some embodiments, the J-slot retrieval-tool 400 that is illustrated in FIG. 5A may be rotated to the left by applying left-hand torque. In some embodiments, when a sufficient amount of left-hand torque has been applied to the J-slot retrieval-tool 400, the threaded connection between the bottom of the top plug 103 and a waste-capsule body 101 may be broken out (unfastened, detached, or the like). In some embodiments, as the J-slot retrieval-tool 400 is rotated additional turns to the left, the threads 207 at the bottom of the top plug 103 may become unscrewed from the threads 213 of the upper section 104 of that waste-capsule-body 101. In some embodiments, the top plug 103 may then be removed from the top of that waste-capsule-body 101 by picking it up with the J-slot removal-tool 400. In some embodiments, this may allow the waste material to be removed from inside of that waste-capsule-body 101.

Continuing discussing FIG. 5A, in some embodiments, one or more waste-capsules 100 may already be emplaced in a given wellbore 600. In some embodiments, as described above, a J-slot retrieval-tool 400 made up on a drill string or work string (or the like) may be used to engage a given top most stinger 203 of a top most waste-capsule 100 within that wellbore 600. However, instead of retrieving one or more assembled waste-capsules 100, the top plug 103 may be broken out, unscrewed, and removed so that waste material may be removed from inside that uppermost waste-capsule-body 101 while that waste-capsule 100 may still be inside of that wellbore 600. In this embodiment, left-hand torque, as well as axial force, may be applied by surface equipment, then transmitted via the drill string or work string (or the like) to the J-slot retrieval-tool 400. Although the cross-sectional cutaway view of FIG. 5A depicts a "left-hand" J-slot retrieval-tool 400 and the threads 207 of the top plug 103 are right-hand male threads, and the threads 213 of the upper 104 waste-capsule-body 101 are complementary right-hand female threads, other embodiments may include combinations of either "left-hand" or "right-hand" J-slot retrieval-tools 400, and the threads 207 and 213 may be either female or male and/or the threads 207 and 213 may be either right-hand or left-hand threads. In addition, as has been discussed in the FIG. 2E discussion, the threads 207 on the top plug 103 may have internal flush profile 215 along the length of the threads 207 which may provide additional space resulting in a longer cavity to contain the waste material within the cavity of waste-capsule-body 101.

Figure 5B:
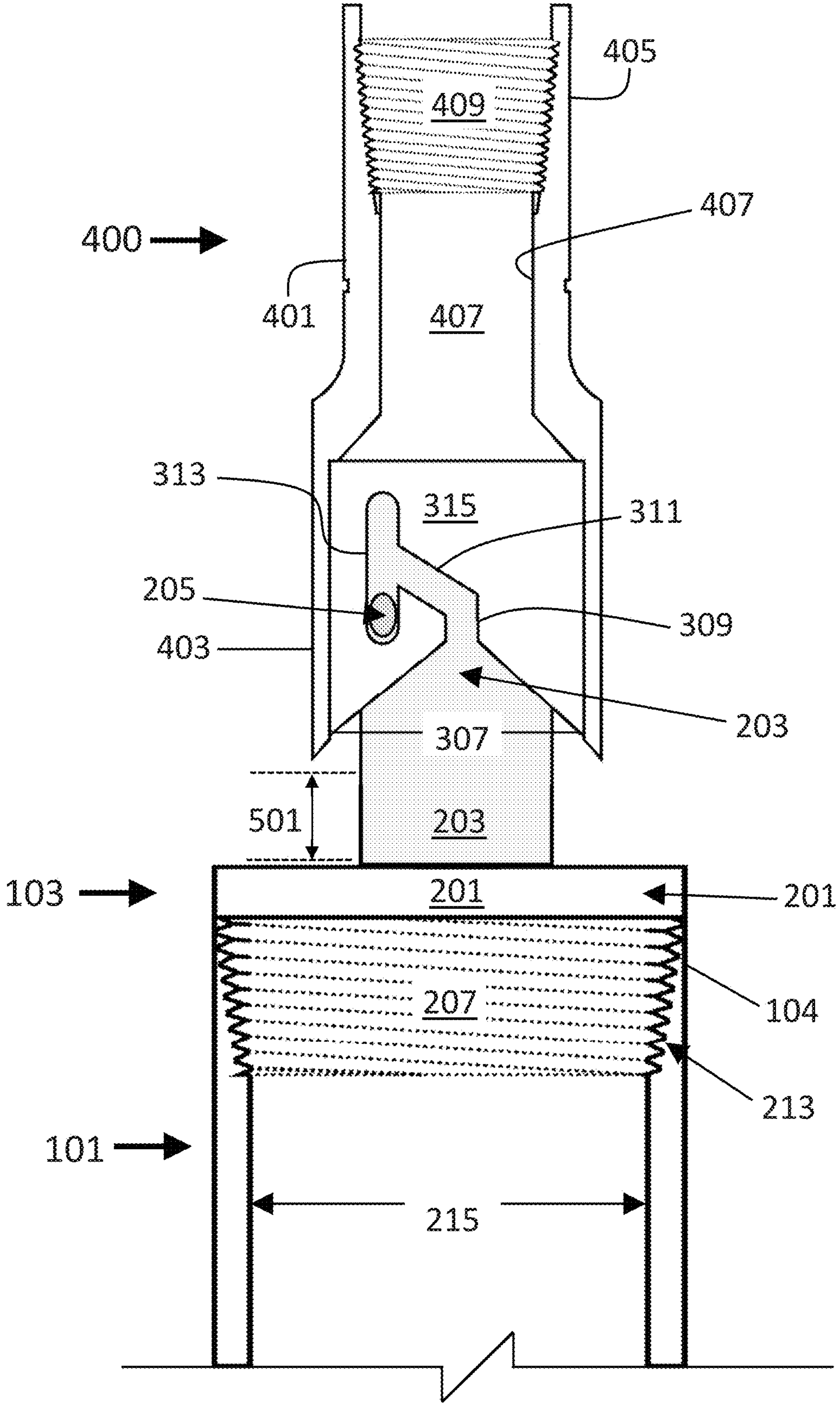
FIG. 5B depicts a partial lengthwise cross-sectional view through a portion of a given retrievable-waste-capsule and an attached retrievable-tool, showing the cross-section through the top plug, through a (top/upper) portion of the waste-capsule-body, and through the retrievable-tool.

In FIG. 5A, pin 205/209/211 is shown retained within an uppermost portion of parallel-section 313 of J-slot 305 of retrieval-tool 400; wherein this may be the relative positioning of pin 205/209/211 within parallel-section 313 when retrieval-tool 400 is first pushed onto a given stinger 203, rotated, and/or slacked off. Whereas, in contrast, in FIG. 5B, pin 205/209/211 is shown retained within a lowermost portion of parallel-section 313 of J-slot 305 of retrieval-tool 400; wherein this may be the relative positioning of pin 205/209/211 within parallel-section 313 when retrieval-tool 400 is being pulled away its given retained stinger 203; i.e., when that attached waste-capsule 100 is being retrieved by using retrieval-tool 400. In some embodiments, the retrieval-tool 400 to stinger-pin 205/209/211 engagement in FIG. 5A may not be under tension; whereas, the retrieval-tool 400 to stinger-pin 205/209/211 engagement in FIG. 5B may be under tension. In FIG. 5B, a pickup-distance 501 may be formed.

FIG. 5B depicts a partial lengthwise cross-sectional view through a portion of a given waste-capsule 100 and an attached retrievable-tool 400, showing the cross-section through plug 103, through a (top/upper) portion of waste-capsule-body 101, and through retrievable-tool 400. FIG. 5B may show a cross-sectional cutaway partial lengthwise view of a "left-hand" J-slot retrieval-tool 400 that has passed over and has engaged a given stinger 203 of its associated top plug 103, which itself has been made-up into the upper section 104 of a given waste-capsule-body 101. This view is identical to the section view of FIG. 5A, with the sole exception being that in FIG. 5B, the J-slot retrieval-tool 400 is shown in what may be termed as a "pickup" position, whereby the J-slot retrieval-tool 400 has already been completely set down to fully engage with that stinger 203 at the top of that waste-capsule-body 101, and then the J-slot retrieval-tool 400 has been picked up (and under tension) so that the stinger-pin(s) 205 is/are shown positioned at the bottom of the parallel-section 313 of a corresponding J-slot 305. In some embodiments, when retrieval-tool 400 may be in this pickup position, a pickup-distance 501 may be formed. In some embodiments, pickup-distance 501 is equivalent to the length of parallel-section 313 (of its J-slot 305) minus the major axis height (or diameter/transverse-width) of an engaged stinger-pin 205.

In some embodiments, the J-slot retrieval-tool 400 may be used to pickup a single (at least one) waste-capsule 100 and then transport it a short distance at a surface location using some type of hoisting equipment and conveyance system (see e.g., FIG. 9). In some embodiments, the J-slot retrieval-tool 400 may be used to pull one or more waste-capsules 100 from a wellbore 600 using a drill string or work string (or the like) tripped in and out of the wellbore 600 with a drilling rig or another type of hoisting equipment and/or handling device or apparatus.

In some embodiments, the J-slot retrieval-tool 400 may be used to install a top plug 103 into the upper section 104 of a given waste-capsule body 101. In such an embodiment, the stinger 203 of a top plug 103 may be inserted at a surface into the J-slot retrieval-tool 400. The J-slot retrieval-tool 400 may then be used to position the top plug 103 so that top plug 103 is directly above and in axial alignment with a waste-capsule-body 101. Then the J-slot retrieval-tool 400 may be slacked off until its threads 207 have come into contact with, or have been "stabbed" into the threads 213 of the upper section 104 of that waste-capsule-body 101. Depending upon whether threads 207 and 213 are right-hand or left-hand, the J-slot retrieval-tool 400 may be rotated, respectively either to the right or to the left, several turns until the complementary threads 207/213 have been made up hand tight. By applying an additional amount of torque, which may be recommended or specified for certain thread types, the complementary threads 207/213 may then be fully made-up to one another. In some embodiments, some type of lubricant or similar compound may be applied to the either one or to both threads 207 and 213 before stabbing and making them up. Depending upon whether the threads 207 and 213 are right-hand or left-hand, it may be desirable or appropriate to use either a "right-hand" or a "left-hand" J-slot retrieval-tool 400 for these particular embodiments.

Figure 6:
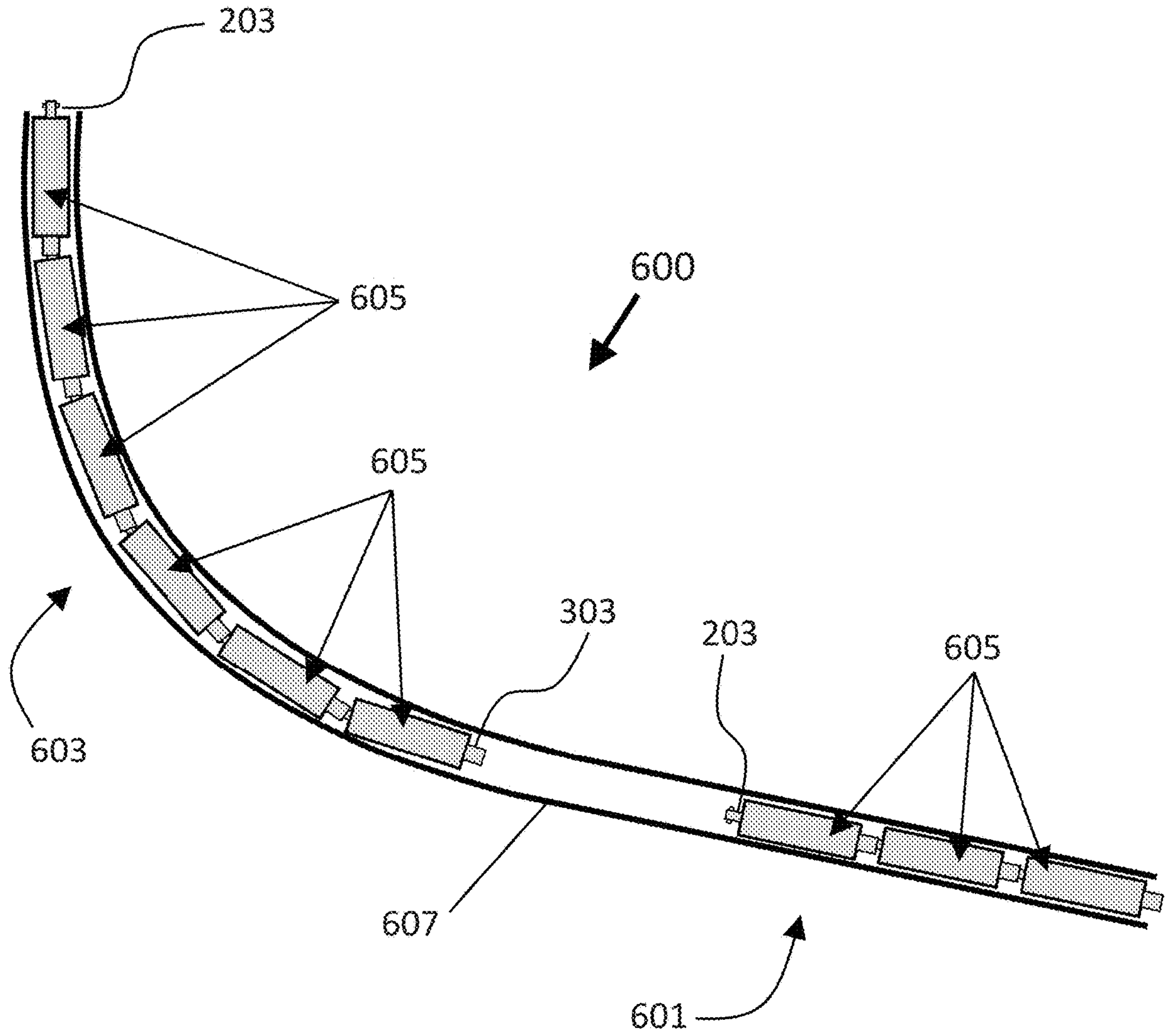
FIG. 6 shows a partial cross-section view through a portion of a wellbore, wherein this wellbore may contain various groups of linked retrievable-waste-capsules therein.

FIG. 6 shows a partial cross-section view through a portion of wellbore 600. In some embodiments, wellbore 600 may be at least one wellbore. Note, not all of wellbore 600 may be shown in FIG. 6. In some embodiments, wellbore 600 may be one or more wellbore(s). In some embodiments, the wellbore(s) of wellbore 600 may be located at least substantially (mostly): underground, below-ground, below a terrestrial surface, below a surface of the Earth, subterranean located, within one or more geologic formation(s), portions thereof, combinations thereof, and/or the like. In some embodiments, wellbore(s) of wellbore 600 may comprise at least one straight-section 601 and at least one curved-section 603. In some embodiments, straight-section 601 may be physically and/or communicatively attached to (connected to) curved-section 603; and/or vice-versa. In some embodiments, straight-section 601 may be at least one section of wellbore 600 that may run in a substantially (mostly) linearly straight line. In some embodiments, a given straight-section 601 may be substantially parallel with a vertical direction and/or with a horizontal (lateral) direction. In some embodiments, the vertical direction and the horizontal direction (lateral direction) may be at least substantially (mostly) orthogonal with respect to each other. In some embodiments, the vertical direction may be at least substantially parallel with a local (e.g., at that wellhead 707) gravitational field vector of the Earth. In some embodiments, a given straight-section 601 may be substantially parallel with a local (e.g., at that wellhead 707) gravitational field vector of the Earth and/or with a horizontal (lateral) direction. In some embodiments, curved-section 603 may be at least one section of wellbore 600 that may run in a substantially (mostly) curved line. In some embodiments, curved-section 603 may be at least one section of wellbore 600 that may run in a substantially (mostly) non-linear (non-straight) line. In some embodiments, wellbore 600 at wellhead 707 and just below and proximate to wellhead 707, may be at least one section of straight-section 601 (e.g., a first section of straight-section 601) that may be at least substantially (mostly) running in the vertical direction. In some embodiments, after at least some predetermined distance that (first) straight-section 601 may transition into at least one section of curved-section 603; and then that section of curved-section 603 may transition into another (second) section of straight-section 601, but wherein that last (second) section of straight-section 601 may be running in the at least substantially (mostly) horizontal direction (lateral direction).

FIG. 6 may show two different groups of linked-waste-capsules 605 within wellbore 600. In some embodiments, a given linked-waste-capsules 605 may comprise at least two separate and distinct waste-capsules 100 that may be (removably) attached/coupled to each other, via interaction/engagement of a stinger 203 (pin 205/209/211) of a first waste-capsule 100 with the J-slot 305 of another (different/distinct) second waste-capsule 100 that is immediately adjacent to (next to) first waste-capsule 100. In this fashion, linked-waste-capsules 605 may be formed/constructed. In some embodiments, within wellbore 600, stinger(s) 203 may be oriented/facing/pointing upwards and/or towards wellhead 707; whereas, J-slots 305 may be oriented/facing/pointing away from wellhead 707. In some embodiments, a given wellbore 600 may comprise (house) at least one linked-waste-capsules 605. In some embodiments, a given wellbore 600 may comprise (house) one or more strings of linked-waste-capsules 605.

Continuing discussing FIG. 6, in some embodiments, a given wellbore 600 may be lined with at least one liner and/or with at least one casing, such as, but not limited to disposal-casing 607. In some embodiments, a given wellbore 600 may be lined with one or more liner(s) and/or with one or more casing(s), such as, but not limited to disposal-casing 607. In some embodiments, liner(s), casing(s), and/or disposal-casing 607 may be formed from a series of pipe sections emplaced within wellbore 600, end to end. In some embodiments, these pipe sections may be at least substantially (mostly) constructed from one or more of: a metal, an alloy, steel, ceramic, plastic, portions thereof, combinations thereof, and/or the like. In some embodiments, disposal-casing 607 may be an innermost liner/casing of wellbore 600. In some embodiments, waste-capsule(s) 100 deposited into wellbore 600 may physically touch at least some portions of disposal-casing 607. In some embodiments, there may be other liner(s)/casing(s) installed outside of disposal-casing 607.

FIG. 6 may show a section view of a straight section of straight-section 601 and also of a curved section of a curved-section 603 with several linked-waste-capsules 605 either connected together or separated from one another within wellbore 600. In some embodiments, wellbore 600 may have been cased (lined) with a string of high-strength disposal-casing 607, which may be similar in function or purpose to a string of oilfield casing that has been installed through a curved section and a straight section of an oil or gas well. In some embodiments, the casing joints of the high-strength disposal-casing 607 may be connected together with full-strength couplings having some type of internal-flush profile, in order to provide a smooth inner diameter along the full length of disposal-casing 607 to eliminate any internal obstructions that may hinder movement of waste-capsules 100 inside of disposal-casing 607 and/or the wellbore 600. In the upper-left-hand part of the section view of FIG. 6, six (6) linked-waste-capsules 605 are shown connected together in curved-section 603. In the lower-right-hand part of this section view of FIG. 6, three (3) other linked-waste-capsules 605 are shown connected together in straight-section 601. In some embodiments, these linked-waste-capsules 605 may be coupled or connected together in groups or collections of linked-waste-capsules 605 because of the J-slot(s) 305 of/on the bottom plugs 105 of some of the waste-capsules 100 (see e.g., FIG. 3A and FIG. 3B) may be engaged with the stingers 203 of/on the top plugs 103 of waste-capsules 100 that are directly below them (see e.g., FIG. 2D and FIG. 2E; and see also FIG. 5B).

Continuing discussing FIG. 6, in some embodiments, there may be a certain amount of (predetermined) tolerance between the outer diameter of a given stinger body 203 (of a first waste-capsule 100) and the inner diameter(s) of the J-slot sleeve 315 (sleeve-body 315) (of a second waste-capsule 100). In some embodiments, this tolerance may be desired or required so that the J-slot sleeve 315 (of the second waste-capsule 100) may easily pass over and engage that stinger 203 (of the first waste-capsule 100). In some embodiments, some amount of additional tolerance may be deliberately designed between the outer diameter of the stinger body 203 (of the first waste-capsule 100) and the inner diameter of the J-slot sleeve 315 (of the second waste-capsule 100), in order to provide at least some predetermined amount of flexibility when these two structures that are engaged (i.e., some flexibility between the first waste-capsule 100 and the attached second waste-capsule 100). In some embodiments, this flexibility (between the first waste-capsule 100 and the attached second waste-capsule 100) may allow the connection or coupling between two connected, but otherwise rigid linked-waste-capsules 605 (i.e., the first waste-capsule 100 and the attached second waste-capsule 100) to have sufficient flexibility, much like the couplings between railroad cars on a curved railroad track, to allow these two or more linked-waste-capsules 605

(the first waste-capsule 100 and the attached second waste-capsule 100) to be emplaced or to be retrieved (at the same time) without being restricted in any manner whatsoever by the resulting curvature that may occur along the inner diameter of the high-strength disposal-casing 607 where the disposal-casing 607 has been installed through one or more curved-section(s) 603.

Continuing discussing FIG. 6, in some embodiments, a maximum quantity (number) (or some lesser quantity) of linked-waste-capsules 605 (that are connected or coupled together in a group or collection) may be determined or prescribed prior to emplacement within wellbore 600. In some embodiments, this maximum quantity (or some lesser quantity) of linked-waste-capsules 605 (that form one group or collection) may be easily separated from another group or collection of linked-waste-capsules 605 by specifically emplacing a waste-capsule 100 with a bottom plug 105 having a lower-skirt 303 with an internal-smooth-profile 321 (see e.g., FIG. 3C), instead of that lower-skirt 303 having J-slot(s) 305 (see e.g., FIG. 3A and FIG. 3B), between the two different groups/collections of linked-waste-capsules 605 within wellbore 600.

Figure 7A:
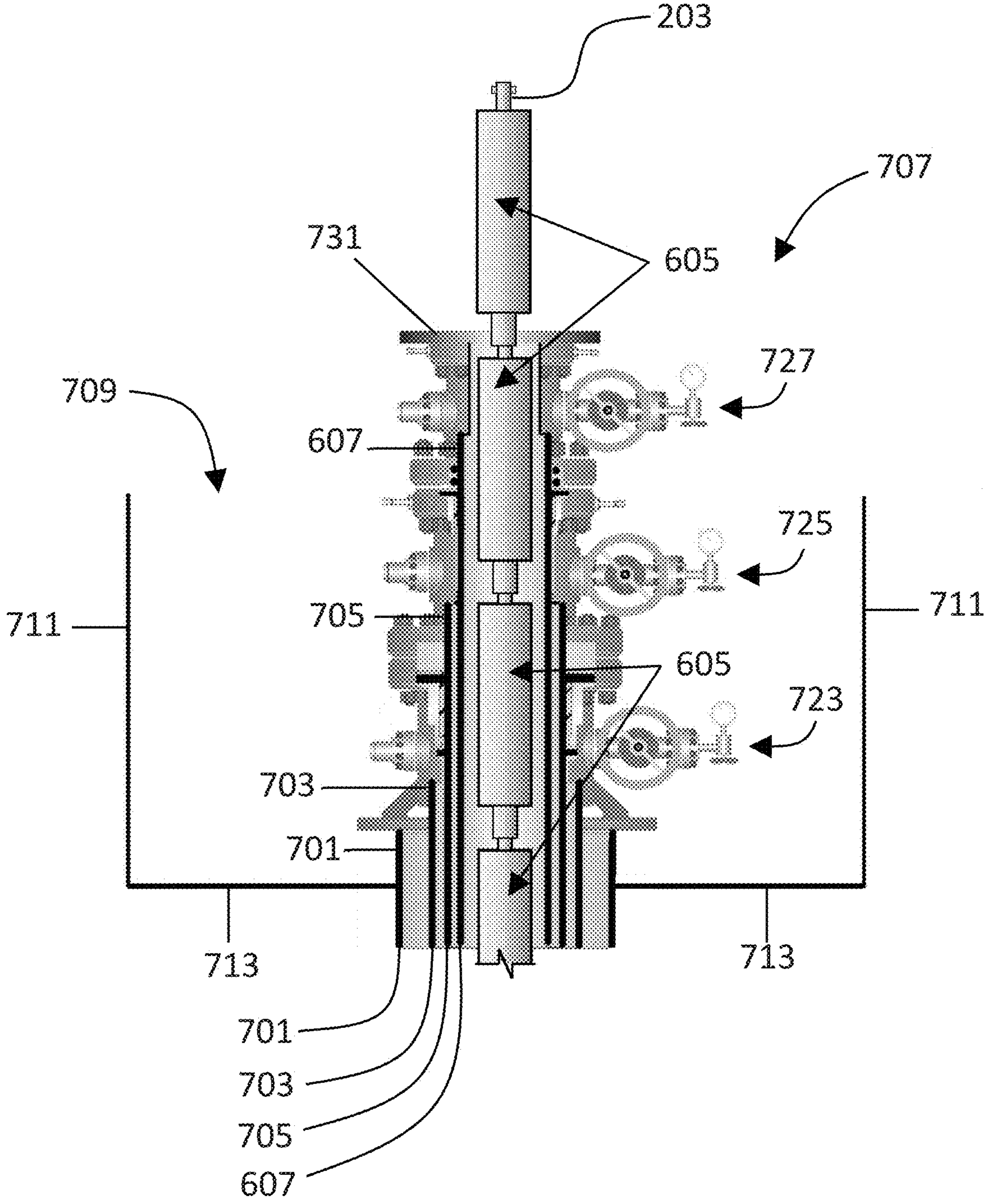
FIG. 7A depicts a partial cross-sectional view through a wellhead, an associated cellar, at least one casing, and at least one retrievable-waste-capsule.

FIG. 7A depicts a partial cross-sectional view through a wellhead 707, an associated cellar 709, at least one casing, and at least one waste-capsule 100. FIG. 7A may show a partial cross-sectional cutaway view of several connected linked-waste-capsules 605 in the upper section of wellbore 600 with the topmost waste-capsule 100 extending above the surface wellhead equipment. In some embodiments, these linked-waste-capsules 605 are shown to be connected or coupled together by J-slot(s) 305 on the bottom plugs (see e.g., FIG. 3A and FIG. 3B) on the lower sections 106 of linked-waste-capsules 605, which have been engaged with the stinger(s) 203 (stinger-pin(s) 205/209/211) on the top plugs 103 (see e.g., FIG. 2D and FIG. 2E) on the upper sections 104 of the linked-waste-capsules 605 below them. In FIG. 7A, the stinger 203 on/of the uppermost waste-capsule 100 is shown in its entirety; whereas, the other stingers 203 of the other waste-capsules 100 are not entirely shown because the upper portions of those stingers 203 are within bottom plugs 105. In some embodiments, one or more waste-capsules 100 (or at least one pair of linked-waste-capsules 605) may be landed on the terrestrial surface wellhead equipment.

Continuing discussing FIG. 7A, in some embodiments, wellbore 600 may be begun via pilot well drilling (or the like) from a given wellhead 707 (and/or from a terrestrial surface/ground site) and with at least one drilling (rig or the like); and then subsequently enlarged, both with respect to diameter and depth, as desired/needed. In some embodiments, wellhead 707 may be located on a terrestrial surface (Earth surface) at least substantially (mostly) directly above at least one desirable (deep) geologic formation. In some embodiments, the desirable (deep) geologic formation may have various properties that make the (deep) geologic formation desirable for the long-term (or permanent) disposal of loaded/filled waste-capsule(s) 100 therein.

Continuing discussing FIG. 7A, in some embodiments, from wellhead 707 a cellar 709 may be formed. In some embodiments, from cellar 709, one or more lining(s)/casing (s) of wellbore 600 may be inserted/formed within wellbore 600. In some embodiments, cellar 709 may be an indentation (excavation) within the terrestrial ground/surface at wellhead 707. In some embodiments, the indentation (excavation) of cellar 709 may comprise a vertically surrounding cellar-wall 711 and bottom and horizontally located cellar-floor 713. In this cross-sectional cutaway view of FIG. 7A, some components/structures of the wellhead equipment are depicted as having been installed below ground level in a cellar 709. In some embodiments, such cellars may be a common feature of many oil and gas wells. In some embodiments, cellar 709 may be designed (configured) to provide additional room for wellhead equipment and other types of equipment that are located directly underneath a drilling rig floor (drilling-rig-floor 800). In some embodiments, analogous to a cellar in a house or other dwelling, cellar 709 at the terrestrial surface of wellbore 600 may be a cavity or space excavated below ground level. In some embodiments, cellar 709 may have regular (predetermined) dimensions (length, width [diameter], and depth). In some embodiments, cellar 709 may comprise cellar-wall(s) 711 and a cellar-floor 713. In some embodiments, cellar 709, cellar-wall(s) 711, and/or cellar-floor 713 may be lined with concrete, wood, steel, or some other type of construction material to provide structural integrity and/or substrate (earth) retention. In this cross-sectional cutaway view of FIG. 7A, and in some embodiments, the upper boundary of cellar 709 may correspond to the terrestrial ground/surface level.

Other components/structures that are shown in FIG. 7A, and which may be installed during drilling operations, include the following casing strings: conductor-casing 701, surface-casing 703, intermediate-casing 705, disposal-casing 607, portions thereof, combinations thereof, and/or the like. In some embodiments, after setting conductor-casing 701 and surface-casing 703 within wellbore 600, a casing-head (section "A") 723 may be installed at a top/upper portion of wellbore 600. In some embodiments, after setting intermediate-casing 705 within wellbore 600, a casing-spool (section "B") 725 may be installed on top of casing-head 723. In some embodiments, after setting disposal-casing 607 within wellbore 600, a casing/tubing spool (section "C") 727 may be installed on top of casing-spool (section "B") 725. In some embodiments, a baseplate 731 may be shown placed on top of the top flange of the casing/tubing spool (section "C") 727.

Continuing discussing FIG. 7A, in some embodiments, the at least one casing of wellbore 600 may comprise at least disposal-casing 607. In some embodiments, the at least one casing may also comprise conductor-casing 701, surface-casing 703, and/or intermediate-casing 705. In some embodiments, disposal-casing 607, conductor-casing 701, surface-casing 703, and/or intermediate-casing 705 may all be casing(s) and/or liner(s) of wellbore 600. In some embodiments, disposal-casing 607, conductor-casing 701, surface-casing 703, and intermediate-casing 705 may have different diameters with respect to each other. In some embodiments, disposal-casing 607, conductor-casing 701, surface-casing 703, and intermediate-casing 705 may be concentric, coaxial, and/or colinear with respect to each other. In some embodiments, disposal-casing 607, conductor-casing 701, surface-casing 703, and intermediate-casing 705 may be made up of different sized sections of pipe (e.g., with respect to different lengths and/or different diameters). In some embodiments, with respect to a direction from an outermost location to an innermost location of wellbore 600, conductor-casing 701 may be located the most outermost, followed by surface-casing 703, followed by intermediate-casing 705, and lastly followed by disposal-casing 607 being the innermost liner/casing of wellbore 600. In some embodiments, intermediate-casing 705 may be disposed between disposal-casing 607 and surface-casing 703. In some embodiments, surface-casing 703 may be disposed between intermediate-casing 705 and conductor-casing 701. In some embodiments, conductor-casing 701 may be an outermost liner/casing of wellbore 600. In some embodiments, with respect to diameters of casing(s)/liner(s) of wellbore 600, conductor-casing 701 may be largest, followed by surface-casing 703, followed by intermediate-casing 705, and disposal-casing 607 may be the smallest diameter. In some embodiments, between annular portions of adjacent liner(s)/casing(s) of wellbore 600, may be filled with cement(s) and/or concrete(s). In some embodiments, between an annular portion of the exterior of conductor-casing 701 and an interior of the geologic formation(s) that wellbore 600 may be located within, may be filled with cement(s) and/or concrete(s). In some embodiments, an exterior of conductor-casing 701 may be physically touching/contacting at least some portion of the geologic formation(s) that wellbore 600 may be located within. In some embodiments, disposal-casing 607 may be the tallest liner/casing extending out of wellhead 707 of wellbore 600. In some embodiments, conductor-casing 701 may be the shortest liner/casing extending out of wellhead 707 of wellbore 600. In some embodiments, surface-casing 703 may extend out of wellhead 707 of wellbore 600 more than conductor-casing 701. In some embodiments, intermediate-casing 705 may extend out of wellhead 707 of wellbore 600 more than surface-casing 703. In some embodiments, disposal-casing 607 may extend out of wellhead 707 of wellbore 600 more than intermediate-casing 705.

Continuing discussing FIG. 7A, in some embodiments, casing-head 723 may be machinery configured to insert and/or form surface-casing 703 (section "A") within wellbore 600. In some embodiments, casing-spool 725 may be machinery configured to insert and/or form intermediate-casing 705 (section "B") within wellbore 600. In some embodiments, casing-spool 727 may be machinery configured to insert and/or form disposal-casing 607 (section "C") within wellbore 600. In some embodiments, casing-spool 727 may be an uppermost casing-head/spool. In some embodiments, casing-head 723 may be a lowermost casing-head/spool. In some embodiments, with respect to a vertical direction, casing-spool 725 may be disposed between casing-head 723 and casing-spool 727. In some embodiments, casing-head 723 and casing-spool 725 may be located within cellar 709. In some embodiments, casing-spool 727 may be at least partially located within cellar 709.

In some embodiments, baseplate 731 may be installed on top of disposal-casing 607 and/or on top of casing-spool 727. In some embodiments, baseplate 731 may cap disposal-casing 607 and/or of casing-spool 727. In some embodiments, baseplate 731 may comprise a large central-hole that is configured to permit passage of waste-capsule(s) 100 (linked-waste-capsules 605) and/or of retrieval-tool 400.

FIG. 7A also shows linked-waste-capsules 605 of at least four (4) connected waste-capsule(s) 100, wherein the uppermost waste-capsule 100 is protruding from baseplate 731 and the other at least three (3) waste-capsules 100 are within disposal-casing 607.

Figure 7B:
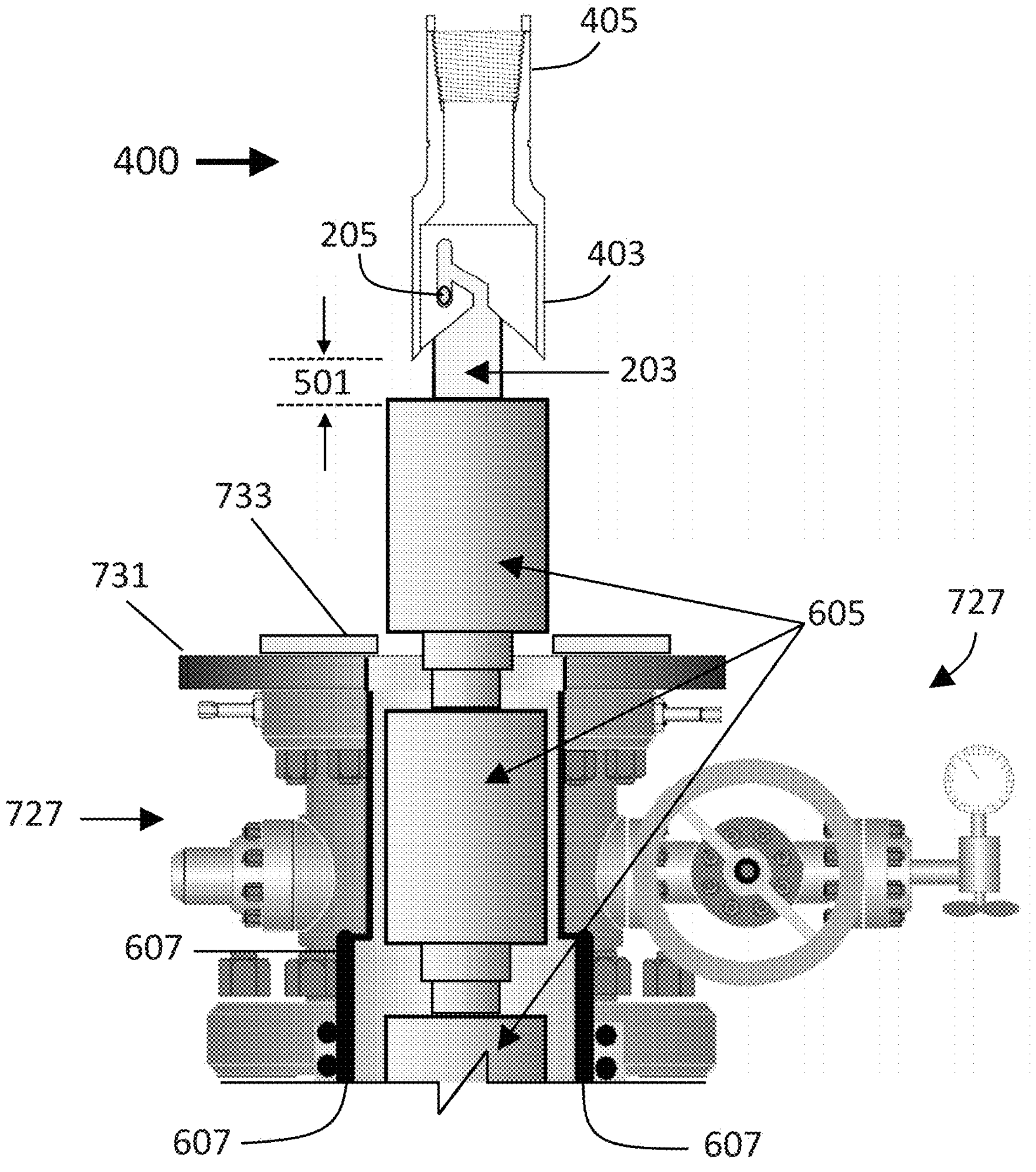
FIG. 7B depicts a partial cross-sectional view through a retrieval-tool connected to linked retrievable-waste-capsules, along with a casing-spool and portions of a disposal-casing.

FIG. 7B depicts a partial cross-sectional view through retrieval-tool 400 connected to linked-waste-capsules 605, along with casing-spool 727 and portions of disposal-casing 607. FIG. 7B is shown in a state of retrieving (withdrawing) this string of linked-waste-capsules 605 from disposal-casing 607, by pulling upwards on/from the (removably) attached retrieval-tool 400. Thus, in FIG. 7B, this string of linked-waste-capsules 605 and retrieval-tool 400 are under linear tension, as opposed to linear compression. In some embodiments, when retrieval-tool 400 is (removably) attached to a given stinger 203 (pin 205/209/211) and retrieval-tool 400 is being retrieved (pulled upwards), pin 205/209/211 is at the bottom of parallel-section 313 of retrieval-tool 400; and thus pickup-distance 501 is also shown in FIG. 7B.

FIG. 7B may show a partial cross-sectional cutaway view of linked-waste-capsules 605 in the uppermost section of wellbore 600, along with a section view of a J-slot retrieval-tool 400, which is shown in the "pickup" position, whereby a stinger-pin(s) 205 on the upper most stinger 203 at the top of the top most waste-capsule 100 is shown positioned at the bottom of the parallel-section 313 of a corresponding J-slot 305 of retrieval-tool 400 (see e.g., FIG. 5B). Therefore, in the embodiments of this invention which have stinger 203 configurations with two or more stinger-pins 205, the full weight (load) of the linked-waste-capsules 605 may be supported evenly by all of the stinger-pins 205 of the top most waste-capsule 100, as the bottom area of the parallel-section(s) 313 of their corresponding J-slots 305 (of retrieval-tool 400).

In some embodiments, the cross-sectional cutaway view of FIG. 7B may be a closeup view of a casing/tubing spool section (section "C") 727 which may have been installed after setting the disposal-casing 607 string. FIG. 7B, may also show a baseplate 731 and one or more landing plates 733, which are both capable of safely supporting the total axial loads due to the full weight of multiple linked-waste-capsules 605 that have been landed on the wellhead equipment. In some embodiments, the baseplate 731 may have a slot that has a width that is large enough for the linked-waste-capsules 605 (waste-capsule(s) 100) to pass through with one or more inches of clearance, therefore it may not be necessary to move the baseplate 731 as multiple waste-capsules 100 are handled at the wellhead 707. In some embodiments, baseplate 731 may have a very sizable wall thickness that can safely withstand considerable compressive and shear stress loads. In some embodiments, the landing-plates 733 are smaller in size than the baseplate 731 since, the landing-plates 733 may be well supported by the baseplate 731; therefore, the landing-plates 733 may be moved inward and outward laterally with remotely-operated equipment so that landing-plates 733 may be positioned under the main body of a strong of linked-waste-capsules 605. FIG. 7B shows landing-plate(s) 733 on top of baseplate 731. In some embodiments, landing-plate(s) 733 may cap disposal-casing 607 and/or of casing-spool 727. In some embodiments, landing-plate(s) 733 may comprise a large central-hole that is configured to permit passage of waste-capsule(s) 100 and/or of retrieval-tool 400.

Continuing discussing FIG. 7B, in some embodiments, since the lower-skirt 303 on a bottom plug 105 may have a smaller outer diameter than its shoulder 301 (see e.g., FIG. 3A and FIG. 3B), then the weight of linked-waste-capsules 605 may be safely landed on the shoulder 301 of the bottom plug 105 of the uppermost waste-capsule 100 of that string of linked-waste-capsules 605.

The cross-sectional cutaway view of FIG. 7B shows the J-slot retrieval-tool 400 in the "pickup" position, supporting the full weight of linked-waste-capsules 605. In some embodiments, the uppermost waste-capsule 100 is shown in a vertical position with respect to the wellhead 707 whereby the landing-plates 733 may be moved outward remotely so that the J-slot retrieval-tool 400 may pull up the linked-waste-capsules 605 far enough vertically to lay down the uppermost waste-capsule 100.

Figure 7C:
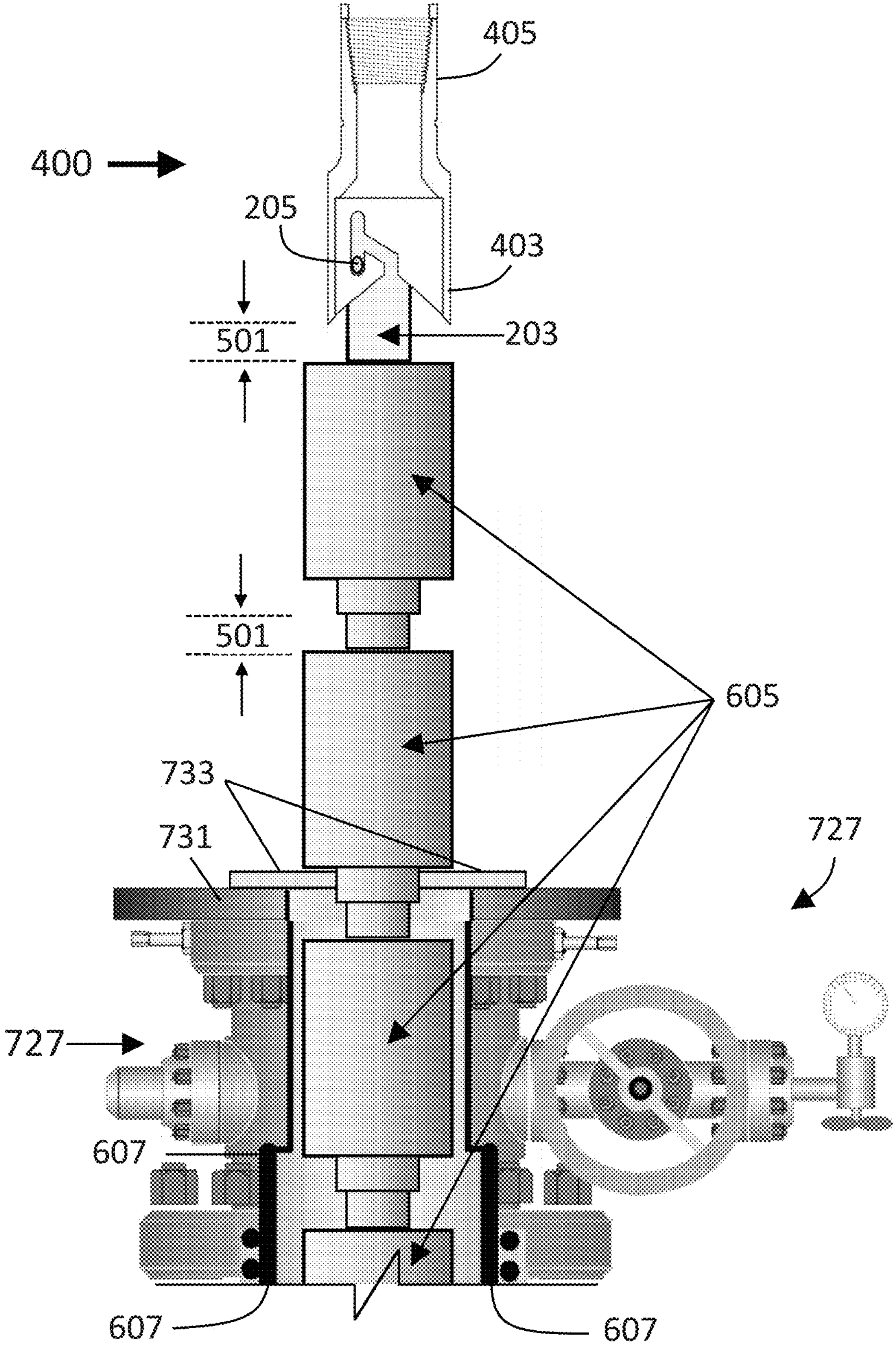
FIG. 7C depicts a partial cross-sectional view through a retrievable-tool connected to linked retrievable-waste-capsules, along with a casing-spool, and portions of a disposal-casing.

FIG. 7C depicts a partial cross-sectional view through retrievable-tool 400 connected to linked-waste-capsules 605, along with casing-spool 727 and portions of disposal-casing 607. FIG. 7C is shown in a state of retrieving (withdrawing) this linked-waste-capsules 605 from disposal-casing 607, by pulling upwards on the (removably) attached retrieval-tool 400. Thus, in FIG. 7C, this linked-waste-capsules 605 and retrieval-tool 400 are under linear tension, as opposed to linear compression. FIG. 7C shows more of linked-waste-capsules 605, than shown in FIG. 7B. Because linked-waste-capsules 605 are under tension, between each pair of adjacent and connected waste-capsules 100 of linked-waste-capsules 605, there will be a pickup-distance 501.

FIG. 7C may show another partial cross-sectional cut-away view of linked-waste-capsules 605 landed at the terrestrial surface/ground, along with a section view of a J-slot retrieval-tool 400, which is shown in the "pickup" position, whereby a stinger pin 205 on the stinger 203 at the top of the top most waste-capsule 100 is shown positioned at the bottom of the parallel-section 313 of a corresponding J-slot 305 of J-slot retrieval-tool 400 (see e.g., FIG. 7C and FIG. 5B). In FIG. 7C, the top group or collection of linked-waste-capsules 605 may have been pulled up high enough vertically with respect to wellhead 707 so that the landing-plates 733 may be moved inward remotely where landing-plates 733 may be positioned to safely land the full weight of the group or collection of linked-waste-capsules 605 so that this full weight may be supported by the shoulder 301 of the bottom plug 105 at the bottom of the second waste-capsule 100 (from the top) as this second waste-capsule 100 shoulder 301 is currently landed (supported) on the landing-plates 733. It should also be noted that whenever the full weight of a group or collection of linked-waste-capsules 605 is picked up by the J-slot retrieval-tool 400, the distance between each of the main bodies of the linked-waste-capsules 605 is increased by a pickup-distance 501, which is equivalent to the length of the parallel-section 313 of the J-slots 305 minus the major diameter(s) (transverse-width(s)) of the engaged stinger-pins 205 (see e.g., FIG. 5B). In some embodiments, the pickup-distance 501 therefore represents a certain amount of slack between each of the main bodies of the linked-waste-capsules 605, and this slack may be a useful feature that may allow the linked-waste-capsules 605 to be handled efficiently at the terrestrial surface/ground.

Figure 8:
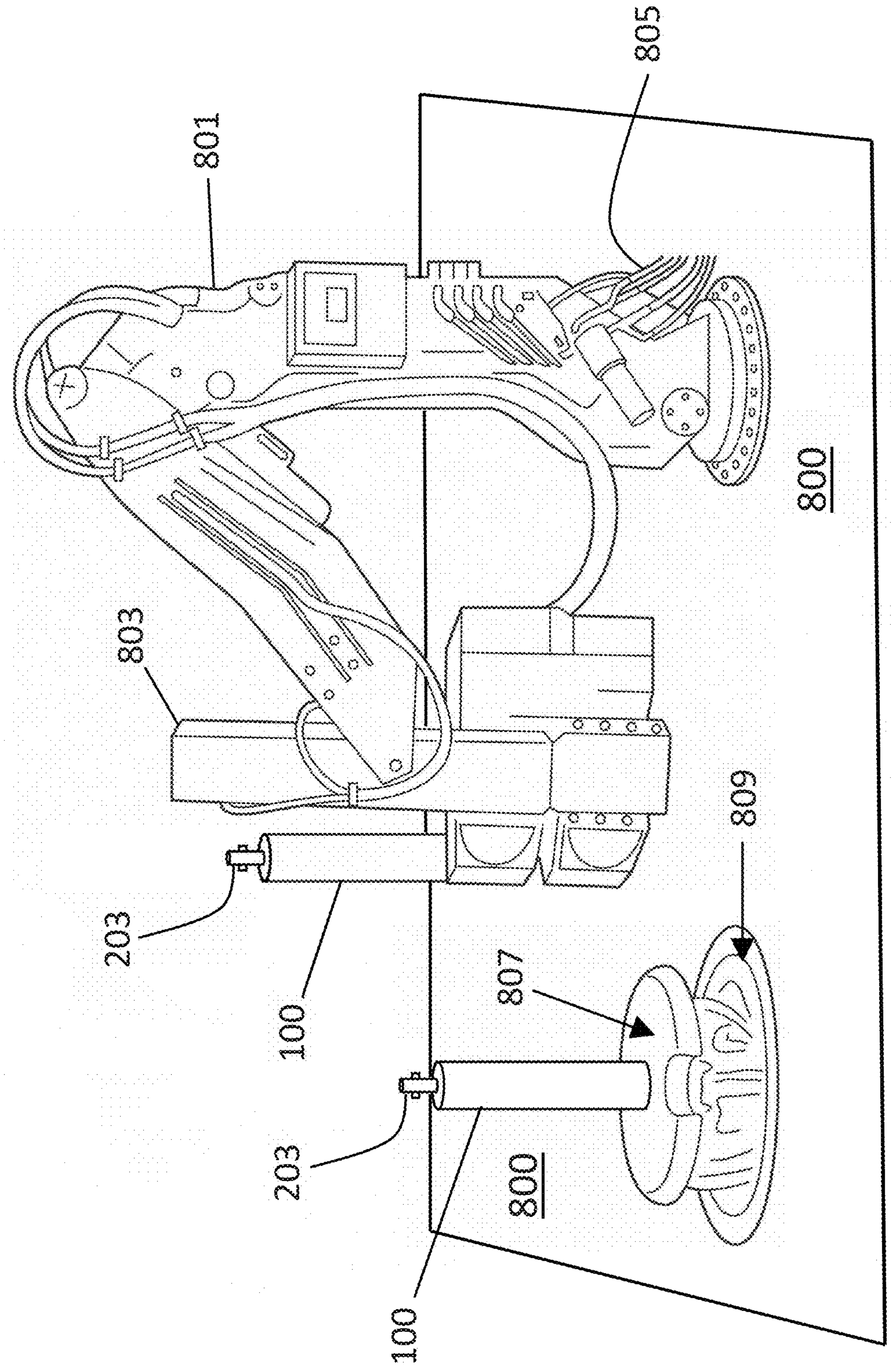
FIG. 8 depicts a top-down perspective view of at least a portion of a drilling-rig-floor, with at least a portion of a robotic-system located thereon, that may be configured to at least partially assist with loading, landing, inserting, retrieving, decoupling, and/or opening of retrievable-waste-capsule(s), and/or with respect to a given wellbore.

FIG. 8 depicts top-down perspective view of at least a portion of a drilling-rig-floor 800, with robotic-system 801 that may be configured to load/land/insert waste-capsule(s) 100 into wellbore 600. In some embodiments, drilling-rig-floor 800 may be located at least in part on top of wellhead 707 and/or an entrance to wellbore 600. In some embodiments, robotic-system 801 may be configured to insert at least one waste-capsule(s) 100 into wellbore 600, landing-device 807, rotary-table 809, portions thereof, combinations thereof, and/or the like. In some embodiments, robotic-system 801 may comprise at least one of: grabber 803; communication-means 805; movement/articulation/translation means (e.g., for moving grabber 803); sensor(s); computer(s); PLC(s) (programmable logic controller(s)); CPU(s) (central processing unit(s)); memory; storage; cable(s); wire (s); firmware; operating system; software; portions thereof; combinations thereof; and/or the like. In some embodiments, grabber 803 may be configured to removably grip and/or hold at least one waste-capsule(s) 100 and move that waste-capsule(s) 100 from a temporary storage location (that is adjacent/proximate to robotic-system 801) and to landing-device 807. In some embodiments, communication-means 805 may be configured to route communications and/or electrical power to and/or from robotic-system 801. In some embodiments, communication-means 805 may be configured to route communications and/or electrical power to and/or from grabber 803. In some embodiments, landing-device 807 and/or rotary-table 809 may be configured to assist and/or to facilitate loading/landing/inserting waste-capsule(s) 100 into wellbore 600.

FIG. 8 may show at least one waste-capsule(s) 100 being loaded into a wellbore 600 by an automatic robotic-system 801. In this particular embodiment, the robotic clamp device 803 (grabber 803) that is one of the components of the automatic robotic-system 801 may be used to remotely handle the at least one waste-capsule(s) 100 so that the at least one waste-capsule(s) 100 may be safely picked-up, handled, and moved to the drilling rig's rotary-table 809 opening, which is located directly above the surface wellhead equipment. In addition, some features or embodiments that are taught by the present invention may involve using the J-slot retrieval-tool 400 feature of the present invention on the automatic robotic-system 801 instead of the robotic clamp device 803 as is shown in the perspective view of FIG. 8; or grabber 803 may be modified such that retrieval-tool 400 may be (removably) attached to grabber 803. In those features or embodiments, each one of the waste-capsules 100 may have a top plug with a stinger 203, and each such stinger 203 may have one or more stinger-pins 205 in a compatible configuration that may allow engagement by the J-slot retrieval-tool 400. Moreover, some of these features or embodiments may involve retrieving waste-capsule(s) 100 from a wellbore 600, as well as, loading waste-capsules 100 into a wellbore 600. Without limiting the methods of operation covered by this patent application, for any possible features or embodiments that may use some type of automatic robotic-system 801, one or more methods of operation may be similar to those methods of operations that may be taught in one or more of the above paragraphs pertaining to FIG. 5A, FIG. 5B, FIG. 7B, and/or FIG. 7C. Note, at least some aspect of 801 may be disclosed and discussed in prior U.S. Pat. No. 11,167,330 (with at least one of the same inventors as the present invention); wherein prior U.S. Pat. No. 11,167,330 is incorporated by reference as if full set-forth herein.

FIG. 9 depicts a schematic sideview of a mobile-gantry-crane 900, that may be configured to transport linked-waste-capsules 605 over the ground. In some embodiments, mobile-gantry-crane 900 may be configured to move around over the ground, such as, but not limited to, drilling-rig-floor 800, and/or grounds next to (adjacent to/proximate to) a given wellhead 707 and/or wellbore 600 entrance. In some embodiments, mobile-gantry-crane 900 may be configured to raise (retrieve) and/or lower at least one waste-capsule 100. In some embodiments, mobile-gantry-crane 900 may be configured to raise (retrieve) and/or lower at least one string of linked-waste-capsules 605. In some embodiments, in terms of structural supports, mobile-gantry-crane 900 may comprise overhead-support-member(s) 901 and support leg(s) 903. In some embodiments, overhead-support-member(s) 901 may be an elongate structural member. In some embodiments, overhead-support-member(s) 901 may be in the form (format) of at least one girder and/or beam. In some embodiments, a majority of a length of overhead-support-member(s) 901 may run in at least a substantially (mostly) horizontal/lateral direction. In some embodiments, connected to (attached to) and disposed beneath overhead-support-member(s) 901 may be support leg(s) 903. In some embodiments, overhead-support-member(s) 901 may be located on top of support leg(s) 903. In some embodiments, a majority of a length of support leg(s) 903 may run in at least a substantially (mostly) vertical direction. In some embodiments, bottom(s) of support leg(s) 903 may be attached to ground-translation-means 905. In some embodiments, terminal end(s) of support leg(s) 903, disposed away from overhead-support-member(s) 901, may be ground-translation-means 905. In some embodiments, ground-translation-means 905 may be configured to facilitate movement of mobile-gantry-crane 900 over the ground/floor. In some embodiments, ground-translation-means 905 may be powered or non-powered. In some embodiments, ground-translation-means 905 may be selected from one or more of: wheel(s), caster(s), roller(s), track(s), tread(s), sled(s), ski(s), ball(s), Shark Wheel(s), portions thereof, combinations thereof, and/or the like. In some embodiments, support leg 903 may comprise height-adjustment-means 907. In some embodiments, height-adjustment-means 907 may be configured to raise and/or lower an overall height of overhead-support-member(s) 901 from the ground/floor, within predetermined limit(s). In some embodiments, height-adjustment-means 907 may be a telescoping means. In some embodiments, height-adjustment-means 907 may be powered and/or operated by one or more of: hydraulics, pneumatics, motor(s), portions thereof, combinations thereof, and/or the like.

Continuing discussing FIG. 9, in some embodiments, mobile-gantry-crane 900 may comprise at least one hoist. In some embodiments, the at least one hoist may be configured to raise (retrieve) and/or lower at least one waste-capsule 100. In some embodiments, the at least one hoist may be configured to raise (retrieve) and/or lower at least one string of linked-waste-capsules 605. In some embodiments, the at least one hoist may be at least partially attached to/located on overhead-support-member(s) 901. In some embodiments, the at least one hoist may comprise crown-block 909, cable(s) 911, traveling-block 913, driver 915, threads 917, portions thereof, combinations thereof, and/or the like. In some embodiments, crown-block 909 may be attached to overhead-support-member(s) 901. In some embodiments, crown-block 909 may comprise at least one pulley. In some embodiments, cable(s) 911 may be elongate and at least partially flexible structural member(s). In some embodiments, cable(s) 911 may be chain(s). In some embodiments, cable(s) 911 may be attached to both crown-block 909 and to traveling-block 913. In some embodiments, communication/electrical-power wire(s) may be routed with cable(s) 911. In some embodiments, traveling-block 913 may be located below overhead-support-member(s) 901. In some embodiments, traveling-block 913 may be configured to move up and/or down (e.g., in a generally vertical direction), below overhead-support-member(s) 901. In some embodiments, driver 915 may be attached to traveling-block 913. In some embodiments, driver 915 may be located beneath traveling-block 913. In some embodiments, driver 915 may be attached to a bottom of traveling-block 913. In some embodiments, driver 915 may be a power swivel or the like. In some embodiments, driver 915 may be configured to removably attach to driver-connection-end 405 of retrieval-tool 400. In some embodiments, a bottom portion of driver 915 may be threads 917. In some embodiments, attached to a bottom of driver 915 may be threads 917. In some embodiments, threads 917 may be male threads. In some embodiments, threads 917 may be configured to complementary (and removably) attach to threads 409 of driver-connection-end 405 of retrieval-tool 400.

FIG. 9 shows a perspective view of mobile-gantry-crane 900 that may be used to unload assembled waste-capsules 100 for various features or embodiments of the present invention where one or more assembled waste-capsules 100 have been landed on the terrestrial surface/ground wellhead equipment as is illustrated in the depictions of FIG. 7B and FIG. 7C. In still other embodiments, other types of mobile handling equipment may also be used for similar purposes or methods of operations. In FIG. 9, may comprise one or more overhead-support-member(s) 901 that are themselves elevated and supported by two or more support legs 903. In some embodiments, support legs 903 may be shown to have wheels 905, and each one of these wheels 905 may be powered by one or more engines, motors, or other power devices or apparatus; and may also have multiple steering options to provide greater maneuverability.

Continuing discussing FIG. 9, in some embodiments, the hoist may comprise of a crown-block 909, a traveling-block 913, and high-strength cables or lines 911 which may be strung from sheaves on the crown-block 909 to corresponding sheaves on the traveling-block 913. In some embodiments, the hoist may itself be capable of travelling laterally (horizontally) along the overhead-support-member(s) 901 on some type of trolley, carriage, and/or indexing system. In some embodiments, the hoist may be powered by a hydraulic system, an electrical system, combustion system, and/or some other type of portable power source. In some embodiments, connected to and located directly below the traveling-block 913 may be a power swivel or top drive 915 (driver 915), which may rotate in either a right-hand direction or a left-hand direction, and which may be capable of providing makeup or breakout torque in either direction (as needed/desired). In some embodiments, the power swivel or top drive 915 (driver 915) may be able to be extended or retracted, respectively downward or upward (vertically), with hydraulic rams (or the like) that may be configured between the traveling-block 913 and the power swivel or top drive 915 (driver 915). In some embodiments, the power swivel or top drive 915 (driver 915) may be powered by a hydraulic system, an electrical system, or some other type of power source. In some embodiments, a stem of the power swivel or top drive 915 (driver 915) may have a male or a female threaded connection 917 at its lowermost end, which may be (removably) connected directly to a "right-hand" or "left-hand" J-slot retrieval-tool 400. Without limiting the methods of operation covered by this patent application, for any possible features or embodiments that may use a mobile-gantry-crane 900 or some other similar type of mobile hoisting equipment and/or handling device or apparatus, one or more methods of operation may be similar to those methods of operations that may be taught in one or more of the above paragraphs pertaining to FIG. 5A, FIG. 5B, FIG. 7B, and/or FIG. 7C.

Figure 10:
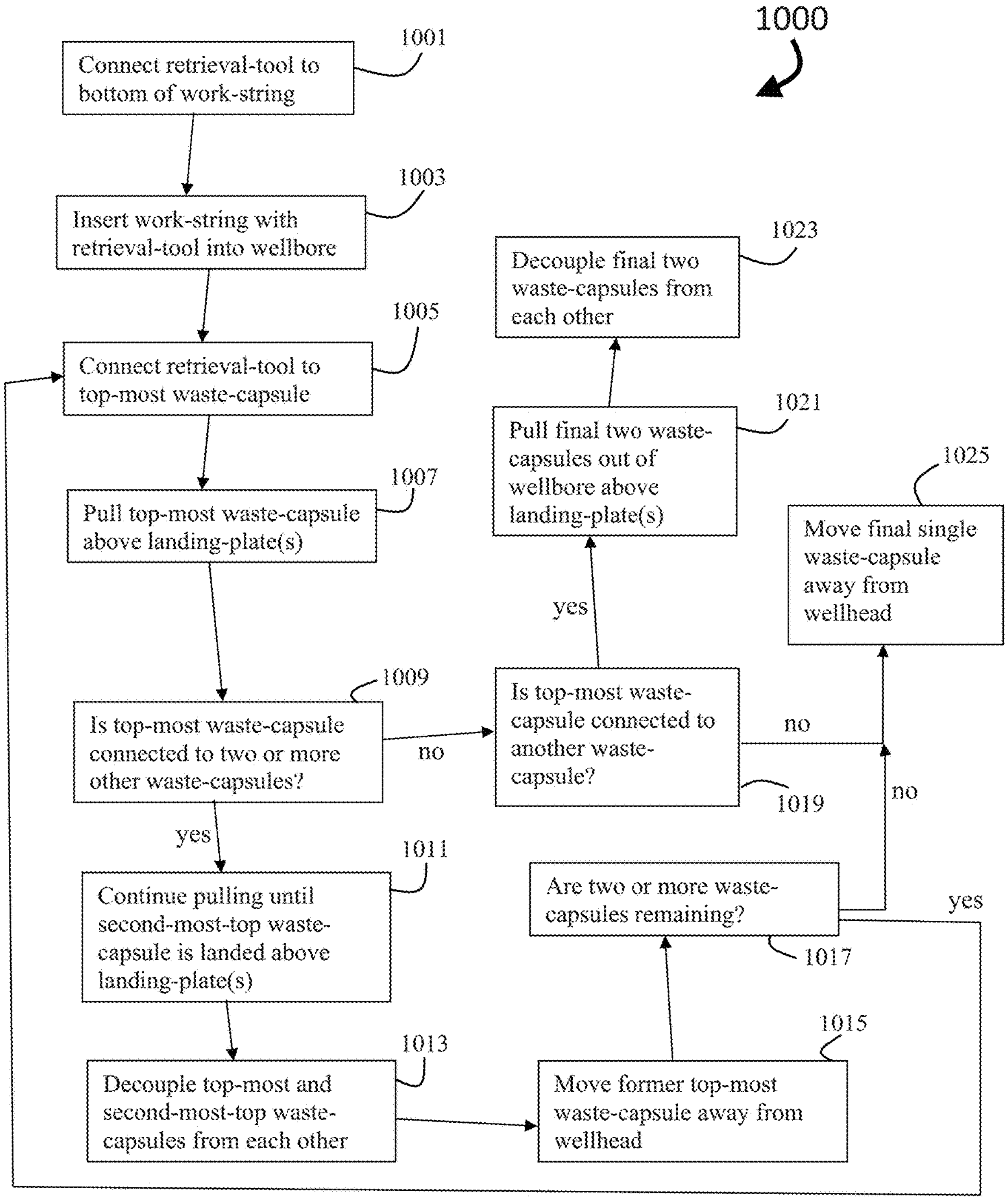
FIG. 10 may be a flowchart depicting at least some step(s) of a method for retrieving at least one retrievable-waste-capsule from a given wellbore, and using at least in part a retrieval-tool.

FIG. 10 may depict a method 1000. FIG. 10 may depict at least one step of method 1000. FIG. 10 may depict at least some step(s) of method 1000. FIG. 10 may depict some step(s) of method 1000. FIG. 10 may be a flowchart depicting at least some step(s) of method 1000. In some embodiments, method 1000 may be a method of retrieving at least one waste-capsule 100 from a given wellbore 600 using retrieval-tool 400. If there are at least two (end-to-end) attached (linked) waste-capsules 100 within wellbore 600, those may be termed linked-waste-capsules 605. In some embodiments, method 1000 may be a method of retrieving at least one string of linked-waste-capsule 605 from a given wellbore 600 using retrieval-tool 400. In some embodiments, method 1000 may be a method of decoupling waste-capsules 100 from each other, after being removed from wellbore 600. In some embodiments, a group or collection of linked-waste-capsules 605 may be separated (decoupled) from each other at the wellhead 707 section of wellbore 600 so that each individual waste-capsule 100 may be handled safely at the terrestrial surface/ground. In some embodiments, this group or collection of linked-waste-capsules 605 may be initially deposited within wellbore 600 before retrieval and/or separation (decoupling). See e.g., FIG. 5A, FIG. 5B, FIG. 6, FIG. 7B, FIG. 7C, FIG. 8, FIG. 9, and/or FIG. 10. In some embodiments, method 1000 may comprise at least one of the following steps: step 1001, step 1003, step 1005, step 1007, step 1009, step 1111, step 1113, step 1115, step 1117, step, 1119, step 1121, step 1123, step 1125, portions thereof, combinations thereof, and/or the like. In some embodiments, method 1000 may comprise one or more of the following steps: step 1001, step 1003, step 1005, step 1007, step 1009, step 1111, step 1113, step 1115, step 1117, step, 1119, step 1121, step 1123, step 1125, portions thereof, combinations thereof, and/or the like. In some embodiments, step 1001, step 1003, step 1005, step 1007, step 1009, step 1111, step 1113, step 1115, step 1117, step, 1119, step 1121, step 1123, and/or step 1125, may be optional, skipped, and/or performed/executed out of numeral order.

Continuing discussing FIG. 10, in some embodiments, step 1001 may be a step of connecting a J-slot retrieval-tool 400 to a bottom end (distal-end/terminal-end) of a given work-string. In some embodiments, driver-connection-end 405 and/or threads 409 may be utilized to make this connection. In some embodiments, step 1001 may progress into step 1003.

Continuing discussing FIG. 10, in some embodiments, step 1003 may be a step of inserting the resulting work-string with attached retrieval-tool 400 from the output of step 1001 into a given wellbore 600. In some embodiments, step 1003 may progress into step 1005.

Continuing discussing FIG. 10, in some embodiments, step 1005 may be a step of connecting the retrieval-tool 400 (from step 1001 and/or from step 1003) to a top-most waste-capsule 100. Note, step 1005 may be reached from step 1003 or from step 1117. If step 1005 is reached from step 1003, then the top-most waste-capsule 100 may be within wellbore 600; whereas, if step 1005 is reached from step 1117, then the top-most waste-capsule 100 may already be above landing-plate(s) 733. In some embodiments, execution/performance of step 1005 may result in stinger-pin(s) 205/209/211 of stinger 203 of the top-most waste-capsule 100 being positioned into parallel-section 313 of retrieval-tool 400. See e.g., FIG. 5A and its discussion. In some embodiments, the top-most waste-capsule 100 may be attached to other waste-capsules 100, such as, to form a string of linked-waste-capsules 605. See e.g., FIG. 6. In some embodiments, to execute step 1005, position the J-slot retrieval-tool 400 directly above and in axial alignment with the stinger 203 of the top-most waste-capsule 100 (the top-most waste-capsule 100 may or may not be within wellbore 600). Then, continuing to execute step 1005, slack off the J-slot retrieval-tool 400 to facilitate engaging that stinger 203 at the top of the top-most waste-capsule 100. As that is done, the J-slot retrieval-tool 400 should turn (rotate) as the J-slot retrieval-tool 400 is slacked off; and as the J-slot retrieval-tool 400 is being slacked off, the stinger-pin(s) 205 (of that stinger 203) should proceed to travel diagonally and upward (with respect to the J-slot retrieval-tool 400) inside the diagonal-passage-section(s) 311 of the J-slot(s) 305 (of that J-slot retrieval-tool 400). The stinger-pin(s) 205 should eventually end up at the top of the parallel-section(s) 313 of the J-slot(s) 305 (see FIG. 5A). In some embodiments, completion of step 1005 should result in stinger-pin(s) 205/209/211 of the top-most waste-capsule 100 being located within parallel-section(s) 313 of J-slot(s) 305 of the J-slot retrieval-tool 400. In some embodiments, step 1005 may progress into step 1007.

Continuing discussing FIG. 10, in some embodiments, step 1007 may be a step of pulling (retrieving) at least the top-most waste-capsule 100, by using the connected retrieval-tool 400 and by using at least one pulling-means, to a point/position, wherein the top-most waste-capsule 100 is above landing-plate(s) 733. In some embodiments, the pulling-means may be a drill-rig or the like that is (removably) connected to the work-string. In some embodiments, institution of, execution of, and/or performance of step 1007 may put that retrieval-tool 400 into its pickup position (with at least one pickup-distance 501). In some embodiments, in executing step 1007, pickup (pull/retrieve) the J-slot retrieval-tool 400, via the at least one pulling-means, until the J-slot retrieval-tool 400 is in the full "pickup" position with respect to connected top-most waste-capsule 100 (see FIG. 5B). In some embodiments, in executing step 1007, continue to pickup (pull/retrieve) until the full weight of the group or collection of linked-waste-capsules 605 have been lifted up and the landing-plates 733 may be remotely moved laterally outward (see FIG. 7B). In some embodiments, in executing and/or completing step 1007, the top-most waste-capsule 100 may be landed on remotely-operated landing-plates 733 (see also FIG. 7B). In some embodiments, after step 1007 has been executed, if a drilling rig was the at least one pulling-means, then (optionally) this drilling rig may be moved away from the wellhead 707 to allow more other (efficient) handling with some other type of hoisting equipment and/or handling device or apparatus, such as, but not limited to, the mobile-gantry-crane 900 (that is illustrated in FIG. 9) as the at least one pulling-means. See e.g., FIG. 5B, FIG. 7B, and/or FIG. 7C. In some embodiments, step 1007 may progress into step 1009.

Continuing discussing FIG. 10, in some embodiments, step 1009 may be a step of determining if the top-most waste-capsule 100 of steps 1005 and 1007 is connected to two (2) or more other waste-capsules 100 (i.e., are there are at least three [3] linked-waste-capsules 605). In some embodiments, this determination step may be may made by a person (who may be located remotely), counting sensor(s), automated (e.g., via computer, PLC, or the like), portions thereof, combinations thereof, and/or the like. In some embodiments, step 1009 may progress into step 1011 or step 1009 may progress into step 1119. In some embodiments, if the top-most waste-capsule 100 is connected to two (2) or more other waste-capsules 100, then step 1009 may progress to step 1111. In some embodiments, if the top-most waste-capsule 100 is not connected to two (2) or more other waste-capsules 100, then step 1009 may progress to step 1119.

Continuing discussing FIG. 10, in some embodiments, step 1011 may be a step of continuing to pull (retrieve) the top-most waste-capsule 100, by using the connected retrieval-tool 400 and by using the at least one pulling-means, to a point/position, wherein the second-most-top waste-capsule 100 is above landing-plate(s) 733. In some embodiments, the second-most-top waste-capsule 100 may be the waste-capsule 100 that is immediately connected below the top-most waste-capsule 100. In some embodiments, in executing step 1011, continue to vertically pickup (pull/retrieve) the J-slot retrieval tool 400 and the entire group or collection of linked-waste-capsules 605 until the bottom of the second-most-top waste-capsule 100 is positioned where the second-most-top waste-capsule 100 may be landed on top of the landing-plates 733. In some embodiments, in executing step 1011, remotely move the landing-plates 733 laterally inward and slack off the J-slot retrieval-tool 400 until the weight of all but the top-most waste-capsule 100 is landed on the landing-plates 733 (so the top two waste-capsules 100 are located above the landing-plates 733) (see FIG. 7C). Such step 1011 landing may be confirmed when it is observed that the slack-off distance between the top-most waste-capsule 100 and the second-most-top waste-capsule 100 has slightly decreased from the full pickup distance 501. See e.g., FIG. 7C and its discussion. In some embodiments, step 1011 may progress into step 1013.

Continuing discussing FIG. 10, in some embodiments, step 1013 may be a step of decoupling the top-most waste-capsule 100 from the second-most-top waste-capsule 100, using the retrieval-tool 400 as discussed in the FIG. 7C discussion. Note, after this step 1013 decoupling, the former second-most-top waste-capsule 100 may become the new/current the top-most waste-capsule 100. In some embodiments, as preparation for step 1013, continue to slack off until the slack-off distance between the top-most waste-capsule 100 and the second-most-top waste-capsule 100 has closed; however, do not slack off any more, in order to avoid any decrease in the pickup distance 501 between the J-slot retrieval-tool 400 and the top-most waste-capsule 100. In some embodiments, step 1013 may progress into step 1015.

Continuing discussing FIG. 10, in some embodiments, step 1015 may be a step of moving the now former and decoupled top-most waste-capsule 100 away from wellhead 707 operations, equipment, and/or machinery (e.g., so waste-capsule 100 retrieval operations may continue). In some embodiments, in executing step 1015, continue to pickup the now former top-most waste-capsule 100 and then move the now former top-most waste-capsule 100 laterally away from the wellhead 707 equipment and/or wellbore 600 opening. In some embodiments, when the now former top-most waste-capsule 100 is positioned over a properly shielded transport or storage canister or vessel, slack off and release that now former top-most waste-capsule 100 by picking up the J-slot retrieval-tool 400 and rotating the J-slot retrieval-tool 400 in the appropriate direction (either left or right, depending on the J-slot retrieval-tool 400 configuration). In some embodiments, step 1015 may be executed by use of retrieval-tool 600, the pulling-means, robotic-system 801, grabber 805, mobile-gantry-crane 900, portions thereof, combinations thereof, and/or the like. In some embodiments, step 1015 may progress into step 1017.

Continuing discussing FIG. 10, in some embodiments, step 1017 may be a step of determining if two (2) or more waste-capsules 100, including the new/current the top-most waste-capsule 100 from the output of step 1013, remain at least partially inserted within wellbore 600 and/or at least partially inserted within wellhead 707 equipment. In some embodiments, this determination step may be may made by a person (who may be located remotely), counting sensor(s), automated (e.g., via computer, PLC, or the like), portions thereof, combinations thereof, and/or the like. In some embodiments, step 1017 may progress into step 1005 or step 1017 may progress into step 1025. In some embodiments, if two (2) or more waste-capsules 100, including the new/current the top-most waste-capsule 100 from the output of step 1013, remain at least partially inserted within wellbore 600 and/or at least partially inserted within wellhead 707 equipment; then step 1017 may progress back to step 1005. If the determination outcome of step 1017 is "yes," then move the now empty J-slot retrieval-tool 400 (i.e., J-slot retrieval-tool 400 that is not attached to a waste-capsule 100) to a position directly above and in axial alignment with the stinger 203 of the next top-most waste-capsule 100, which is now the current/new top-most waste-capsule 100 (and was the former second-most-top waste-capsule 100), to be removed from wellbore 600; i.e., method 1000 may go to and repeat execution of step 1005. In some embodiments, if two (2) or more waste-capsules 100, including the new/current the top-most waste-capsule 100 from the output of step 1013, do not remain at least partially inserted within wellbore 600 and/or at least partially inserted within wellhead 707 equipment; then step 1017 may progress back to step 1025.

Continuing discussing FIG. 10, in some embodiments, step 1019 may be a step of determining if the top-most waste-capsule 100 is connected to another (below located) waste-capsule 100. Recall, in some embodiments, step 1019 may be reached from step 1009, if the top-most waste-capsule 100 was not connected to two (2) or more other waste-capsules 100. In some embodiments, this determination step may be may made by a person (who may be located remotely), counting sensor(s), automated (e.g., via computer, PLC, or the like), portions thereof, combinations thereof, and/or the like. In some embodiments, step 1019 may progress into step 1021 or step 1019 may progress into step 1025. In some embodiments, if the top-most waste-capsule 100 is connected to another waste-capsule 100, then step 1019 may progress to step 1021. In some embodiments, if the top-most waste-capsule 100 is not connected to another waste-capsule 100, then step 1019 may progress to step 1025.

Continuing discussing FIG. 10, in some embodiments, step 1021 may be a step of pulling (retrieving) the final two (2) connected waste-capsules 100 entirely out of wellbore 600 and above landing-plate(s) 733, using the connected retrieval-tool 400 and by using the at least one pulling-means. In some embodiments, step 1021 may progress into step 1023.

Continuing discussing FIG. 10, in some embodiments, step 1023 may be a step of decoupling the final two (2) retrieved waste-capsules 100 from each other using one or more of retrieval-tool 400, robotic-system 801, grabber 803, portions thereof, combinations thereof, and/or the like.

Continuing discussing FIG. 10, in some embodiments, step 1025 may be a step of moving the final/single waste-capsule 100 away from wellhead 707, using one or more of retrieval-tool 400, the pulling-means, robotic-system 801, grabber 803, mobile-gantry-crane 900, portions thereof, combinations thereof, and/or the like.

In some embodiments, method 1000 may stop, cease, and/or terminate whenever a particular waste-capsule 100 (that was formerly within wellbore 600) has been: retrieved out of wellbore 600, decoupled from other waste-capsules 100, moved away from wellhead 707, opened to access waste materials, portions thereof, combinations thereof, and/or the like.

With respect to step decoupling (e.g., decoupling between J-slot retrieval-tool 400 and a current top-most waste-capsule 100 and/or decoupling between two linked waste-capsules 100), if a "left-hand" J-slot 305 is being used, hold right-hand torque and pickup slowly. Whereas, if a "right-hand" J-slot 305 is being used, hold left-hand torque and pick-up slowly. As the J-slot retrieval-tool 400 is picked-up and rotated (either right or left, depending on the J-slot retrieval-tool 400 configuration), this combination of axial and rotational movement may cause the stinger-pin(s) 205 to enter and then to travel downward and laterally (with respect to the J-slot retrieval-tool 400) in the diagonal-passage-section(s) 311 of the corresponding J-slot(s) 305. Afterward, continued upward movement of the J-slot retrieval-tool 400, may cause the stinger-pins 205 to exit into the guiding-opening(s) 307 of the corresponding J-slot(s) 305, which may then disengage the J-slot retrieval-tool 400 from the stinger 203 on top of the current top-most waste-capsule 100, which had been landed on or above the landing-plates 733.

In some embodiments, single waste-capsules 100 may be safely handled at the terrestrial surface/ground with the J-slot retrieval-tool 400, then moved to the wellbore 600 opening, and then connected or coupled together with each other at the wellhead 707 section of the wellbore 600 so that groups or collections of two or more linked-waste-capsules 605 may be emplaced at the same time into the wellbore 600. Without limiting the methods of operation covered by this patent application for these particular embodiments, one or more methods of operation for emplacing two or more waste-capsules 605 may be taught that may be substantially (mostly) the reverse of method 1000 and/or of at least some steps of method 1000.

Figure 11:
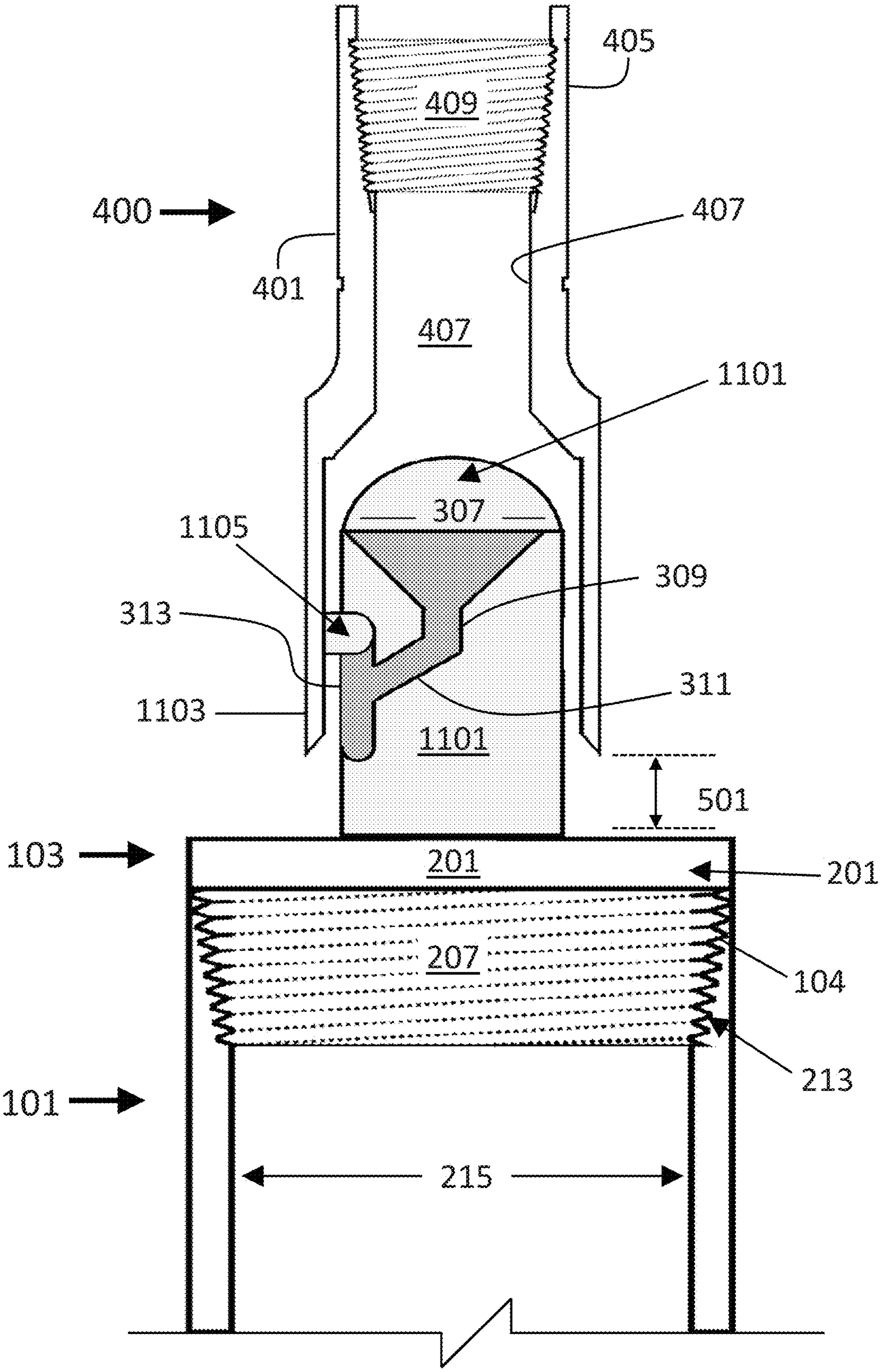
FIG. 11 depicts a partial lengthwise cross-sectional view through a portion of a given waste-capsule and an attached retrieval-tool, showing the cross-section through a (top) plug, through a (top/upper) portion of a waste-capsule-body, and through the retrievable-tool.

Compare FIG. 11 to FIG. 5A. FIG. 11 may show an alternative configuration/embodiment of waste-capsule 100 and retrieval-tool 400 as compared to FIG. 5A. In FIG. 5A, J-slots 305 structures are associated with bottom caps 105 and with bottoms 403 of retrieval-tool 400; and pins 211 are associated with stingers 203 of top caps 103. In FIG. 11, this arrangement is switched (opposite), such that the bottom inside skirt 1103 (of retrieval-tool 400 and/or of bottom caps 105) has inward protruding pin(s) 1105 and no J-slot(s) 305 structures; and stinger 1101 (of top caps 103) has the complementary J-slot(s) 305 structures. Similarly, then bottom caps 105 have bottom skirts 1103 with inward protruding pins 1105 and no J-slot(s) 305 structures.

FIG. 11 depicts a partial lengthwise cross-sectional view through a portion of a given waste-capsule 100 and an attached retrieval-tool 400, showing the cross-section through (top) plug 103, through a (top/upper) portion of waste-capsule-body 101, and through retrievable-tool 400. FIG. 11 shows at least a portion of stinger 1101 (of top plug 103) with J-slot(s) 305 (removably) engaged with pin(s) 1105 of bottom inside skirt 1103 of retrieval-tool 400, such that retrieval-tool 400 is (removably) attached to that given waste-capsule 100. In FIG. 11, pin 1105 is shown retained within (a top portion of) parallel-section 313 of J-slot 305 of stinger 1101. FIG. 11 may show a cross-sectional cutaway partial lengthwise view of a retrieval-tool 400 with pin(s) 1105 that has passed over and has engaged a stinger 1101 with "right-hand" J-slot(s) 305 of a top plug 103, which itself has been made-up into the upper section 104 of a waste-capsule-body 101, of a waste-capsule 100. FIG. 11 is a partial view because not all of waste-capsule 100 is shown in FIG. 11; e.g., the lower-portion 106 of waste-capsule-body 101 is not shown in FIG. 11. However, the entire length of that retrieval-tool 400 is shown in FIG. 11. Although, in some embodiments, a given stinger 1101 may have more than one J-slot 305 and a retrieval-tool 400 may have more than one pin 1105, in order to better illustrate the operations, functions, and/or workings of some of the embodiments of the present invention, the cross-sectional cutaway view of FIG. 11 may show the configuration of a single pin 1105 within a single J-slot 305 of that given stinger 1101. In some embodiments, top cap 103 may comprise stinger 1101. In some embodiments, stinger 1101 may comprise at least one J-slot 305. In some embodiments, retrieval-tool 400 (and/or bottom cap 105) may comprise a bottom skirt 1103. In some embodiments, bottom skirt 1103, may comprise at least one inward protruding pin 1105. In some embodiments, at least a distal/terminal end portion of pin 1105 may be configured for removable physical engagement with sections/passages of J-slot 305 of stinger 1101.

In some embodiments, the J-slot retrieval-tool 400 may be used to makeup a top plug 103 of a waste-capsule-body 101 (or waste-capsule 100) after waste material has been loaded into the waste-capsule-body 101 (or waste-capsule 100) at some terrestrial surface location or facility. Without limiting the methods of operation covered by this patent application, as one example of a method of operation for this particular embodiment, the J-slot retrieval-tool 400 may be connected to the bottom of some type of hoisting equipment and/or handling device or apparatus (such as, but not limited to, mobile-gantry-crane 900) that may maneuver the J-slot retrieval-tool 400 laterally and axially, and which may be capable of transmitting right-hand or left-hand rotation and torque to the J-slot retrieval-tool 400. After the stinger 203 of a top plug 103 has been inserted into the bottom opening of the lower-skirt 403 and the J-slot sleeve 315 on the lower end of the J-slot retrieval-tool 400 so that the stinger-pin(s) 205 have been positioned into the parallel-section(s) 313 of the J-slot(s) 305 (of the J-slot retrieval-tool 400) so that the top plug 103 has been engaged, the J-slot retrieval-tool 400 and the engaged top plug 103 may be picked up vertically by the hoisting equipment and/or handling device or apparatus and maneuvered so that linked assembly is in axial alignment directly above the loaded waste-capsule body 101. (For reference, see FIG. 5A and FIG. 5B). At this time, the J-slot retrieval-tool 400 and the engaged top plug 103 may then be lowered vertically so that the male (or female) threads 207 at the bottom of the top plug 103 are in contact with or have been "stabbed" into the female (or male) threads 213 in the upper-section 104 of the loaded waste-capsule-body 101. Depending on whether the threads are left-hand or right-hand, the J-slot retrieval-tool 400 may be rotated, respectively, either to the left or the right until the threads are made up hand-tight. Additional torque may then be applied until the top plug 103 is made up to some specified or recommended makeup torque value range. During makeup, the loaded waste-capsule-body 101 may be held motionless by a clamp or some other type of device or apparatus (such as, but not limited to, grabber 803) to prevent the loaded waste-capsule-body 101 from rotating/turning as makeup torque is applied to the top plug 103. After being fully made-up, the assembled waste-capsule 100 may then be lifted up vertically with the hoisting equipment and/or handling device or apparatus via the (still engaged) J-slot retrieval-tool 400 and moved laterally as may be required or desired.

In some embodiments, the J-slot retrieval-tool 400 may be used to breakout a top plug 103 from a waste-capsule-body 101, in order to be able to access and/or remove waste material from within the waste-capsule-body 101 at some terrestrial surface location or facility. Without limiting the methods of operation covered by this patent application for these particular embodiments, one or more methods of operation for breaking out and removing a top plug 103 from a loaded waste-capsule-body 101 may be taught that may at least substantially (mostly) be the reverse of the example taught in the previous paragraph.

In some embodiments, the body of a given stinger 1101 may have one or more J-slot(s) 305 machined into the body of that given stinger 1101. Likewise, in these particular embodiments, the lower-skirt 1103 on the lower part of the bottom plug 105 (and/or of retrieval-tool 400) may then have one or more pin(s) 1105 protruding inward from the inner diameter of the lower-skirt 1103 (and towards an axial center), and these pin(s) 1105 may engage the J-slot(s) 305 that is machined into that body of that given stinger 1101. Without limiting the methods of operation covered by this patent application for these particular embodiments, one or more methods of operation may be similar to those methods of operation described in the previous pages of this patent application. See e.g., FIG. 11.

In some embodiments, "retrieval-structure" may refer to a combination of both J-slot(s) 305 or the like structures and pin(s) 205, 209, 211, and/or 1105. In some embodiments, "retrieval-structure" may be configured for permitting retrieval of at least one waste-capsule 100 from within a wellbore 600. In some embodiments, the "retrieval-structure" may comprise: at least one pin 205, 209, 211, and/or 1105 on a "first-part" and at least one slot-structure 305 on a "second-part." In some embodiments, the at least one slot-structure 305 may be configured to removably retain the at least one pin 205, 209, 211, and/or 1105. In some embodiments, the "first-part" is a different and a separate part from the "second-part." In some embodiments, the at least one slot-structure 305 may comprise guiding-opening 307, a diagonal-passage-section 311, and a parallel-section 313. In some embodiments, guiding-opening 307 may be connected to and leads to diagonal-passage-section 311. In some embodiments, diagonal-passage-section 311 may be connected to and leads to the parallel-section 313. In some embodiments, a height of the parallel-section 313 may be substantially parallel to a height of the "second-part." In some embodiments, a length of diagonal-passage-section 311 may not be parallel nor perpendicular to the height of the "second-part." In some embodiments, guiding-opening 307 may be an opening to the at least one slot-structure 305 that may be configured to guide the at least one pin 205, 209, 211, and/or 1105 into the diagonal-passage-section 311. In some embodiments, the at least one waste-capsule 100 may comprise the "first-part" and/or the "second-part." In some embodiments, when the at least one pin 205, 209, 211, and/or 1105 may be removably retained by the at least one slot-structure 305, the at least one pin 205, 209, 211, and/or 1105 may have a length that is at least substantially orthogonal to the height of the parallel-section 313.

In some embodiments, the at least one slot-structure 305 (the at least one predetermined-pathway 305 or J-slot 305) may be configured for removable engagement with the at least one pin 205/209/211/1105.

In some embodiments, the "first-part" may be stinger 203 of (top) cap/plug 103 of the at least one waste-capsule 100. In some embodiments, stinger 203 may be an elongate-member and the at least one pin 205, 209, and/or 211 may extend away from the elongate-member of stinger 203. In some embodiments, the "second-part" may be (lower/bottom) skirt 403 of a bottom portion of retrieval-tool 400; and/or in some embodiments, the "second-part" may be lower-skirt 303 of (bottom) cap/plug 105 of the at least one waste-capsule 100. See e.g., FIG. 2A, FIG. 3A, and FIG. 5A.

In some embodiments, the "first-part" may be a bottom-skirt 1103 of retrieval-tool 400. In some embodiments, the at least one pin 1105 may extend inwardly towards an axial center of retrieval-tool 400. See e.g., FIG. 11. In some embodiments, the "first-part" may be a bottom-skirt 1103 of (bottom) cap/plug 105 of the at least one waste-capsule 100. In some embodiments, the at least one pin 1105 may extend inwardly towards an axial center of cap/plug 105. In some embodiments, the "second-part" may be stinger 1101 of a (top) cap/plug 103 of the at least one waste-capsule 100. In some embodiments, stinger 1101 may be an elongate-member. In some embodiments, stinger 1101 may comprise at least one J-slot 305 (slot-structure 305).

In some embodiments, when the at least one slot-structure 305 may be two or more slot-structures 305, each slot-structure 305 selected from the two or more slot-structures 305 may be spaced equally apart from each other within/on the "second-part."

In some embodiments, the "first-part" and/or the "second-part" may be substantially radially symmetrical in shape. In some embodiments, the "first-part" and/or the "second-part" may be substantially cylindrical in shape. In some embodiments, the "first-part" and/or the "second-part" may be constructed from at least one metal or metal alloy.

In some embodiments, the at least one pin 205/209/211/1105 may removably engage with guiding-opening 307, diagonal-passage-section 311, and parallel-section 313 at different times and not concurrently. See e.g., FIG. 5A, FIG. 5B, and FIG. 11.

In some embodiments, guiding-opening 307 may be located off-center from an axial center of the "second-part." See e.g., FIG. 3D.

In some embodiments, diagonal-passage-section 311 may (directly) connect to parallel-section 313 at a connection, such that parallel-section 313 extends in parallel directions to either side of this connection. In some embodiments, these parallel directions are parallel to the height of the "second-part." See e.g., FIG. 5A, FIG. 5B, and FIG. 11.

In some embodiments, the "second-part" may be lower-skirt 303 of (bottom) cap/plug 105 of the at least one waste-capsule 100, such that the guiding-opening 307 may be accessible from a bottom of (bottom) cap/plug 105. In some embodiments, (bottom) cap/plug 105 may be configured to seal off and close bottom-portion 106 of waste-capsule-body 101. In some embodiments, (bottom) cap/plug 105 and the waste-capsule-body 101 may be components/parts of the at least one waste-capsule 100. In some embodiments, (bottom) cap/plug 105 may comprise lower-skirt 303, shoulder 301, and threads 317. In some embodiments, lower-skirt 303 may extend from a bottom-side of the shoulder 301. In some embodiments, threads 317 may extend from a top-side of the shoulder 301. In some embodiments, threads 317 may be configured for attachment to waste-capsule-body 101. See e.g., FIG. 3A. In some embodiments, the at least one waste-capsule 100 may have a maximum outside diameter that is configured to fit within a given wellbore 600. See e.g., FIG. 6.

In some embodiments, the "second-part" may be connected to or part of lower-skirt 403 of retrieval-tool 400, such that guiding-opening 307 may be accessible from a bottom of the lower-skirt 403 of the retrieval-tool 400. In some embodiments, retrieval-tool 400 may be configured to removably connect to the at least one pin 205/209/211. See e.g., FIG. 5A. In some embodiments, the at least one pin 205/209/211 may be part of (top) cap/plug 103 of waste-capsule 100. In some embodiments, waste-capsule 100 may be configured to house (retain/hold) waste. In some embodiments, (top) cap/plug 103 may be configured to seal off and close a top-portion 104 of waste-capsule-body 101. In some embodiments, (top) cap/plug 103 and waste-capsule-body 101 may be components of waste-capsule 100. See e.g., FIG. 2A. In some embodiments, retrieval-tool 400 may comprise lower-skirt 403 (J-slot-connection-end 403) and threads 409. In some embodiments, threads 409 are disposed at an opposite-end from lower-skirt 403. See e.g., FIG. 4A. In some embodiments, threads 409 may be configured for removable attachment to at least one of: a drill-string terminal-end, a work-string terminal-end, a driver terminal-end, portions thereof, combinations thereof, and/or the like. In some embodiments, retrieval-tool 400 may have a maximum outside diameter that is configured to fit within a given wellbore 600. See e.g., FIG. 7B and FIG. 7C.

In some embodiments, waste-capsule 100 may be configured for housing waste. In some embodiments, waste-capsule 100 may comprise: waste-capsule-body 101, top-plug 103, and bottom-plug 105. In some embodiments, waste-capsule-body 101 may be at least a substantially hollow cylindrical member with an internal volume configured for housing the waste (or some portion thereof). In some embodiments, top-plug 103 may be for attaching to and sealing-off an upper terminal-end 104 of waste-capsule-body 101. In some embodiments, top-plug 103 may comprise stinger 203/1101 that may be an elongate-member that extends upwards from a center top of top-plug 103. See e.g., FIG. 1, FIG. 2A, FIG. 3A, and FIG. 11. In some embodiments, stinger 203/1101 may comprise "first-attachment-structure." In some embodiments, bottom-plug 105 may be for attaching to and sealing-off a lower terminal-end 106 of waste-capsule-body 101. In some embodiments, bottom-plug 105 may comprise "second-attachment-structure." In some embodiments, the "first-attachment-structure" may be configured for removable attachment with "second-attachment-structure" of a different-waste-capsule 100. See e.g., FIG. 6.

In some embodiments, the "first-attachment-structure" may be at least one pin 205/209/211 that extends outwardly from the stinger 203. See e.g., FIG. 2A. In some embodiments, the "second-attachment-structure" of the waste-capsule 100 may be at least one predetermined-pathway 305 (J-slot 305). See e.g., FIG. 3A. In some embodiments, the at least one predetermined-pathway 305 may comprise guiding-opening 307, diagonal-passage-section 311, and parallel-section 313. In some embodiments, guiding-opening 307, diagonal-passage-section 311, and parallel-section 313 may be configured for removable engagement with one or more 205/209/211 of the different-waste-capsule 100. In some embodiments, guiding-opening 307 may be connected to and leads to diagonal-passage-section 311. In some embodiments, diagonal-passage-section 311 may be connected to and leads to parallel-section 313. In some embodiments, a height of parallel-section 313 may be at least substantially parallel to a height of bottom-plug 105. In some embodiments, a length of diagonal-passage-section 311 is not parallel nor perpendicular to the height of bottom-plug 105. In some embodiments, guiding-opening 307 may be an opening to the at least one predetermined-pathway 305 that may be configured to guide the one or more pins into diagonal-passage-section 311. See e.g., FIG. 2A, FIG. 3A, and FIG. 5A.

In some embodiments, the "second-attachment-structure" of the waste-capsule 100 may be at least one pin 1105 that extends inwardly from a bottom-skirt 1103 of the bottom-plug 105. In some embodiments, the "first-attachment-structure" may be at least one predetermined-pathway 305 (J-slot 305) of stinger 1101. In some embodiments, the at least one predetermined-pathway 305 (of stinger 1101) may comprise guiding-opening 307, diagonal-passage-section 311, and parallel-section 313. In some embodiments, guiding-opening 307, diagonal-passage-section 311, and parallel-section 313 may be configured for removable engagement with one or more pins 1105 of the different-waste-capsule 100. In some embodiments, guiding-opening 307 may be connected to and leads to diagonal-passage-section 311. In some embodiments, diagonal-passage-section 311 may be connected to and leads to parallel-section 313. In some embodiments, a height of parallel-section 313 may be at least substantially parallel to a height of stinger 1101. In some embodiments, a length of diagonal-passage-section 311 is not parallel nor perpendicular to the height of stinger 1101. In some embodiments, guiding-opening 307 may be an opening to the at least one predetermined-pathway 305 that may be configured to guide the one or more pins 1105 into diagonal-passage-section 311. See e.g., FIG. 11.

In some embodiments, waste-capsule 100 may be configured to be removably attached to retrieval-tool 400 by removable engagement of the "first-attachment-structure" with "third-attachment-structure" of retrieval-tool 400. In some embodiments, the "third-attachment-structure" may be sized and shaped at least substantially the same as that of the "second-attachment-structure." See e.g., FIG. 5A and/or FIG. 11.

In some embodiments, waste-capsule 100 may be sized and shaped to fit and move within a given wellbore 600. See e.g., FIG. 6.

In some embodiments, top-plug 103 may comprise shoulder 201. In some embodiments, stinger 203/1101 may extend (axially) from (a top of) shoulder 201. In some embodiments, top-plug 103 may comprise threads 207 that extend from a bottom of shoulder 201. In some embodiments, threads 207 may be configured for attachment to upper terminal-end 104 of waste-capsule-body 101. See e.g., FIG. 1, FIG. 2A, and FIG. 11.

In some embodiments, bottom-plug 105 may comprise shoulder 301 and lower-skirt 303. In some embodiments, lower-skirt 303 may extend from a bottom of shoulder 301. In some embodiments, bottom-plug 105 may comprise threads 317 that extend from a top of shoulder 301. In some embodiments, threads 317 may be configured for attachment to lower terminal-end 106 of waste-capsule-body 101. See e.g., FIG. 3A.

In some embodiments, retrieval-tool 400 may be configured for removable attachment to retrievable-waste-capsule 100 with "first-attachment-structure." In some embodiments, retrieval-tool 400 may comprise: upper-portion 405 and lower-portion 403. In some embodiments, upper-portion 405 may be configured for removable attachment to at least one of: a drill-string terminal-end, a work-string terminal-end, a driver terminal-end, portions thereof, combinations thereof, and/or the like. In some embodiments, lower-portion 403 may be configured for removable attachment to retrievable-waste-capsule 100. In some embodiments, lower-portion 403 may comprise "second-attachment-structure." In some embodiments, the "second-attachment-structure" may be configured for removable attachment to the "first-attachment-structure."

In some embodiments, the "second-attachment-structure" (of retrieval-tool 400) may comprise at least one predetermined-pathway 305 (J-slot 305). In some embodiments, the at least one predetermined-pathway may comprise guiding-opening 307, diagonal-passage-section 311, and parallel-section 313. In some embodiments, guiding-opening 307, diagonal-passage-section 311, and parallel-section 313 may be configured for removable engagement with at least one stinger-pin 205/209/211 of retrievable-waste-capsule 100. In some embodiments, the "first-attachment-structure" may comprise the at least one stinger-pin 205/209/211. In some embodiments, guiding-opening 307 may be connected to and leads to diagonal-passage-section 311. In some embodiments, diagonal-passage-section 311 may be connected to and leads to parallel-section 313. In some embodiments, a height of parallel-section 313 may be substantially parallel to a height of retrieval-tool 400. In some embodiments, a length of diagonal-passage-section 311 is not parallel nor perpendicular to the height of retrieval-tool 400. In some embodiments, guiding-opening 307 may be an opening to the at least one predetermined-pathway 305 that may be configured to guide the at least one stinger-pin 205/209/211 into diagonal-passage-section 311. See e.g., FIG. 5A.

In some embodiments, the "second-attachment-structure" may comprise at least one pin 1105 that extends inwardly towards an axial center of retrieval-tool 400. In some embodiments, the "first-attachment-structure" may comprise the at least one predetermined-pathway 305 (J-slot 305) of stinger 1101 of top-plug 103. In some embodiments, the at least one predetermined-pathway 305 (J-slot 305) may comprise guiding-opening 307, diagonal-passage-section 311, and parallel-section 313. In some embodiments, guiding-opening 307, diagonal-passage-section 311, and parallel-section 313 may be configured for removable engagement with the at least one pin 1105. In some embodiments, guiding-opening 307 may be connected to and leads to diagonal-passage-section 311. In some embodiments, diagonal-passage-section 311 may be connected to and leads to parallel-section 313. In some embodiments, a height of parallel-section 313 may be substantially parallel to a height of retrievable-waste-capsule 100. In some embodiments, a length of diagonal-passage-section 311 is not parallel nor perpendicular to the height of retrievable-waste-capsule 100. In some embodiments, guiding-opening 307 may be an opening to the at least one predetermined-pathway 305 that may be configured to guide the at least one pin 1105 into diagonal-passage-section 311. See e.g., FIG. 11.

In some embodiments, retrieval-tool 400 may be sized and shaped to fit and move within a given wellbore 600. See e.g., FIG. 7B and/or FIG. 7C.

In some embodiments, upper-portion 405 may comprise threads 409. In some embodiments, threads 409 may be disposed at an opposite-end from lower-portion 403. In some embodiments, threads 409 may be configured for removable attachment to at least one of: a drill-string terminal-end, a work-string terminal-end, or a driver terminal-end, portions thereof, combinations thereof, and/or the like. See e.g., FIG. 5A.

At least one embodiment of the present invention may be characterized as a system for retrieving at least one retrievable-waste-capsule 100 from a given wellbore 600. In some embodiments, this system may comprise at least one retrievable-waste-capsule 100 and at least one retrieval-tool 400. See e.g., FIG. 5A and FIG. 11. In some embodiments, the at least one retrievable-waste-capsule 100 may comprise: waste-capsule-body 101, top-plug 103, and bottom-plug 105. In some embodiments, waste-capsule-body 101 may be a hollow cylindrical member with an internal volume for housing (retaining) waste (or some portion thereof). See e.g., FIG. 1. In some embodiments, top-plug 103 may be for attaching to and sealing-off upper terminal-end 104 of waste-capsule-body 101. In some embodiments, top-plug 103 may comprise stinger 203/1101 that may be an elongate-member that extends upwards from a center top of the top-plug 103. In some embodiments, stinger may comprise "first-attachment-structure." See e.g., FIG. 2A, FIG. 5A, and FIG. 11. In some embodiments, bottom-plug 105 may be for attaching to and sealing-off lower terminal-end 106 of waste-capsule-body 101. In some embodiments, bottom-plug 105 may comprise "second-attachment-structure." In some embodiments, the "second-attachment-structure" may be configured for removable attachment to "first-attachment-structure" of a different-waste-capsule 100 (e.g., so two or more waste-capsules 100 may be linked together in an end-to-end fashion as shown in FIG. 6). See e.g., FIG. 3A. In some embodiments, retrieval-tool 400 may comprise/have "third-attachment-structure." In some embodiments, the "third-attachment-structure" may be removably attachable to the "first-attachment-structure." See e.g., FIG. 5A and FIG. 11. In some embodiments, the "third-attachment-structure" may be at least substantially the same with respect to shape, size, dimension, purpose, function, and/or strength as that of "second-attachment-structure."

In some embodiments, the "first-attachment-structure" may be at least one pin 205/209/211 that may extend outwardly from stinger 203. In some embodiments, the "third-attachment-structure" may be at least one predetermined-pathway 305 (J-slot 305) of retrieval-tool 400. In some embodiments, the at least one predetermined-pathway 305 may comprise guiding-opening 307, diagonal-passage-section 311, and parallel-section 313. In some embodiments, guiding-opening 307, diagonal-passage-section 311, and parallel-section 313 may be configured for removable engagement with the at least one pin 205/209/211. In some embodiments, guiding-opening 307 may be connected to and leads to diagonal-passage-section 311. In some embodiments, diagonal-passage-section 311 may be connected to and leads to parallel-section 313. In some embodiments, a height of parallel-section 313 may be substantially parallel to a height of retrieval-tool 400. In some embodiments, a length of diagonal-passage-section 311 is not parallel nor perpendicular to the height of retrieval-tool 400. In some embodiments, guiding-opening 307 may be an opening to the at least one predetermined-pathway 305 that may be configured to guide the at least one pin 205/209/211 into diagonal-passage-section 311. See e.g., FIG. 5A.

In some embodiments, the "third-attachment-structure" may be at least one pin 1105 that may extend inwardly from bottom-skirt 403 of retrieval-tool 400. In some embodiments, the "first-attachment-structure" may be at least one predetermined-pathway 305 (J-slot 305) of stinger 1101 (of cap 103). In some embodiments, the at least one predetermined-pathway 305 may comprise guiding-opening 307, diagonal-passage-section 311, and parallel-section 313. In some embodiments, guiding-opening 307, diagonal-passage-section 311, and parallel-section 313 may be configured for removable engagement with the at least one pin 1105. In some embodiments, guiding-opening 307 may be connected to and leads to diagonal-passage-section 311. In some embodiments, diagonal-passage-section 311 may be connected to and leads to parallel-section 313. In some embodiments, a height of parallel-section 313 may be substantially parallel to a height of stinger 1101. In some embodiments, a length of diagonal-passage-section 311 is not parallel nor perpendicular to the height of stinger 1101. In some embodiments, guiding-opening 307 may be an opening to the at least one predetermined-pathway 305 that may be configured to guide the at least one pin 1105 into diagonal-passage-section 311. See e.g., FIG. 11.

In some embodiments, the system may further comprise a pulling-means. In some embodiments, the pulling-means may be configured to pull retrieval-tool 400 when the retrieval-tool 400 may be removably attached to the at least one retrievable-waste-capsule 100; and wherein when the retrieval-tool 400 along with the removably attached the at least one retrievable-waste-capsule 100 may all be located within a given wellbore 600. In some embodiments, the pulling-means may, at least in part, be selected from or more of: a drill-rig, a mobile-gantry-crane, a hoisting machine, portions thereof, combinations thereof, and/or the like. In some embodiments, the pulling-means may be configured to operate when retrieval-tool 400 and/or the at least one retrievable-waste-capsule may be within the given wellbore 600. See e.g., FIG. 5A to FIG. 9 and/or see FIG. 11.

In some embodiments, the at least one retrievable-waste-capsule 100 of the system may be removably attached to the different-waste-capsule(s) 100. In some embodiments, the different-waste-capsule(s) 100 may have a same shape, dimensions, material(s) of construction, geometry, and/or structures as the at least one retrievable-waste-capsule 100. See e.g., FIG. 6.

In some embodiments, the system may comprise at least one waste-capsule 100 that may be without the second-attachment-structure (e.g., without J-slots 305 or without pins 1105 at its bottom). See e.g., FIG. 3C.

At least one embodiment of the present invention may be characterized as a method for retrieving at least one retrievable-waste-capsule 100 from within a given wellbore 600 (see e.g., method 1000). Note, in some embodiments, all waste-capsules 100 noted in method 1000 may be selected from the at least one retrievable-waste-capsule 100. In some embodiments, method 1000 may comprise steps: step 1005, step 1007, step 1009, step 1011, step 1013, step 1025, step 1019, and/or step 1021. In some embodiments, at least some of these steps of method 1000 may be optional, skipped, and/or conditional. In some embodiments, step 1005 may be a step of removably coupling retrieval-tool 400 to a top-most waste-capsule 100. In some embodiments, the top-most waste-capsule 100 may be located (initially before retrieval) in the wellbore 600 closest to a wellhead 707 of wellbore 600. In some embodiments, step 1007 may be a step of pulling the top-most waste-capsule 100 above landing-plate 733 such that the top-most waste-capsule 100 may now be designated a landed waste-capsule 100. In some embodiments, step 1009 may be a step of determining if the landed waste-capsule 100 may be (removably) connected to two or more other waste-capsules 100 (below the landed waste-capsule 100/top-most waste-capsule 100). In some embodiments, in step 1011, if the landed waste-capsule 100 may be connected to the two or more other waste-capsules 100, then continuing pulling until a second-most-top waste-capsule 100 may be landed above landing-plate 733. In some embodiments, step 1013 may be a step of decoupling the landed waste-capsule 100 from the second-most-top waste-capsule 100, such that the landed waste-capsule 100 may be now designated a former top-most waste-capsule 100. In some embodiments, if the landed waste-capsule 100 from the step 1009/1019 may be just (only) one waste-capsule 100 without any other connected waste-capsules 100, then step 1025 may execute of moving the landed waste-capsule 100 (the single/only waste-capsule 100) from the step 1009/1019 away from wellhead 707. In some embodiments, if the landed waste-capsule 100 from the step 1009/1019 may be connected to only one other waste-capsule 100, then the method 1000 may continue with step 1021 of pulling the landed waste-capsule 100 from the step 1009/1019 along with the only one other waste-capsule 100 above landing-plate 733. See e.g., FIG. 10. In some embodiments, opposing terminal ends of the at least one retrievable-waste-capsule 100 may be configured for removable coupling with inline adjacent waste-capsules 100 within a given wellbore 600. See e.g., FIG. 6.

In some embodiments, after the step 1013, method 1000 may further comprise a step 1015 of moving the former top-most waste-capsule 100 away from the wellhead 707. In some embodiments, after step 1015, method 1000 may further comprise a step 1017 of determining if one or more waste-capsules 100 remain within wellbore 600. In some embodiments, the second-top-most waste-capsule 100 may now be designated the top-most waste-capsule 100 (e.g., after step 1013 or after step 1015) and is located above the landing-plate 733. In some embodiments, if one or more waste-capsules 100 do remain within wellbore 600, then method 1000 may continue from step 1005. In some embodiments, if the top-most waste-capsule 100 (the former the second-top-most waste-capsule 100) is not attached to any other waste-capsules 100, then method 1000 may continue with step 1025 of moving the top-most waste-capsule 100 away from wellhead 707. See e.g., FIG. 10.

In some embodiments, after the step 1021, the method 1000 may further comprise a step 1023 of decoupling the landed waste-capsule 100 from the step 1021 from the only one other waste-capsule 100. See e.g., FIG. 10.

In some embodiments, prior to the step 1005, method 1000 may comprise step 1003 of inserting retrieval-tool 400 into the given wellbore 600. In some embodiments, prior to the step 1005, method 1000 may comprise step 1001 of attaching retrieval-tool 400 to a distal bottom end of a work-string (or the like); and then method 1000 may comprise step 1003 of inserting retrieval-tool 400 into the given wellbore 600. See e.g., FIG. 10.

In some embodiments, the pulling of step 1007, step 1011, and/or of step 1021 may be performed by a pulling means. In some embodiments, the pulling means may be executed, at least in part, by a drill rig, a workover rig, a (mobile) gantry crane, mobile-gantry-crane 900, portions thereof, combinations thereof, and/or the like. Additionally, work strings, drill strings, drivers, portions thereof, combinations thereof, and/or the like may also be used to facilitate this pulling. See e.g., FIG. 10.

In some embodiments, when step 1005 connecting is executed, at least in part, by performing a clockwise or a counterclockwise motion; and the step 1013 and/or step 1023 decoupling may be done, at least in part, by an opposite motion to that of the step 1005 connecting motion.

Note, J-slot(s) 305 or the like structure may also be referred to as "slot-structure," "predetermined-pathway," "first-attachment-structure," "second-attachment-structure," "third-attachment-structure," combinations thereof, portions thereof, and/or the like. Similarly, pin(s) 205, 209, 211, or 1105 may also be referred to as "first-attachment-structure," "second-attachment-structure," or "third-attachment-structure." In some embodiments, "first-attachment-structure" and "second-attachment-structure" may be complementary attachment structures at opposing ends of waste-capsules 100; whereas, "third-attachment-structure" may be complementary attachment structure at a bottom of a given retrieval-tool 400. In some embodiments, "first-attachment-structure" may be physically associated with top cap/plug 103 and/or stinger 203/1101. In some embodiments, "second-attachment-structure" may be physically associated with bottom cap/plug 105 and/or lower-skirt 303. In some embodiments, the "third-attachment-structure" (of retrieval-tool 400) may be at least substantially (mostly) sized and shaped the same as that of the "second-attachment-structure" (of bottom cap/plug 105); i.e., whatever bottom attachment structure of bottom cap/plug 105 may have, then bottom attachment structure of retrieval-tool 400 may be the same, in terms of shape, size, dimensions, strength, and/or the like. Note when, pin(s) 205, 209, and/or 211 may be "first-attachment-structure," then, J-slot 305 may be referred to as "second-attachment-structure" and/or as "third-attachment-structure." Note when, J-slot(s) 305 may be "first-attachment-structure," then pin(s) 1105 may be referred to as "second-attachment-structure" and/or as "third-attachment-structure."

Retrievable-waste-capsules, a retrievable-tool, systems thereof, and methods thereof have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. Retrieval-structure that is configured for permitting retrieval of at least one waste-capsule from within a wellbore, wherein the retrieval-structure comprises:

at least one pin on a first-part;

at least one slot-structure on a second-part; wherein the at least one slot-structure is configured to removably retain the at least one pin; wherein the first-part is a different and a separate part from the second-part; wherein the at least one slot-structure comprises a guiding-opening, a diagonal-passage-section, and a parallel-section;

wherein the guiding-opening is connected to and leads to the diagonal-passage-section;

wherein the diagonal-passage-section is connected to and leads to the parallel-section;

wherein a height of the parallel-section is substantially parallel to a height of the second-part;

wherein a length of the diagonal-passage-section is not parallel nor perpendicular to the height of the second-part;

wherein the guiding-opening is an opening to the at least one slot-structure that is configured to guide the at least one pin into the diagonal-passage-section;

wherein the at least one waste-capsule comprises the first-part or the second-part; and wherein when the at least one pin is removably retained by the at least one slot-structure, the at least one pin has a length that is at least substantially orthogonal to the height of the parallel-section.

2. The retrieval-structure according to claim 1, wherein the first-part is a stinger of a top-cap of the at least one waste-capsule, wherein the stinger is an elongate-member and the at least one pin extends away from the elongate-member.

3. The retrieval-structure according to claim 1, wherein the second-part is a skirt of a bottom portion of a retrieval-tool.

4. The retrieval-structure according to claim 1, wherein the second-part is a skirt of a bottom-cap of the at least one waste-capsule.

5. The retrieval-structure according to claim 1, wherein the first-part is a bottom-skirt of a retrieval-tool, wherein the at least one pin extends inwardly towards an axial center of the retrieval-tool.

6. The retrieval-structure according to claim 1, wherein the first-part is a bottom-skirt of a bottom-cap of the at least one waste-capsule, wherein the at least one pin extends inwardly towards an axial center of the bottom-cap.

7. The retrieval-structure according to claim 1, wherein the second-part is a stinger of a top-cap of the at least one waste-capsule, wherein the stinger is an elongate-member.

8. The retrieval-structure according to claim 1, wherein when the at least one slot-structure is two or more slot-structures, each slot-structure selected from the two or more slot-structures is spaced equally apart from each other within the second-part.

9. The retrieval-structure according to claim 1, wherein the second-part is substantially radially symmetrical in shape.

10. The retrieval-structure according to claim 1, wherein the second-part is substantially cylindrical in shape.

11. The retrieval-structure according to claim 1, wherein the second-part is constructed from at least one metal or metal alloy.

12. The retrieval-structure according to claim 1, wherein the at least one pin removably engages with the guiding-opening, the diagonal-passage-section, and the parallel-section at different times and not concurrently.

13. The retrieval-structure according to claim 1, wherein the guiding-opening is located off-center from an axial center of the second-part.

14. The retrieval-structure according to claim 1, wherein the diagonal-passage-section connects to the parallel-section at a connection such that the parallel-section extends in parallel directions to either side of this connection; wherein the parallel directions are parallel to the height of the second-part.

15. The retrieval-structure according to claim 1, wherein the second-part is a lower-skirt of a bottom-plug of the at least one waste-capsule, such that the guiding-opening is accessible from a bottom of the bottom-plug; wherein the bottom-plug is configured to seal off and close a bottom-portion of a waste-capsule-body; wherein the bottom-plug and the waste-capsule-body are components of the at least one waste-capsule.

16. The retrieval-structure according to claim 15, wherein the bottom-plug comprises the lower-skirt, a shoulder, and threads; wherein the lower-skirt extends from a bottom-side of the shoulder; wherein the threads extend from a top-side of the shoulder; wherein the threads are configured for attachment to the waste-capsule-body.

17. The retrieval-structure according to claim 15, wherein the at least one waste-capsule has a maximum outside diameter that is configured to fit within the wellbore.

18. The retrieval-structure according to claim 1, wherein the second-part is connected to or is part of a lower-skirt of a retrieval-tool, such that the guiding-opening is accessible from a bottom of the lower-skirt of the retrieval-tool; wherein the retrieval-tool is configured to removably connect to the at least one pin; wherein the at least one pin is part of a top-plug of a waste-capsule; wherein the waste-capsule is configured to house waste; wherein the top-plug is configured to seal off and close a top-portion of a waste-capsule-body; wherein the top-plug and the waste-capsule-body are components of the waste-capsule.

19. The retrieval-structure according to claim 18, wherein the retrieval-tool comprises the lower-skirt and threads; wherein the threads are disposed at an opposite-end from the lower-skirt; wherein the threads are configured for removable attachment to at least one of: a drill-string terminal-end, a work-string terminal-end, or a driver terminal-end.

20. The retrieval-structure according to claim 18, wherein the retrieval-tool has a maximum outside diameter that is configured to fit within a wellbore.

* * * * *